United States Patent
Horiuchi

(10) Patent No.: US 6,344,932 B1
(45) Date of Patent: Feb. 5, 2002

(54) ZOOM LENS AND OPTICAL APPARATUS HAVING THE SAME

(75) Inventor: Akihisa Horiuchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/482,958

(22) Filed: Jan. 14, 2000

(30) Foreign Application Priority Data

| Jan. 19, 1999 | (JP) | ............................................. 11-010564 |
| Jul. 30, 1999 | (JP) | ............................................. 11-217268 |
| Oct. 22, 1999 | (JP) | ............................................. 11-300924 |

(51) Int. Cl.[7] ............................................. G02B 15/14

(52) U.S. Cl. ........................ 359/687; 359/684; 359/715; 359/740; 359/774

(58) Field of Search ................................ 359/684, 687, 359/715, 740, 774

(56) References Cited

U.S. PATENT DOCUMENTS

| 4,299,454 A | 11/1981 | Betensky ..................... 359/687 |
| 4,776,679 A | 10/1988 | Kitagishi et al. ............ 359/686 |
| 4,802,747 A | 2/1989 | Horiuchi ..................... 359/687 |
| 4,810,070 A | 3/1989 | Suda et al. .................. 359/653 |
| 4,842,386 A | 6/1989 | Kitagishi et al. ............ 359/687 |
| 4,854,684 A | 8/1989 | Horiuchi ..................... 359/687 |
| 4,892,397 A | 1/1990 | Horiuchi ..................... 359/679 |
| 4,907,866 A | 3/1990 | Kitagishi et al. ............ 359/654 |
| 4,934,796 A | 6/1990 | Sugiura et al. .............. 359/683 |
| 4,988,174 A | 1/1991 | Horiuchi et al. ............. 359/683 |
| 5,011,272 A | 4/1991 | Nakayama et al. ......... 359/692 |
| 5,050,972 A | 9/1991 | Mukaiya et al. ............. 359/683 |
| 5,056,900 A | 10/1991 | Mukaiya et al. ............ 359/676 |

(List continued on next page.)

FOREIGN PATENT DOCUMENTS

| JP | 62-24213 | 2/1987 |
| JP | 62-206516 | 9/1987 |
| JP | 62-247316 | 10/1987 |
| JP | 63-29718 | 2/1988 |
| JP | 4-43311 | 2/1992 |
| JP | 5-19165 | 1/1993 |
| JP | 5-60973 | 3/1993 |
| JP | 5-60974 | 3/1993 |
| JP | 5-72472 | 3/1993 |
| JP | 5-107473 | 4/1993 |
| JP | 5-297275 | 11/1993 |
| JP | 6-130297 | 5/1994 |
| JP | 8-292369 | 11/1996 |
| JP | 8-304700 | 11/1996 |

Primary Examiner—Evelyn A. Lester
(74) Attorney, Agent, or Firm—Fitzpatrick, Cella, Harper & Scinto

(57) ABSTRACT

A zoom lens, includes, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by moving the second lens unit toward the image side, shifting of an image plane due to the variation of magnification is compensated for by moving the fourth lens unit and focusing is effected by moving the fourth lens unit, a stop being disposed on the most object side of the third lens unit, the third lens unit including a positive lens (G3F) disposed on the image side of the stop and just behind the stop and having a convex lens surface facing the object side, at least one of lens surfaces of the positive lens (G3F) being an aspheric surface, and a negative lens (G3R) of meniscus form disposed on the most image side and having a concave surface facing the image side, the curvature of which is stronger than that of an opposite surface thereof, the fourth lens unit consisting of a cemented lens composed of a positive lens, both lens surfaces of which are convex and at leas one lens surface of which is an aspheric surface and a negative lens, and the various conditions being satisfied.

41 Claims, 25 Drawing Sheets

U.S. PATENT DOCUMENTS

| | | | |
|---|---|---|---|
| 5,095,387 A | 3/1992 | Horiuchi | 359/676 |
| 5,138,492 A | 8/1992 | Hamano et al. | 359/684 |
| 5,189,558 A | 2/1993 | Ishii et al. | 359/687 |
| 5,225,937 A | 7/1993 | Horiuchi | 359/688 |
| 5,231,540 A | 7/1993 | Shibata | 359/684 |
| 5,296,969 A * | 3/1994 | Mihara | 359/687 |
| 5,313,331 A * | 5/1994 | Mihara | 359/687 |
| 5,321,552 A | 6/1994 | Horiuchi et al. | 359/654 |
| 5,353,157 A | 10/1994 | Horiuchi | 359/676 |
| 5,396,367 A | 3/1995 | Ono et al. | 359/687 |
| 5,572,364 A | 11/1996 | Toide et al. | 359/649 |
| 5,612,825 A | 3/1997 | Horiuchi et al. | 359/687 |
| 5,638,216 A | 6/1997 | Horiuchi et al. | 359/683 |
| 5,739,961 A | 4/1998 | Nakayama et al. | 359/687 |
| 5,754,346 A | 5/1998 | Nakayama et al. | 359/687 |
| 5,933,283 A * | 8/1999 | Hamano | 359/687 |
| 5,940,221 A | 8/1999 | Okayama et al. | 359/687 |
| 5,969,879 A * | 10/1999 | Park | 359/687 |
| 6,118,593 A * | 9/2000 | Tochigi | 359/687 |
| 6,157,493 A * | 12/2000 | Nanjo | 359/676 |
| 6,166,864 A * | 12/2000 | Horiuchi | 359/687 |
| 6,185,048 B1 * | 2/2001 | Ishii et al. | 359/687 |

* cited by examiner

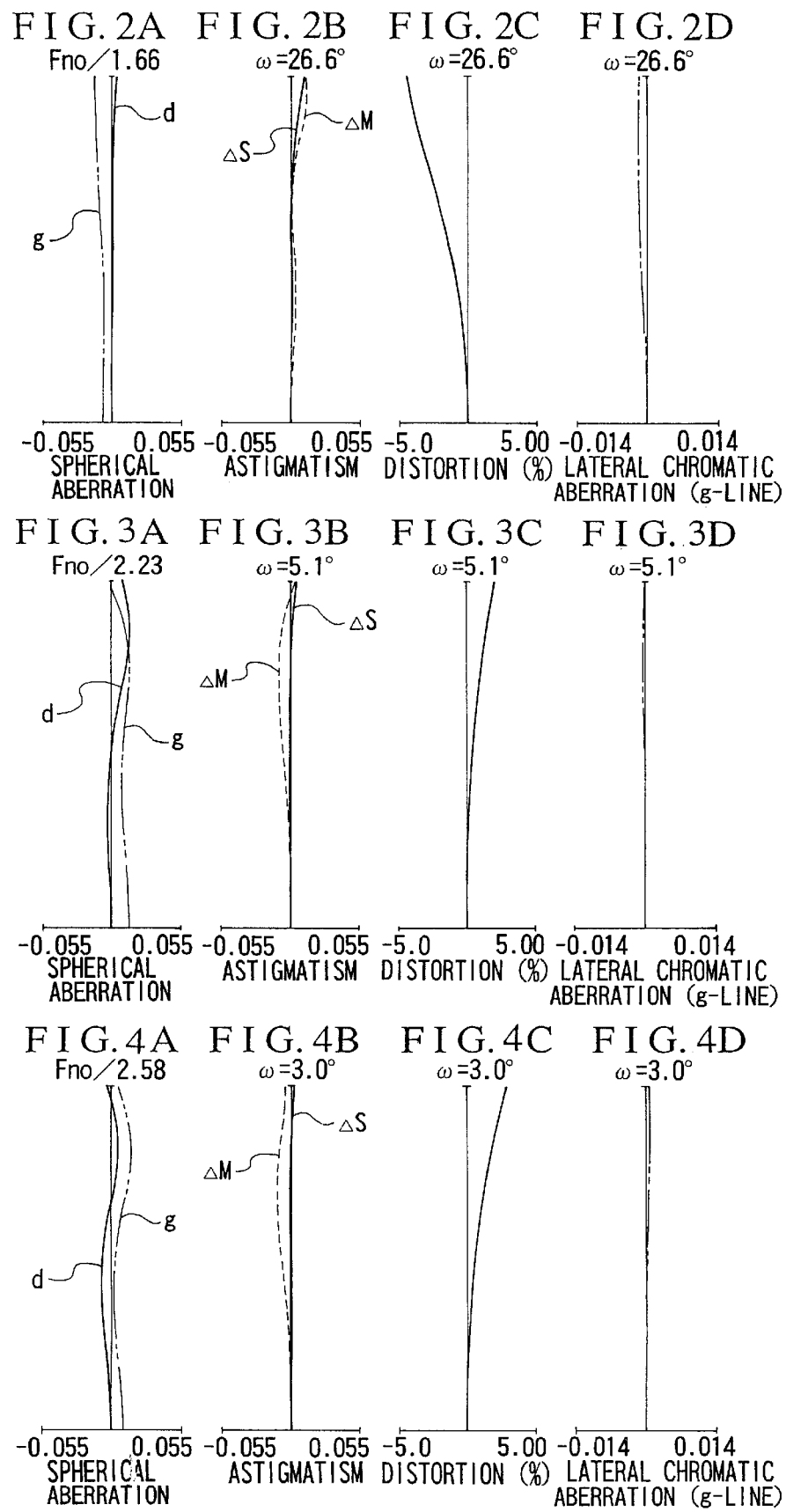

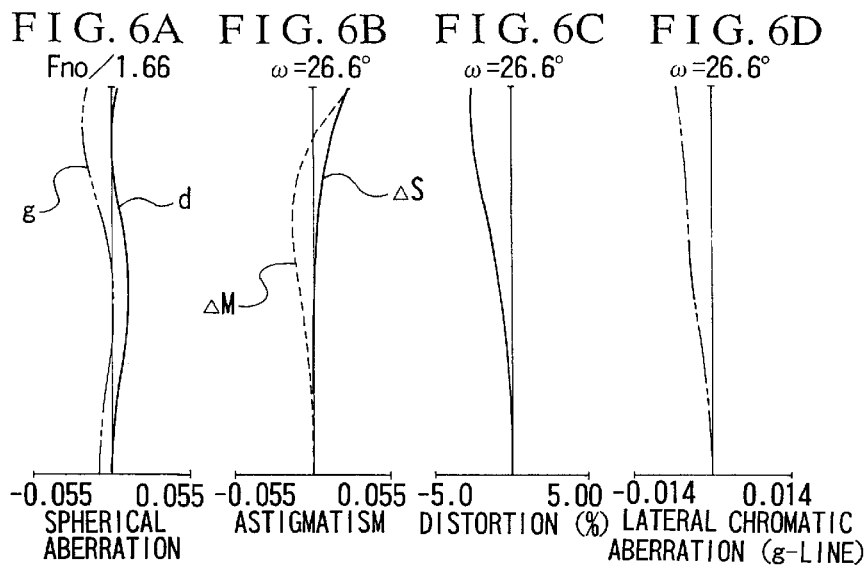
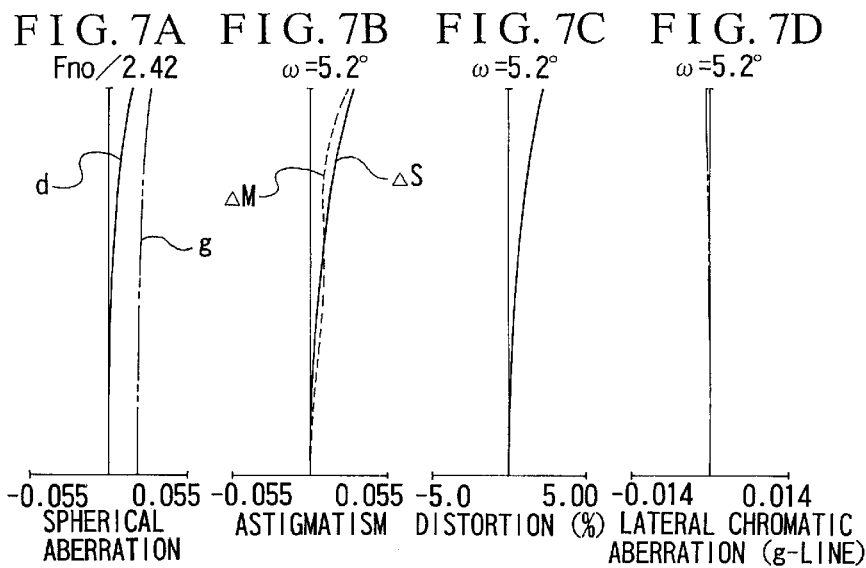
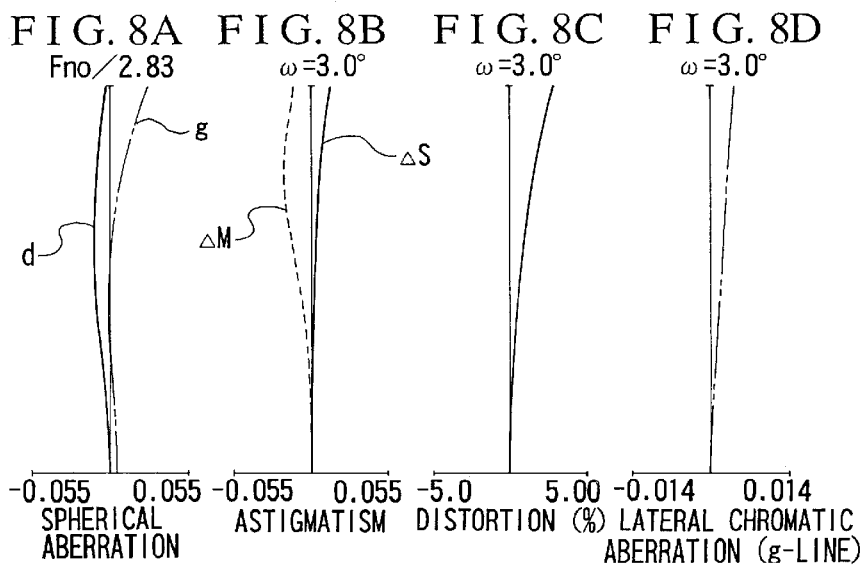

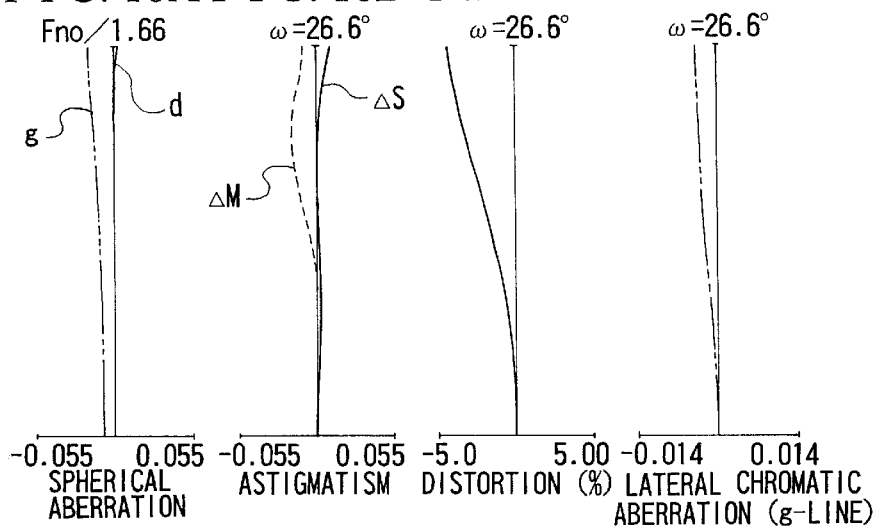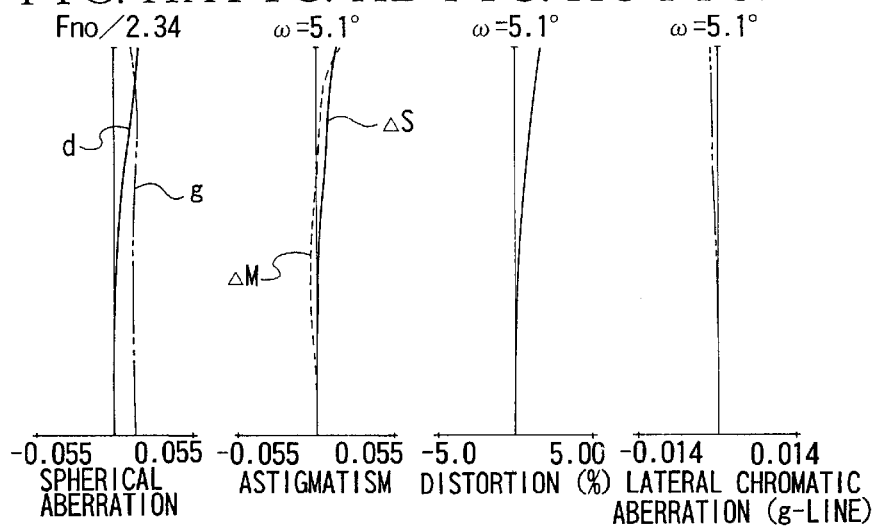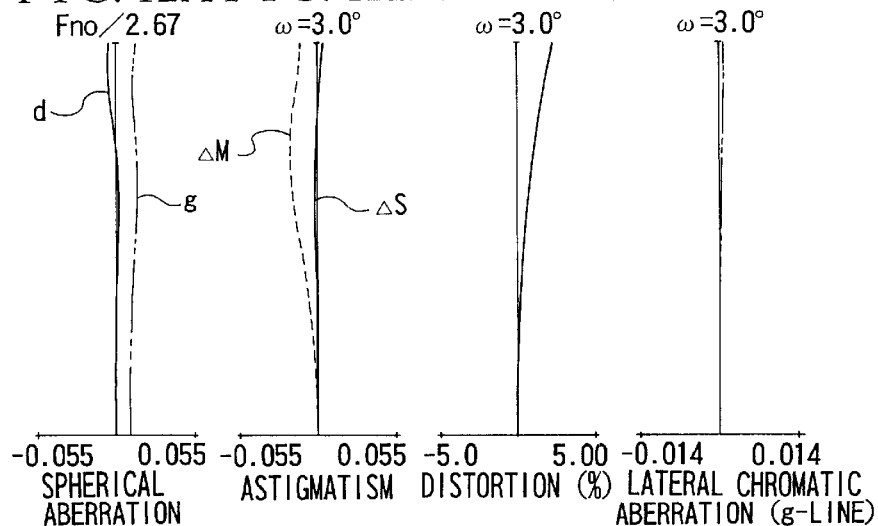

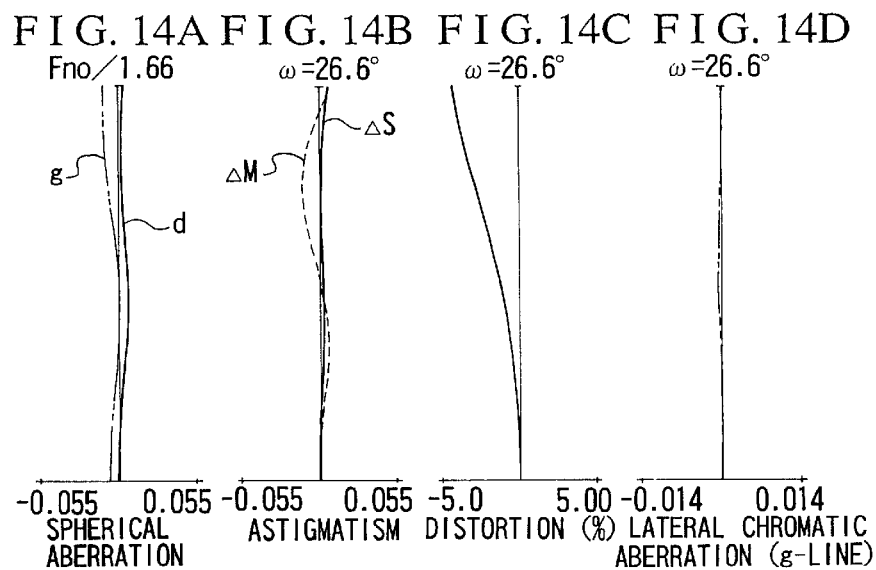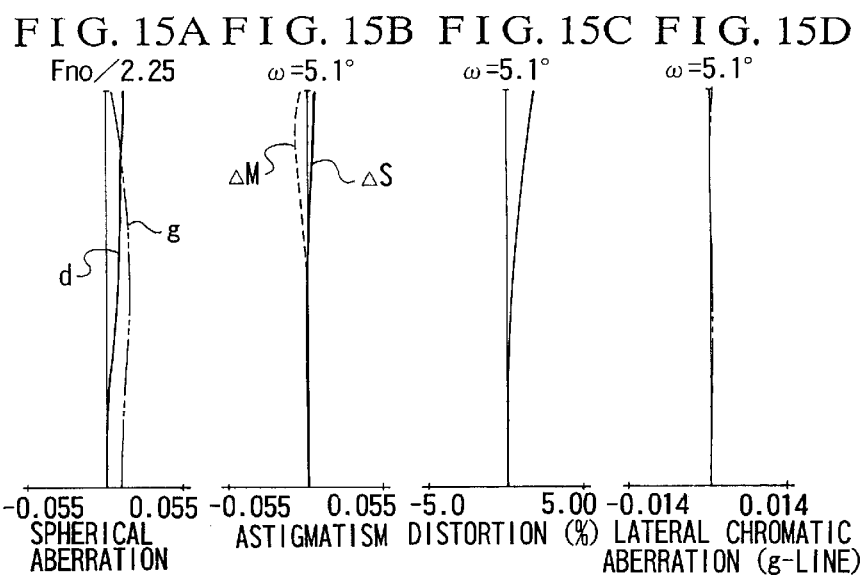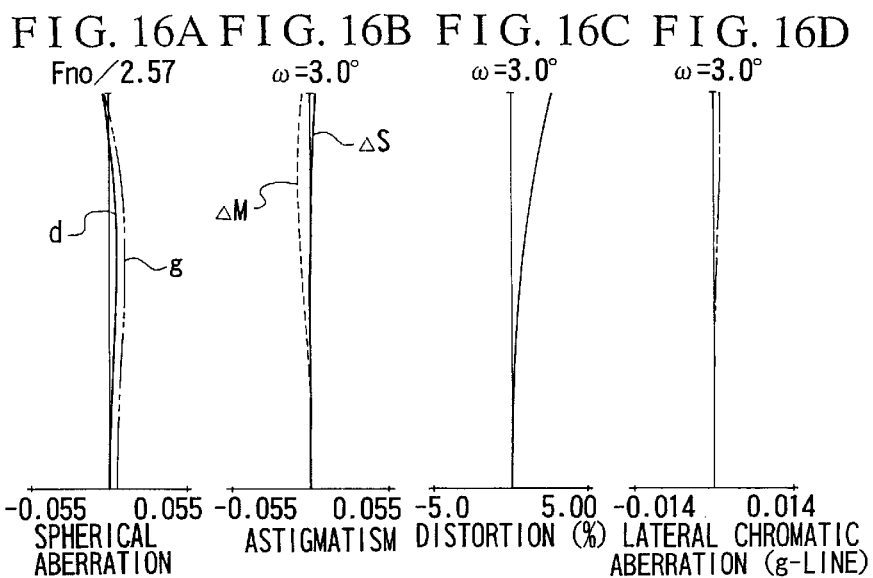

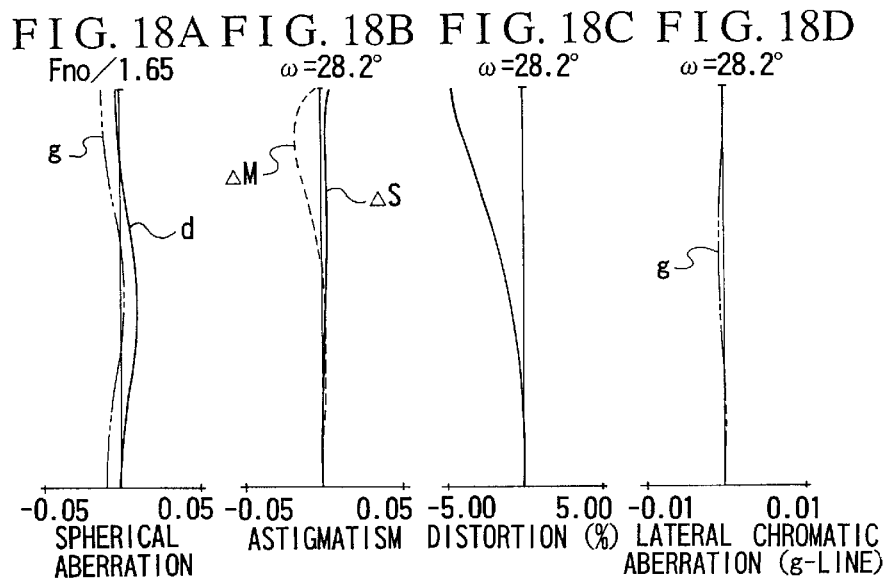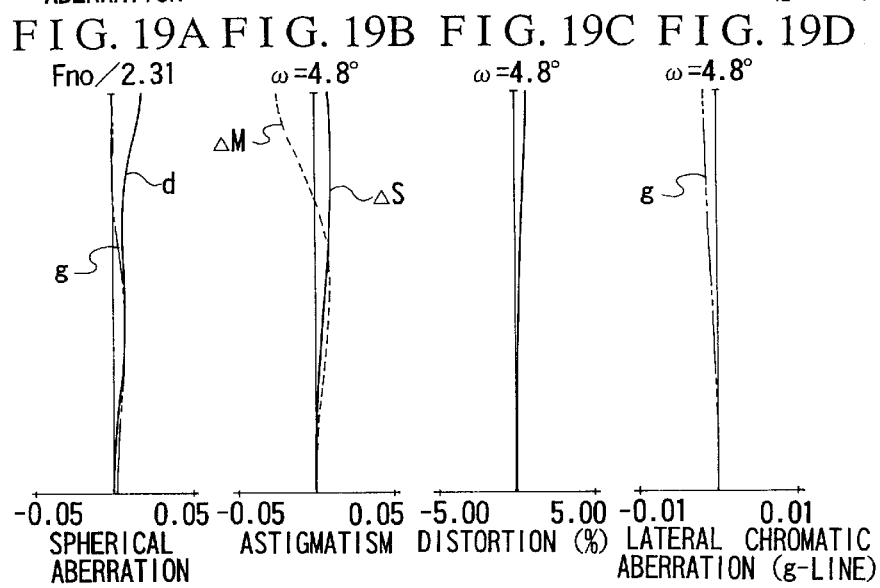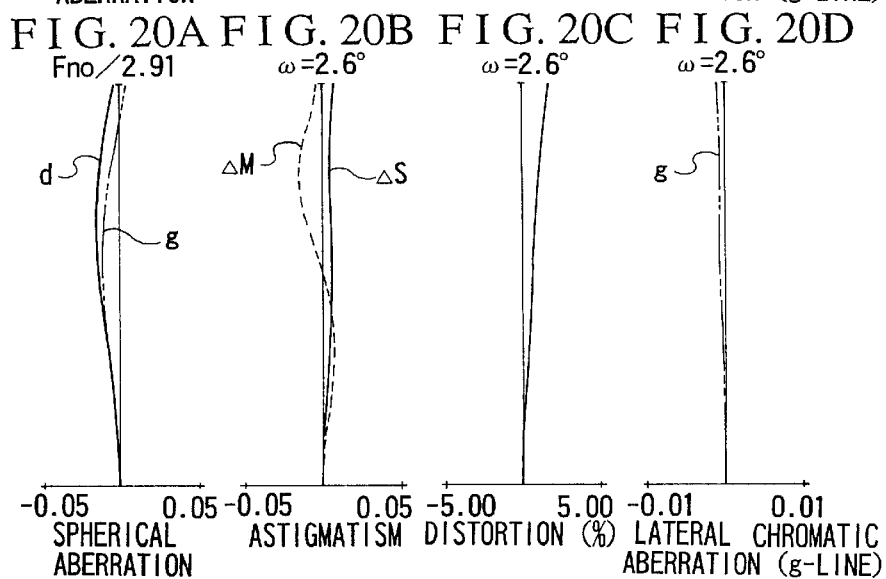

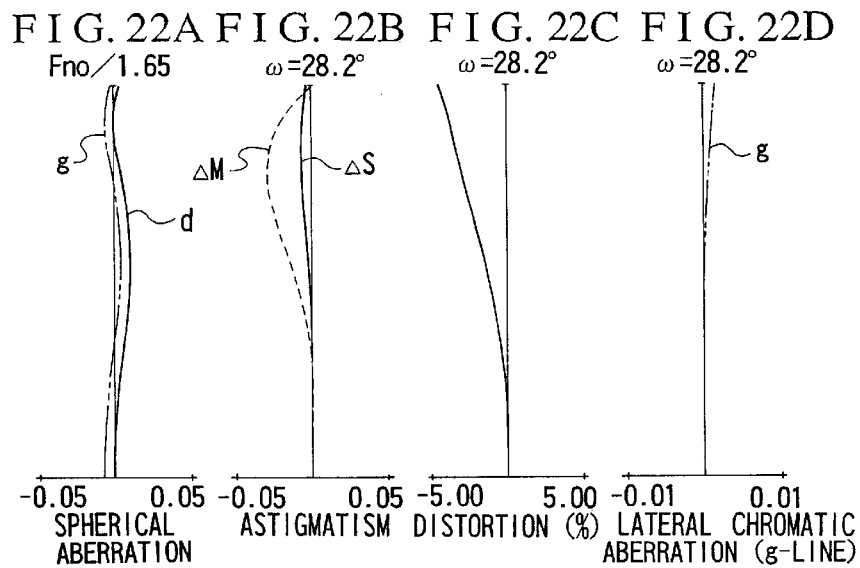
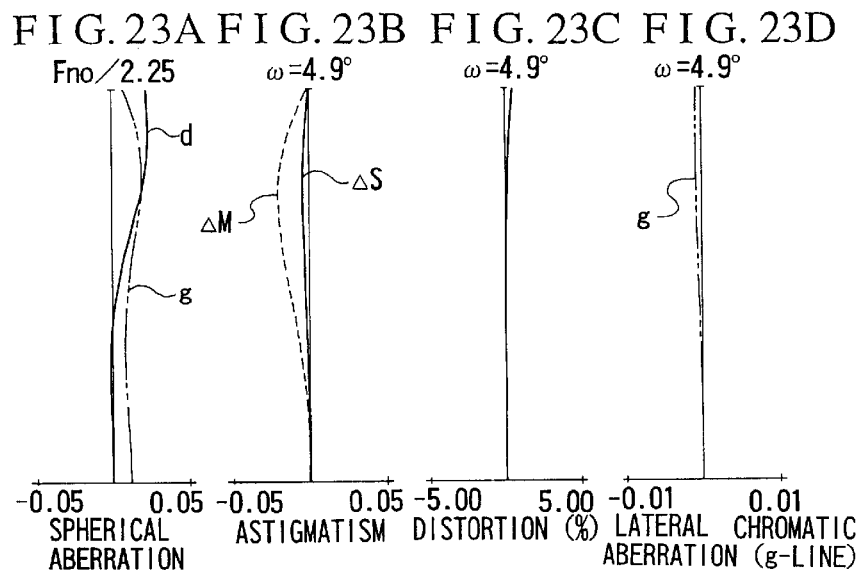
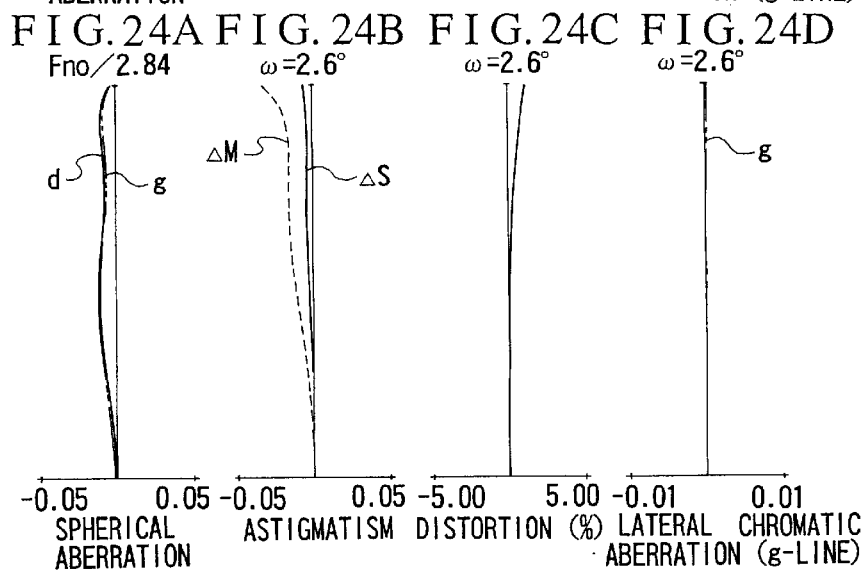

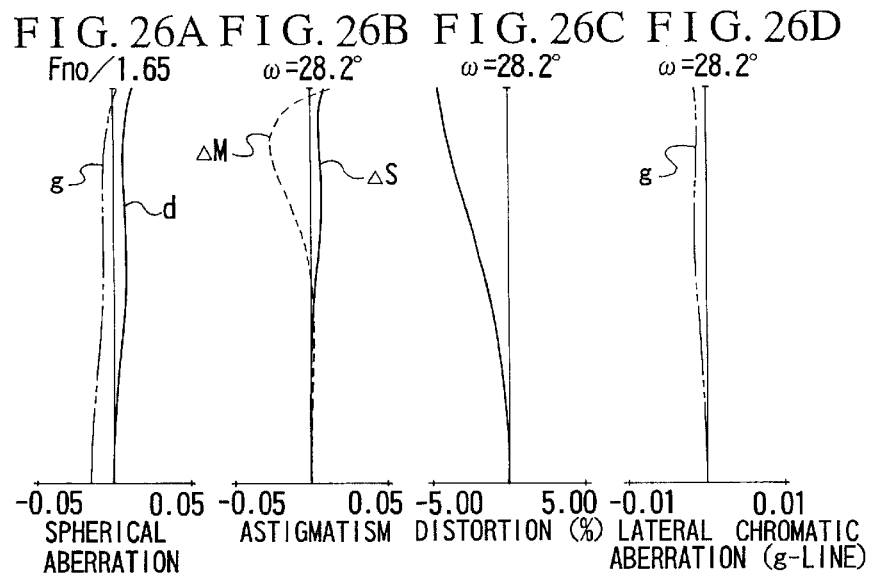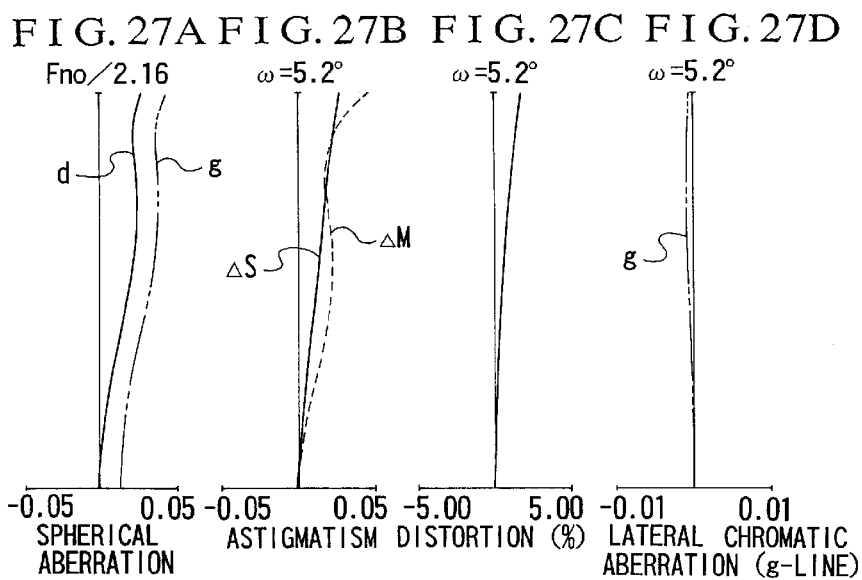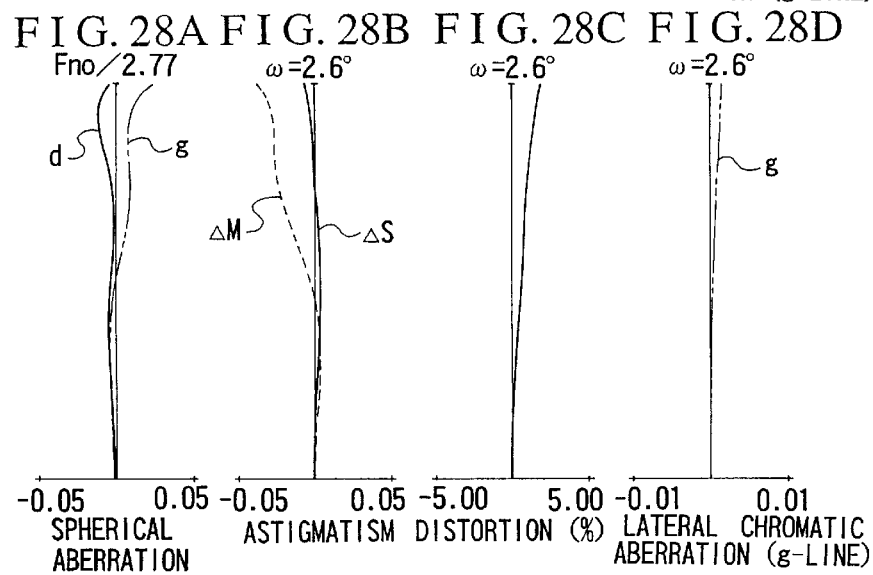

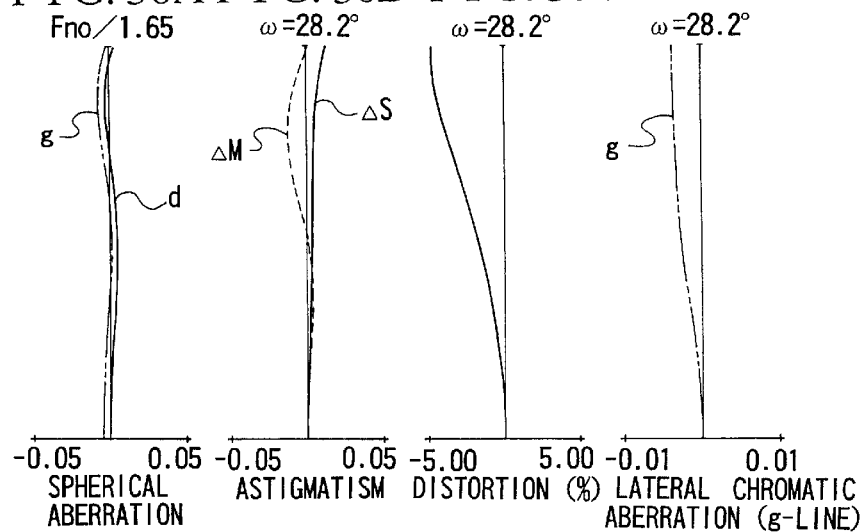
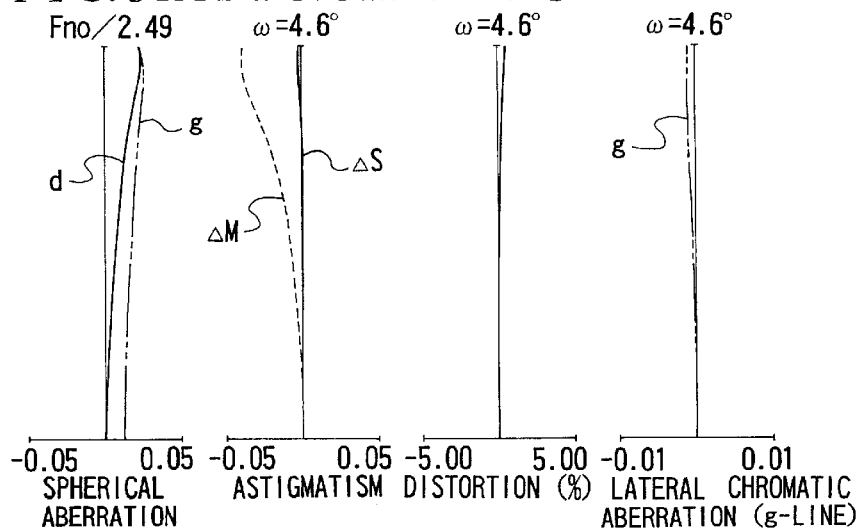
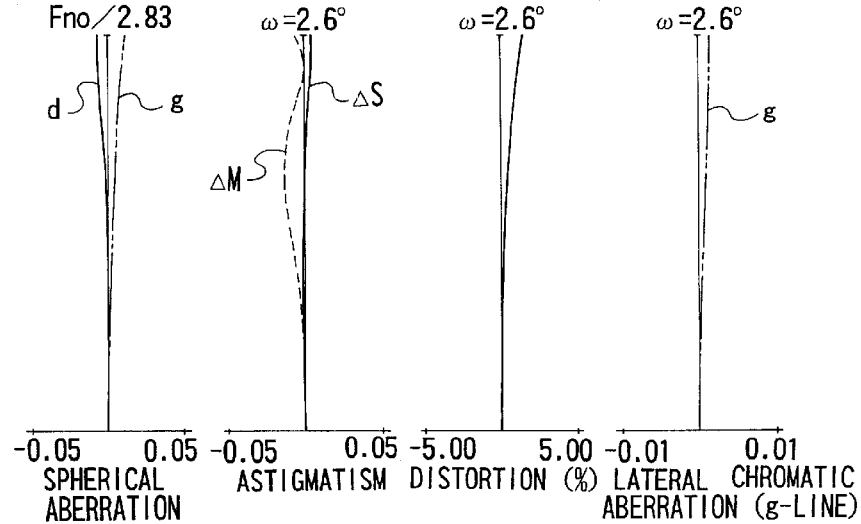

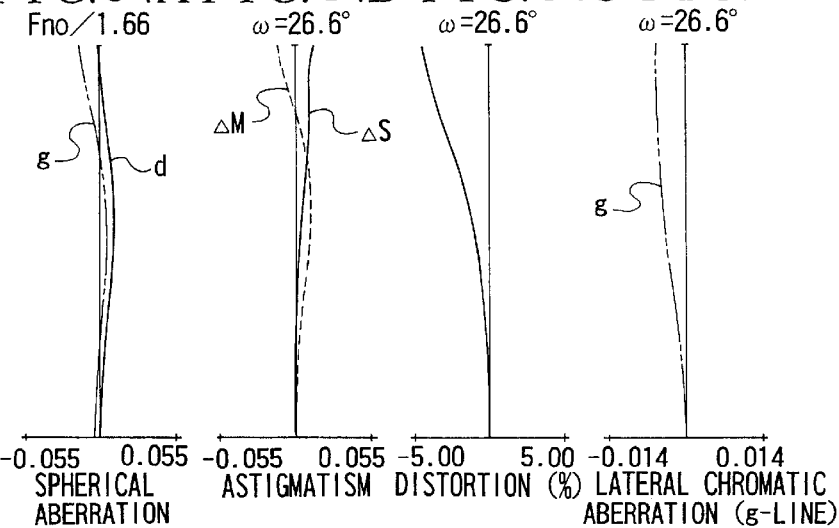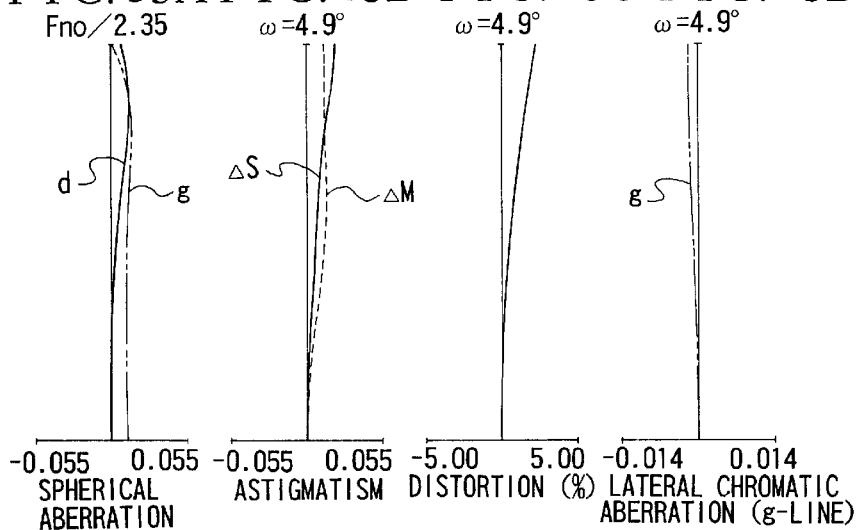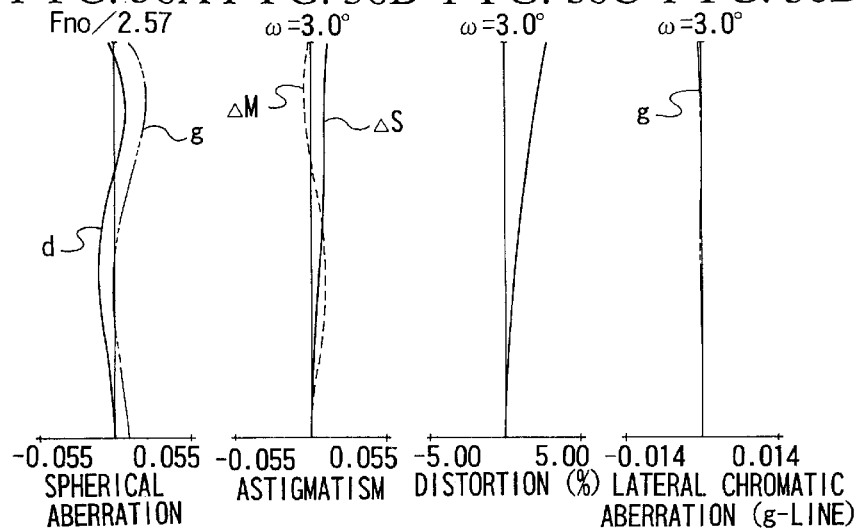

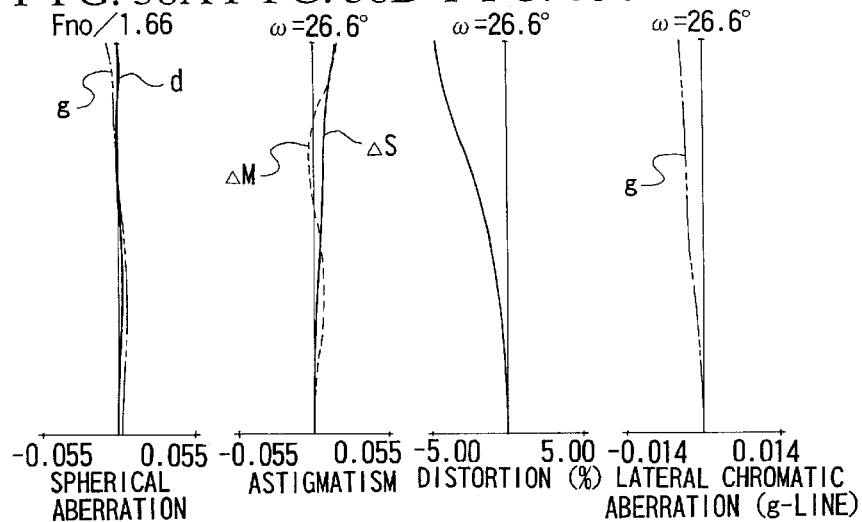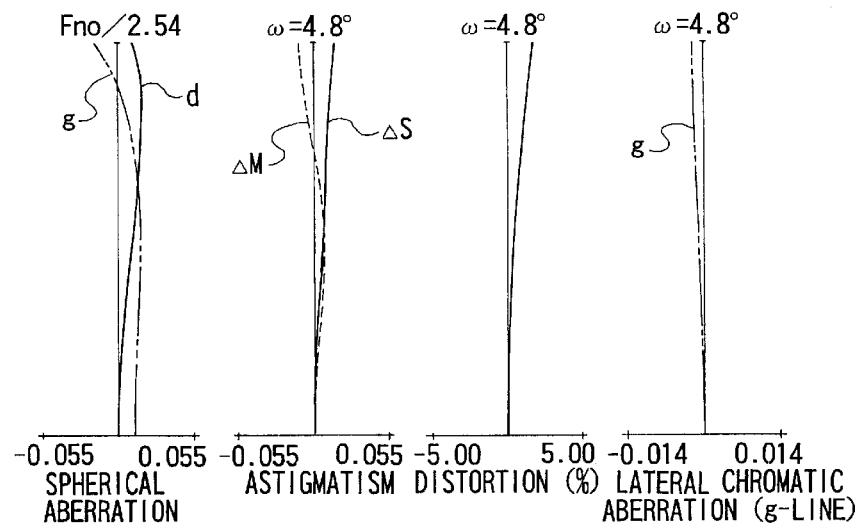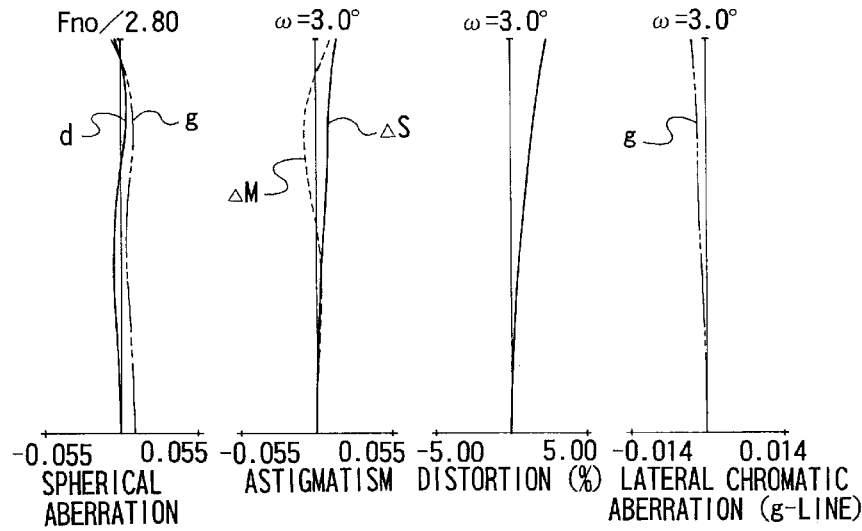

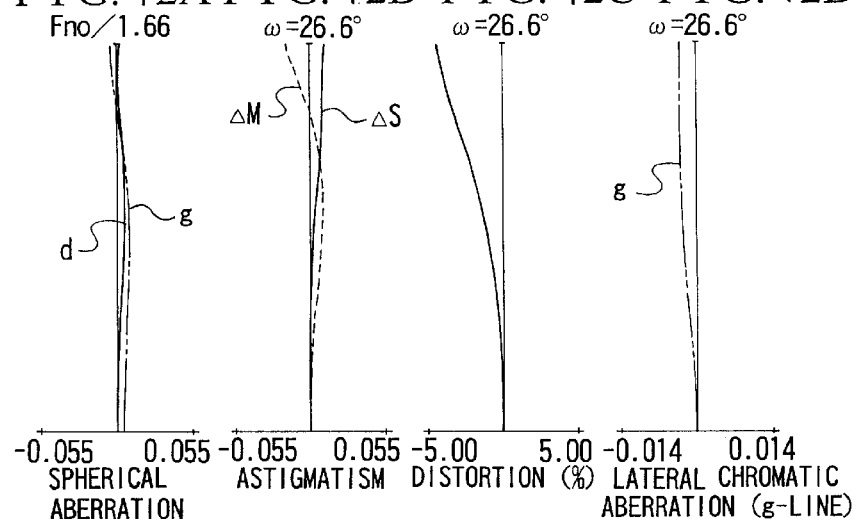
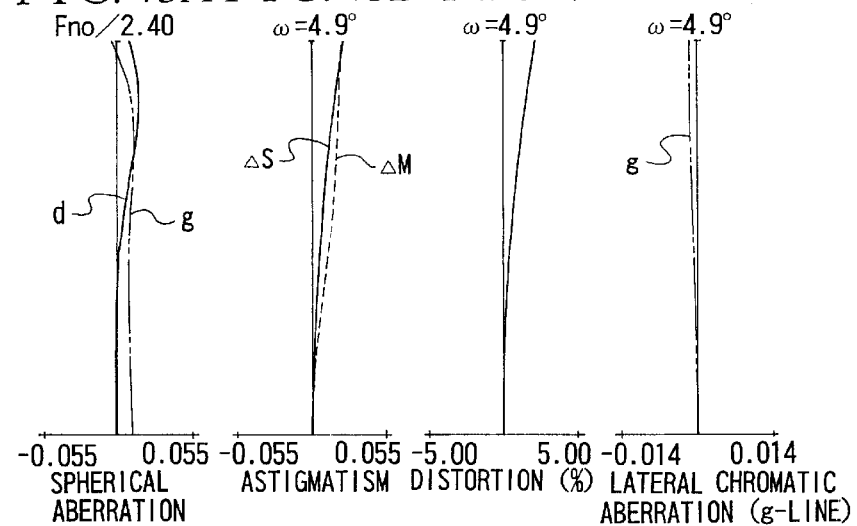
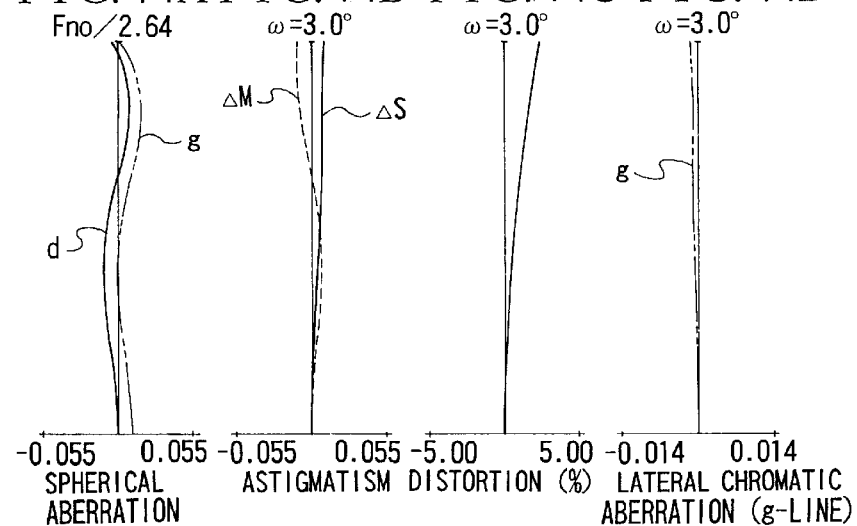

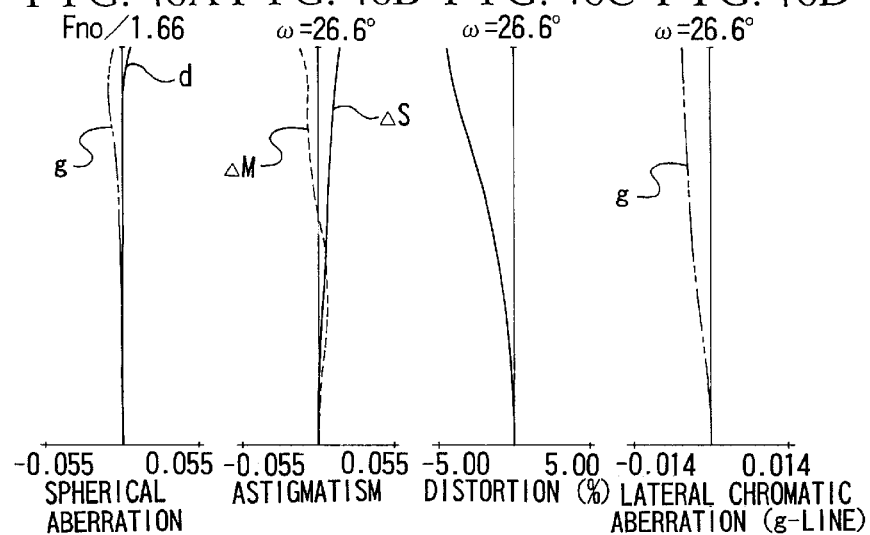
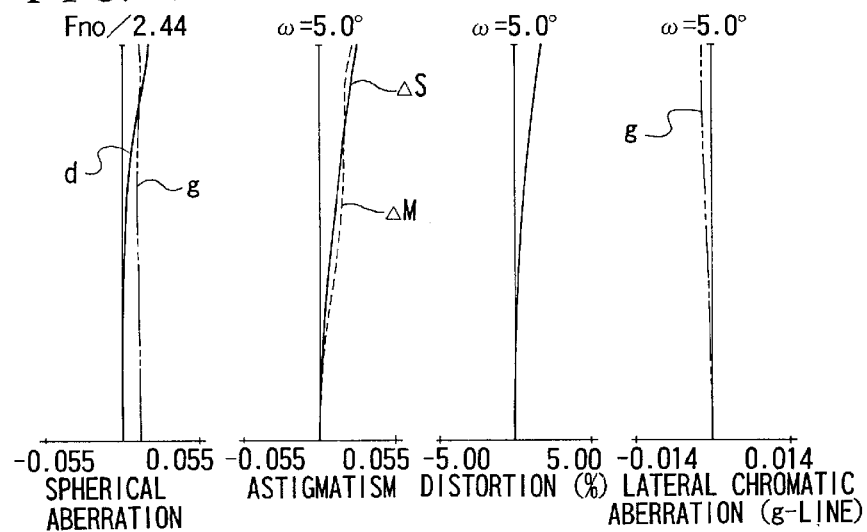
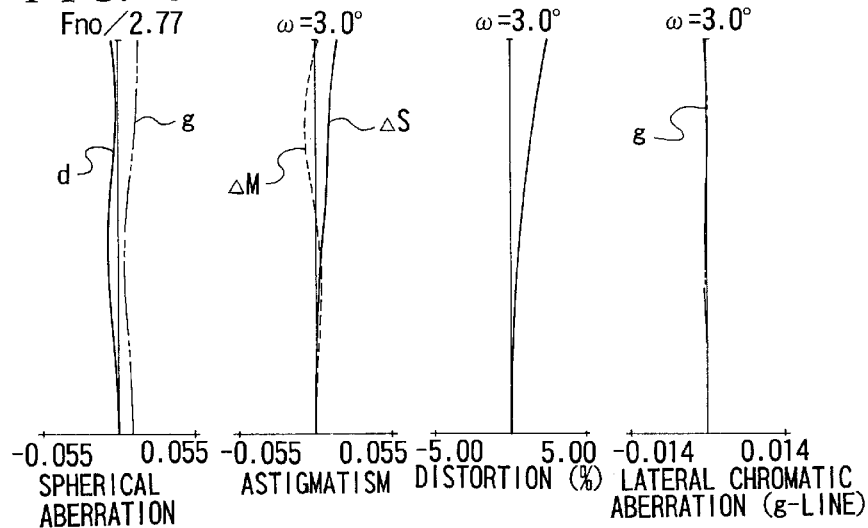

ZOOM LENS AND OPTICAL APPARATUS HAVING THE SAME

BACKGROUND OF THE INVENTION

1. Field of the Invention

The present invention relates to a zoom lens and an optical apparatus having the same, and more particularly to a zoom lens of the rear-focus type having a high variable magnification ratio and a large aperture ratio, the number of constituent lens elements of which is relatively small, and which is suited for use with a video camera, a film camera, a broadcasting camera, or the like, and an optical apparatus having the same.

2. Description of Related Art

Heretofore, in zoom lenses for use with photographic cameras, video cameras or the like, there have been proposed a variety of zoom lenses adopting the so-called rear-focus type lens, in which focusing is performed by moving a lens unit disposed behind a first lens unit, which is disposed on the object side. This is because the zoom lens of the rear-focus type has such advantages that a small driving force suffices for moving the focusing lens unit, which is relatively small and light, and rapid focusing can be attained, so that the zoom lens of the rear focus type matches an automatic focusing system.

Such zoom lenses of the rear focus type have been proposed, for example, in Japanese Laid-Open Patent Applications No. Sho 62-206516, No. Sho 62-24213, No. Sho 62-247316 and No. Hei 4-43311 (corresponding to U.S. Pat. No. 5,189,558). Each of these zoom lenses of the rear focus type comprises four lens units, i.e., in order from an object side, a first lens unit of positive refractive power, a second lens unit of negative refractive power, a third lens unit of positive refractive power and a fourth lens unit of positive refractive power, wherein the second lens unit is moved to effect a variation in magnification and the fourth lens unit is moved to compensate for the shift of an image plane due to the variation of magnification and to effect focusing.

Further, in Japanese Laid-Open Patent Application No. Sho 63-29718, there has been disclosed a zoom lens comprising, in order from an object side, a first lens unit of positive refractive power, a second lens unit composed of a negative lens, a negative lens and a positive lens, having a negative refractive power as a whole and arranged to be movable during a variation in magnification to mainly take charge of the variation of magnification, a third lens unit having a positive refractive power and including an aspheric surface, being followed by a relatively large air separation, and a fourth lens unit having a positive refractive power and arranged to move to compensate for the shift of an image plane due to the variation of magnification and to effect focusing.

In Japanese Laid-Open Patent Application No. Hei 5-72472 (corresponding to U.S. Patent No. 5,572,364), there has been disclosed a zoom lens unit of positive refractive power, a second lens unit of negative refractive power used for a variation in magnification, a fixed third lens unit of positive refractive power having a light condensing function, and a fourth lens of positive refractive power arranged to move along an optical axis so as to maintain the position of an image plane. In this zoom lens, the second lens unit is composed of a negative lens of meniscus form, a bi-concave lens and a positive lens, the third lens unit is composed of a single lens having one or more aspheric surfaces, and the fourth lens unit is composed of a lens having one or more aspheric surfaces.

In U.S. Patent No. 4,299,454, there has been disclosed a zoom lens comprising, in order from an object side, a positive first lens unit, a negative second lens unit and a positive rear lens unit, wherein a variation in magnification is effected by moving at least two lens units including the negative lens unit, and the negative second lens unit consists of, in order from the object side, first and second negative lenses and a positive doublet. In that U.S. Patent, there is disclosed no embodiment in which the second lens unit has an aspheric surface.

Further, in Japanese Laid-Open Patent Application No. Hei 8-292369 (corresponding to U.S. Pat. No. 5,940,221), there has been disclosed a zoom lens comprising four lens unit, i.e., in order from an object side, a first lens unit of positive refractive power, a second lens unit of negative refractive power having an aspheric surface, a third lens unit of positive refractive power having an aspheric surface, and a fourth lens unit of positive refractive power having an aspheric surface, wherein the second lens unit is moved to effect a variation in magnification and the fourth lens unit is moved to compensate for the shift of an image plane due to the variation of magnification and to effect focusing.

Further, in the so-called four-unit zoom lens of rear focus type, there is a method of strengthening the refractive power of a second lens unit used for a variation in magnification, so as to reduce the amount of movement of the second lens unit along an optical axis required for securing a predetermined variable magnification ratio.

In the zoom lens adopting the above method, the separation between the first lens unit and the second lens unit, which serve as a magnification varying system, is shortened, and the distance from the stop to the first lens unit is shortened, so that the diameter of the front lens member can be reduced. Accodingly, because it becomes possible to make thin the thickness of the first lens unit, it is possible to minimize the entirety of the lens system.

Further, as one of methods of minimizing the third lens unit and the fourth lens unit, which serve as an image forming system, there is a method of shortening the real distance interval between the third lens unit and the fourth lens unit by constructing the third lens unit with a positive lens and a negative lens in order from an object side, i.e., making the third lens unit into a telephoto-lens type, and shifting the principal point position of the third lens unit to the object side. Zoom lenses adopting such a method have been proposed, for example, in Japanese Laid-Open Patent Application No. Hei 5-19165 (corresponding to U.S. Pat. No. 5,231,540), Japanese Laid-Open Patent Application No. Hei 5-297275 (corresponding to U.S. Pat. No. 5,396,367), Japanese Laid-Open Patent Application No. Hei 5-60973, Japanese Laid-Open Patent Application No. Hei 5-60974, Japanese Laid-Open Patent Application No. Hei 5-107473, Japanese Laid-Open Patent Application No. Hei 6-130297 (corresponding to U.S. Pat. No. 5,396,367), Japanese Laid-Open Patent Application No. Hei 8-304700, U.S. Pat. Nos. 5,189,558, and 5,396,367.

BRIEF SUMMARY OF THE INVENTION

It is an object of the invention to improve the conventional zoom lens of the rear-focus type and provide a zoom lens that has a novel construction and a further-improved performance, and an optical apparatus having the zoom lens.

To attain the above object, in accordance with a first aspect of the invention, there is provided a zoom lens comprising, in order from an object side to an image side, a first lens unit of positive refractive power, a second lens unit of negative refractive power, a third lens unit of positive refractive power and a fourth lens unit of positive refractive power, wherein a variation in magnification from a wide-angle end to a telephoto end is effected by moving the second lens unit toward the image side, and shifting of an image plane due to the variation of magnification is compensated for by moving the fourth lens unit, and focusing is effected by moving the fourth lens unit, a stop being disposed on the most object side of the third lens unit, the third lens unit comprising a positive lens (G3F) disposed on the image side of the stop and just behind the stop and having a convex lens surface facing the object side, at least one of lens surfaces of the positive lens (G3F) being an aspheric surface, and a negative lens (G3R) of meniscus form disposed on the most image side and having a concave surface facing the image side, the curvature of which is stronger than that of an opposite surface thereof, the fourth lens unit consisting of a cemented lens composed of a positive lens, both lens surfaces of which are convex and at least one lens, surface of which is an aspheric surface and a negative lens, and the following conditions being satisfied:

$$0.37 < \beta 4T < 0.49$$

$$0.6 < f3/f4 < 1.15$$

where $\beta 4T$ is a magnification of the fourth lens unit obtained when focusing on an infinitely distant object at the telephoto end, and f3 and f4 are focal lengths of the third lens unit and the fourth lens unit, respectively.

In accordance with a second aspect of the invention, there is provided a zoom lens comprising, in order from an object side to an image side, a first lens unit of positive refractive power, a second lens unit of negative refractive power, a third lens unit of positive refractive power and a fourth lens unit of positive refractive power, wherein a variation in magnification from a wide-angle end to a telephoto end is effected by moving the second lens unit toward the image side, shifting of an image plane due to the variation in magnification is compensated for by moving the fourth lens unit and focusing is effected by moving the fourth lens unit, a stop being disposed on the most object side of the third lens unit, the third lens unit comprising a positive lens (G3F) disposed on the image side of the stop and just behind the stop and having a convex lens surface facing the object side, at least one of lens surfaces of the positive lens (G3F) being an aspheric surface, and a negative lens (G3R) of meniscus form disposed on the most image side and having a concave surface facing the image side, the curvature of which is stronger than that of an opposite surface thereof, the fourth lens unit consisting of a cemented lens composed of a positive lens, both lens surfaces of which are convex and at least one lens surface of which is an aspheric surface and a negative lens, and the following condition being satisfied:

$$0.37 < \beta 4T < 0.43$$

where $\beta 4T$ is a magnification of the fourth lens unit obtained when focusing on an infinitely distant object at the telephoto end.

In accordance with a third aspect of the invention, there is provided a zoom lens comprising, in order from an object side to an image side, a first lens unit of positive refractive power, a second lens unit of negative refractive power, a third lens unit of positive refractive power and a fourth lens unit of positive refractive power, wherein a variation in magnification from a wide-angle end to a telephoto end is effected by moving the second lens unit toward the image side, shifting of an image plane due to the variation of magnification is compensated for by moving the fourth lens unit and focusing is effected by moving the fourth lens unit, a stop being disposed on the most object side of the third lens unit, the third lens unit comprising a positive lens (G3F) disposed on the image side of the stop and just behind the stop and having a convex lens surface facing the object side, at least one of the lens surfaces of the positive lens (G3F) being an aspheric surface, and a negative lens (G3R) of meniscus form disposed on the most image side and having a concave surface facing the image side, the curvature of which is stronger than that of an opposite surface thereof, the fourth lens unit consisting of a cemented lens composed of a positive lens, both lens surfaces of which are convex and at least one lens surface of which is an aspheric surface and a negative lens, and the following conditions being satisfied:

$$0.28 < \{|f2/fA|\} \times FNW < 0.51$$

$$0.3 < Rr/\{(Nr-1)fA\} < 0.6$$

where $fA = \sqrt{fw \cdot ft}$, and where fw and ft are focal lengths of the zoom lens at the wide-angle end and the telephoto end, respectively, FNW is an F-number at the wide-angle end, Rr is the radius of curvature of the lens surface on the image side of the negative lens (G3R), Nr is the refractive index of material of the negative lens (G3R), and f2 is the focal length of the second lens unit.

In accordance with a fourth aspect of the invention, there is provided a zoom lens comprising, in oder from an object side to an image side, a first lens unit of positive refractive power, a second lens unit of negative refractive power, a third lens unit of positive refractive power and a fourth lens unit of positive refractive power, wherein a variation in magnification from a wide-angle end to a telephoto end is effected by moving the second lens unit toward the image side, shifting of an image plane due to the variation of magnification is compensated for by moving the fourth lens unit and focusing is effected by moving the fourth lens unit, a stop being disposed on the most object side of the third lens unit, the third lens unit comprising a positive lens (G3F) disposed on the image side of the stop and just behind the stop and having a convex lens surface facing the object side, at least one of lens surfaces of the positive lens (G3F) being an aspheric surface, and a negative lens (G3R) of meniscus form disposed on the most image side and having a concave surface facing the image side, the curvature of which is stronger than that of an opposite surface thereof, the fourth lens unit consisting of a cemented lens composed of a positive lens, both lens surfaces of which are convex and at least one lens surface of which is an aspheric surface and a negative lens, and the following conditions being satisfied:

$$0.28 < \{|f2/fA|\} \times FNW < 0.51$$

$$0.6 < f3/f4 < 1.15$$

where $fA = \sqrt{fw \cdot ft}$, and where fw and ft are focal lengths of the zoom lens at the wide-angle end and the telephoto end, respectively, FNW is the F-number at the wide-angle end, and f2, f3 and f4 are focal lengths of the second lens unit, the third lens unit and the fourth lens unit, respectively.

In accordance with a fifth aspect of the invention, there is provided a zoom lens comprising, in order from an object side to an image side, a first lens unit of positive refractive power, a second lens unit of negative refractive power, a third lens unit of positive refractive power and a fourth lens unit of positive refractive power, wherein a variation in magnification from a wide-angle end to a telephoto end is effected by increasing an interval between the first lens unit and the second lens unit and decreasing an interval between the second lens unit and the third lens unit, shifting of an image plane due to the variation of magnification is compensated for by moving the fourth lens unit and focusing is effected by moving the fourth lens unit, the third lens unit consisting of, in order from the object side to the image side, a stop, a cemented lens composed of a positive lens, both lens surfaces of which are convex and a negative lens, and a negative lens of meniscus form having a concave surface facing the image side, and the fourth lens unit consisting of a positive single lens having a convex surface facing the object side or a cemented lens composed of a positive lens and a negative lens.

In accordance with a sixth aspect of the invention, there is provided a zoom lens comprising, in order from an object side to an image side, a first lens unit of positive refractive power, a second lens unit of negative refractive power, a third lens unit of positive refractive power and a fourth lens unit of positive refractive power, wherein a variation in magnification from a wide-angle end to a telephoto end is effected by moving the second lens unit toward the image side, shifting of an image plane due to the variation of magnification is compensated for by moving the fourth lens unit and focusing is effected by moving the fourth lens unit, the first lens unit comprising two or more positive lenses, the third lens unit having a stop disposed on the most object side thereof and comprising a positive lens having a convex surface facing the object side, the curvature of which is stronger than that of an opposite surface thereof, and a negative lens of meniscus form having a concave surface facing the image side, the curvature of which is stronger than that of an opposite surface thereof, the fourth lens unit consisting of a positive single lens having a convex surface facing the object side, the curvature of which is stronger than that of an opposite surface thereof, and the following condition being satisfied:

$$0.28 < |f2/fA| \times FNoW < 0.52$$

where $fA = \sqrt{fw \cdot ft}$, and where fw and ft are focal lengths of the zoom lens at the wide-angle end and the telephoto end, respectively, FNoW is the F-number at the wide-angle end, and f2 is a focal length of the second lens unit.

In accordance with a seventh aspect of the invention, there is provided a zoom lens comprising, in order from an object side to an image side, a first lens unit of positive refractive power, a second lens unit of negative refractive power a third lens unit of positive refractive power and a fourth lens unit of positive refractive power, wherein a variation in magnification from a wide-angle end to a telephoto end is effected by moving the second lens unit toward the image side, shifting of an image plane due to the variation of magnification from a wide-angle end to a telephoto end is effected by focusing is effected by moving the fourth lens unit, the third lens unit having a stop disposed on the most object side thereof and comprising a positive lens having a convex surface facing the object side, the curvature of which is stronger than that of an opposite surface thereof, and a negative lens of meniscus form having a concave surface facing the image side, the curvature of which is stronger than that of an opposite surface thereof, the fourth lens unit consisting of a positive single lens having a convex surface facing the object side, the curvature of which is stronger than that of an opposite surface thereof, and the following conditions being satisfied:

$$0.28 < |f2/fA| \times FNoW < 0.52$$

$$0.6 < f3/f4 < 1.25$$

where $fA = \sqrt{fw \cdot ft}$, and where fw and ft are focal lengths of the zoom lens at the wide-angle end and the telephoto end, respectively, FNoW is the F-number at the wide-angle end, and f2, f3 and f4 are focal lengths of the second lens unit, the third lens unit and the fourth lens unit, respectively.

In accordance with an eight aspect of the invention, there is provided a zoom lens comprising, in order from an object side to an image side, a first lens unit of positive refractive power, a second lens unit of negative refractive power, a third lens unit of positive refractive power and a fourth lens unit of positive refractive power, wherein a variation in magnification from a wide-angle end to a telephoto end is effected by moving the second lens unit toward the image side, shifting of an image plane due to the variation of magnification is compensated for by moving the fourth lens unit and focusing is effected by moving the fourth lens unit, the third lens unit having a stop disposed on the most object side thereof and comprising a positive lens unit having a stop surface facing the object side, the curvature of which is stronger than that of an opposite surface thereof, and a negative lens of meniscus form having a concave surface facing the image side, the curvature of which is stronger than that of an opposite surface thereof, the fourth lens unit consisting of a positive single lens having a convex surface facing the object side, the curvature of which is stronger than that of an opposite surface thereof, and the following condition being satisfied:

$$1.80 < N2f < 1.95$$

where N2f is the refractive index of material of a negative lens disposed on the most object side of the second lens unit.

Further, there is provided an optical apparatus comprising a zoom lens according to any one of the first to eighth aspects of the invention.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 2A to 2D are aberration diagrams showing the various aberrations at the wide-angle end of the zoom lens according to the first embodiment.

FIGS. 3A to 3D are aberration diagrams showing the various aberrations at the middle focal length position of the zoom lens according to the first embodiment.

FIGS. 4A to 4D are aberration diagrams showing the various aberrations at the telephoto end of the zoom lens according to the first embodiment.

FIGS. 6A to 6D are aberration diagrams showing the various aberrations at the wide-angle end of the zoom lens according to the second embodiment.

FIGS. 7A to 7D are aberration diagrams showing the various aberrations at the middle focal length position of the zoom lens according to the second embodiment.

FIGS. 8A to 8D are aberration diagrams showing the various aberrations at the telephoto end of the zoom lens according to the second embodiment.

FIGS. 10A to 10D are aberration diagrams showing the various aberrations at the wide-angle end of the zoom lens according to the third embodiment.

FIGS. 11A to 11D are aberration diagrams showing the various aberrations at the middle focal length position of the zoom lens according to the third embodiment.

FIGS. 12A to 12D are aberration diagrams showing the various aberrations at the telephoto end of the zoom lens according to the third embodiment.

FIGS. 14A to 14D are aberration diagrams showing the various aberrations at the wide angle end of the zoom lens according to the fourth embodiment.

FIGS. 15A to 15D are aberration diagrams showing the various aberrations at the middle focal length position of the zoom lens according to the fourth embodiment.

FIGS. 16A to 16D are aberration diagrams showing the various aberrations at the telephoto end of the zoom lens acording to the fifth embodiment.

FIGS. 18A to 18D are aberration diagrams showing the various aberrations at the wide-angle end of the zoom lens according to the fifth embodiment.

FIGS. 19A to 19D are aberration diagrams showing the various aberrations at the middle focal length position of the zoom lens according to the fifth embodiment.

FIGS. 20A to 20D are aberration diagrams showing the various aberrations at the telephoto end of the zoom lens according to the fifth embodiment.

FIGS. 22A to 22D are aberration diagrams showing the various aberrations at the wide-angle end of the zoom lens according to the sixth embodiment.

FIGS. 23A to 23D are aberration diagrams showing the various aberrations at the middle focal length position of the zoom lens according to the sixth embodiment.

FIGS. 24A to 24D are aberration diagrams showing the various aberrations at the telephoto end of the zoom lens according to the sixth embodiment.

FIGS. 26A to 26D are aberration diagrams showing the various aberrations at the middle focal length position of the zoom lens according to the seventh embodiment.

FIGS. 27A to 27D are aberration diagrams showing the various aberrations at the middle focal length position of the zoom lens according to the seventh embodiment.

FIGS. 28A to 28D are aberration diagrams showing the various aberrations at the telephoto end of the zoom lens according to the seventh embodiment.

FIGS. 30A to 30D are aberration diagrams showing the various aberrations at the wide-angle end of the zoom lens according to the eight embodiment.

FIGS. 31A to 31D are aberration diagrams showing the various aberrations at the middle focal length position of the zoom lens according to the eight embodiment.

FIGS. 32A to 32D are aberration diagrams showing the various aberrations at the telephoto end of the zoom lens according to the eight embodiment.

FIGS. 34A to 34D are aberration diagrams showing the various aberrations at the wide-angle end of the zoom lens according to the ninth embodiment.

FIGS. 35A to 35D are aberration diagrams showing the various aberrations at the middle focal length position of the zoom lens according to the ninth embodiment.

FIGS. 36A to 36D are aberration diagrams showing the various aberrations at the telephoto end of the zoom lens according to the ninth embodiment.

FIGS. 38A to 38D are aberratgion diagrams showing the various aberrations at the wide-angle end of the zoom lens according to the tenth embodiment.

FIGS. 39A to 39D are aberration diagram showing the various aberrations at the telephoto end of the zoom lens according to the tenth embodiment.

FIGS. 40A to 40D are aberration diagrams showing the various aberrations at the telephoto end of the zoom lens according to the tenth embodiment.

FIGS. 42A to 42D are aberration diagrams showing the various aberrations at the wide-angle end of the zoom lens according to the eleventh embodiment.

FIGS. 43A to 43D are aberration diagrams showing the various aberrations at the middle focal length position of the zoom lens according to the eleventh embodiment.

FIGS. 44A to 44D are aberration diagrams showing the various aberrations at the telephoto end of the zoom lens according to the twelfth embodiment.

FIGS. 46A to 46D are aberration diagrams showing the various aberrations at the wide-angle end of the zoom lens according to the twelfth embodiment.

FIGS. 47A to 47D are aberration diagrams showing the various aberrations at the middle focal length position of the zoom lens according to the twelfth embodiment.

FIGS. 48A to 48D are aberration diagrams showing the various aberrations at the telephoto end of the zoom lens according to the twelfth embodiment.

DETAILED DESCRIPTION OF THE INVENTION

Hereinafter, preferred embodiments of the invention will be described in detail with reference to the drawings.

Figure 1:
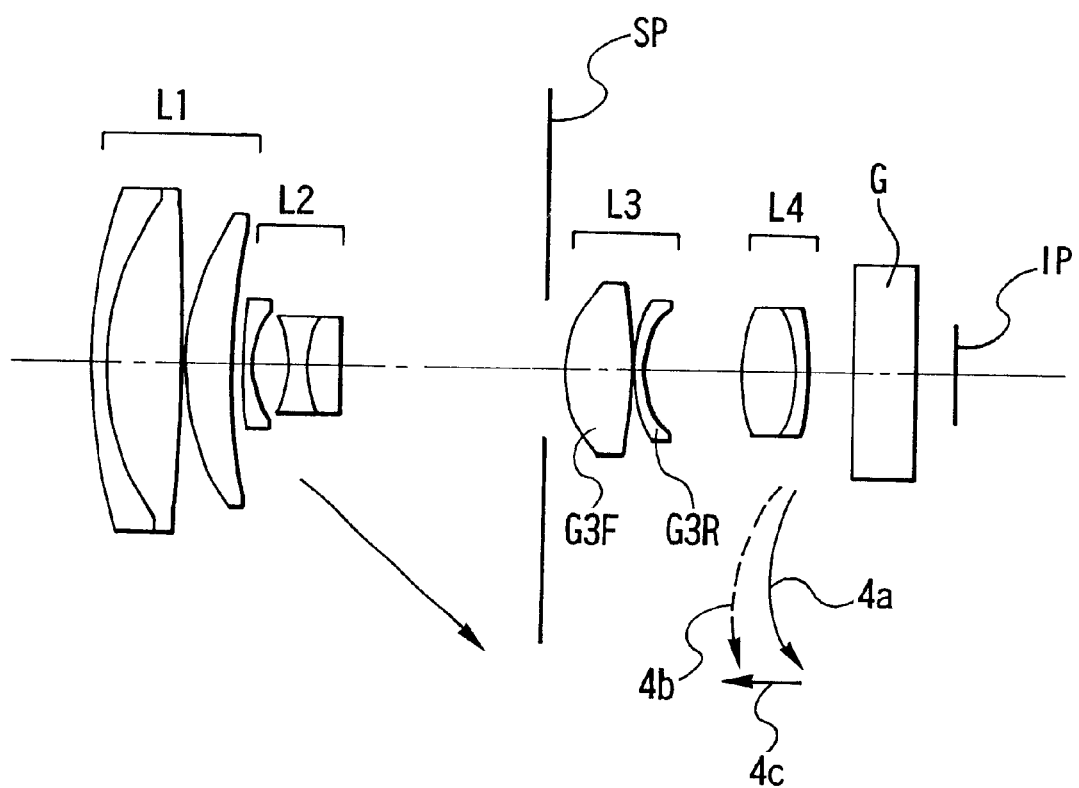
FIG. 1 is a sectional view showing a zoom lens according to a first embodiment of the invention.
Figure 5:
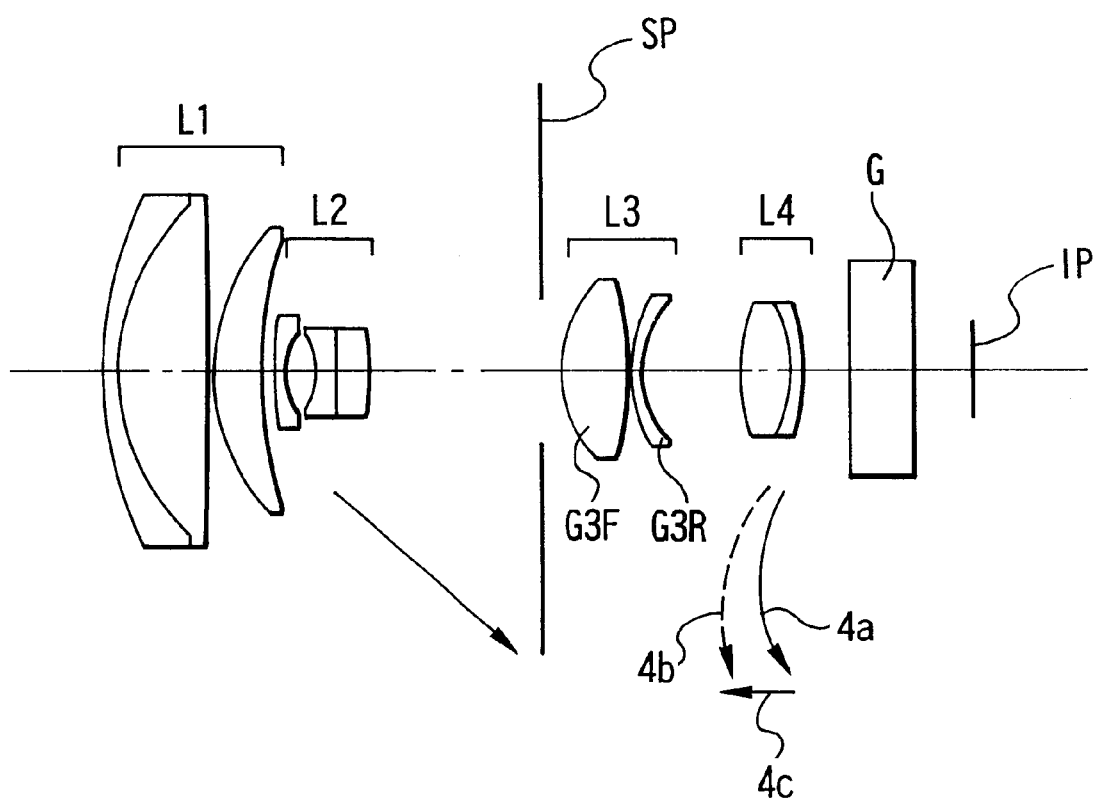
FIG. 5 is a sectional view showing a zoom lens according to a second embodiment of the invention.
Figure 9:
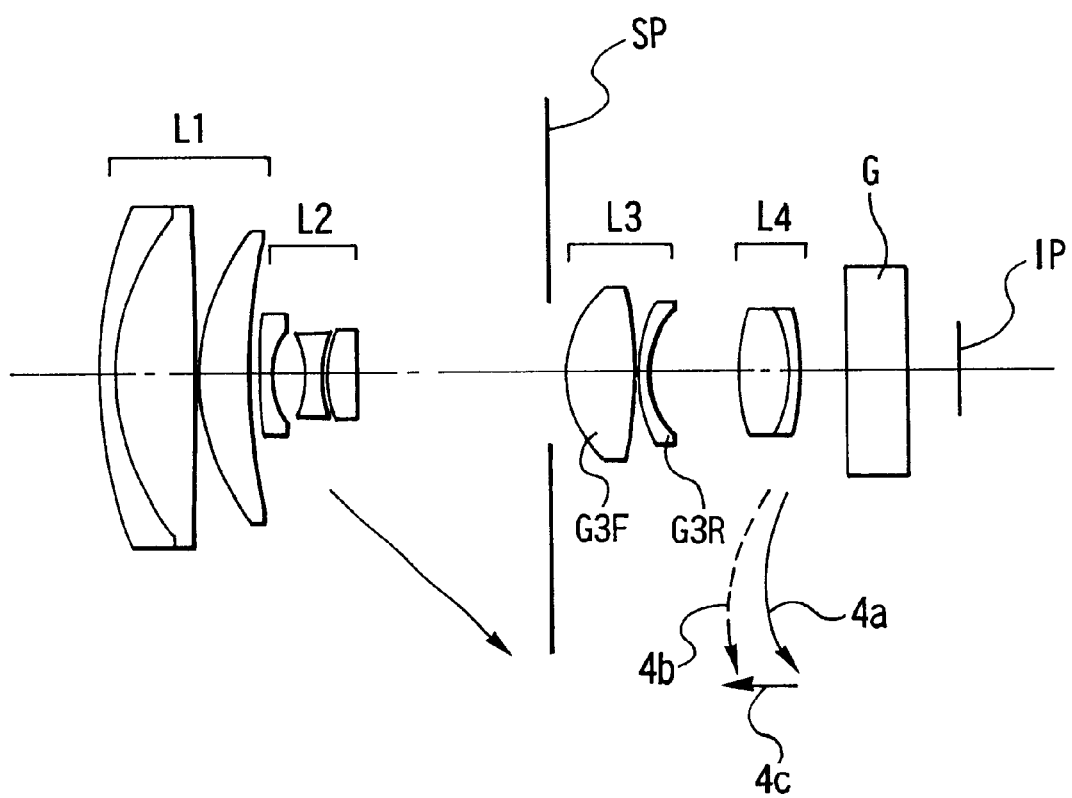
FIG. 9 is a sectional view showing a zoom lens according to a third embodiment of the invention.
Figure 13:
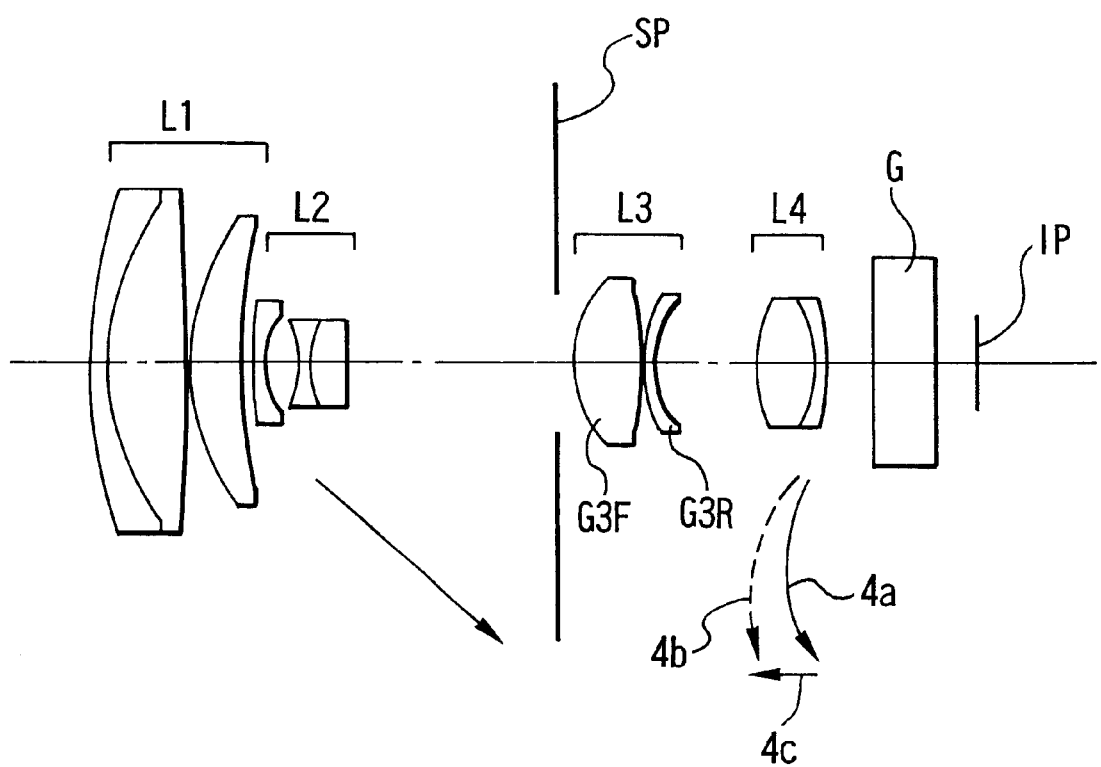
FIG. 13 is a sectional view showing a zoom lens according to a fourth embodiment of the invention.

FIG. 1 is a sectional view showing the essential parts of a zoom lens of rear focus type according to a first embodiment of the invention. FIGS. 2A to 2D, 3A to 3D and 4A to 4D are aberration diagrams showing the various aberrations in the zoom positions of the wide-angle end, the middle focal length and the telephoto end, respectively, of the zoom lens according to the first embodiment. FIG. 5 is a sectional view showing the essential parts of a zoom lens of rear focus type according to a second embodiment of the invention. FIGS. 6A to 6D, 7A to 7D and 8A to 8D are aberration diagrams showing the various aberrations in the zoom positions of the wide-angle end, the middle focal length and the telephoto end, respectively, of the zoom lens according to the second embodiment. FIG. 9 is a sectional view showing the essential parts of a zoom lens of rear focus type according to a third embodiment of the invention. FIGS. 10A to 10D, 11A to 11D and 12A to 12D are aberration diagrams showing the various aberrations in the zoom positions of the wide-angle end, the middle focal length and the telephoto end, respectively, of the zoom lens according to the third embodiment. FIG. 13 is a sectional view showing the essential parts of a zoom lens of rear focus type according to a fourth embodiment of the invention. FIGS. 14A to 14D, 15A to 15D and 16A to 16D are aberration diagrams showing the various aberrations in the zoom positions of the wide-angle end, the middle focal length and the telephoto end, respectively, of the zoom lens according to the fourth embodiment.

In FIGS. 1, 5, 9 and 13, L1 denotes a first lens unit of positive refractive power, L2 denotes a second lens unit of negative refractive power, L3 denotes a third lens unit of positive refractive power, and L4 denotes a fourth lens unit of positive refractive power. SP stands for an aperture stop, which is disposed in front of the third lens unit L3. G stands for a glass block, such as a color separation prism, a fce plate, a filter or the like. IP stands for an image plane, on which an image sensor, such as a CCD, is disposed.

In the first to fourth embodiments, the second lens unit is moved toward the image side as indicated by the arrow during a variation in magnification from the wide-angle end to the telephoto end, and, at the same time, the shifting of an image plane due to the variation of magnification is compensated for by moving the fourh lens unit along a locus convex toward the object side.

Further, the fourth lens unit is moved along the optical axis to effect focusing, so that the rear-focus type zoom lens is adopted. A solid-line curve 4a and a dashed-line curve 4b shown in each of FIGS. 1, 5, 9 and 13 indicate movement loci of the fourth lens unit for compensating for the shift of an image plane due to the variation of magnification from the wide-angle end to the telephoto end when focusing is performed on an infinitely distant object and a nearest object, respectively. Incidentally, the first lens unit and the third lens unit remain stationary during the variation in magnification and during focusing.

In the first to fourth embodiments, the shift of an image plane due to the variation of magnification is compensated for by moving the fourth lens unit, and focusing is effected by moving the fourth lens unit. In particular, as indicated by the solid-line curve 4a and the dashed-line curve 4b shown in each of FIGS. 1, 5, 9 and 13, the fourth lens unit is moved along a locus convex toward the object side during the variation of magnification from the wide-angle end to the telephoto end. This arrangement makes it possinle to effectively utilize a space between the third lens unit and the fourth lens unit, thereby advantageously attaining the shortening of the total length of the zoom lens.

In the first to fourth embodiments, when focusing from an infinitely distant object to a nearest object is performed, for example, in the telephoto end, the fourth lens unit is drawn out forward as indicated by a straight line 4c shown in FIGS. 1, 5, 9 and 13. Further, the zoom lens of the rear focus type according to each of the first to fourth embodiments has such a basic construction that the third lens unit has a stop disposed on the most object side thereof, and comprises a positive lens G3F disposed on the image side of the stop and just behind the stop and having a convex lens surface facing the object side, at least one of lens surfaces of the positive lens G3F being an aspheric surface, and a negative lens G3R of meniscus form disposed on the most image side and having a concave surface facing the image side, the curvature of which is stronger than that of an opposite surface thereof, and the fourth lens unit consists of a cemented lens composed of a positive lens, both lens surfaces of which are convex and at least one lens surface of which is an aspheric surface and a negative lens. Incidentally, among the constituent elements described above, the aspheric surface does not need to be provided, although the optical performance may be somewhat lowered.

While the zoom lens of rear focus type according to each of the first to fourth embodiments has the above-described basic construction, zoom lenses according to first to fourth aspects of the invention have the following characteristic features.

(A1) According to the first aspect of the invention, the following conditions are satisfied:

$$0.37 < \beta 4T < 0.49 \qquad (1a)$$

$$0.6 < f3/f4 < 1.15 \qquad (1b)$$

where β4T is a magnification of the fourth lens unit obtained when focusing on an infinitely distant object in the telephoto end, and f3 and f4 are focal lengths of the third lens unit and the fourth lens unit, respectively.

(A2) According to the second aspect of the invention, the following condition is satisfied:

$$0.37 < \beta 4T < 0.43 \qquad (2a)$$

where β4T is a magnification of the fourth lens unit obtained when focusing on an infinitely distant object in the telephoto end.

(A3) According to the third aspect of the invention, the following conditions are satisfied:

$$0.28 < \{|f2/fA|\} \times FNW < 0.51 \qquad (3a)$$

$$0.3 < Rr/\{(Nr-1)fA\} < 0.6 \qquad (3b)$$

where $fA = \sqrt{fw \cdot ft}$, and where fw and ft are focal lengths of the zoom lens at the wide-angle end and the telephoto end, respectively, FNW is the F-number at the wide-angle end, Rr is the radius of curvature of the lens surface on the image side of the negative lens G3R, Nr is the refractive index of material of the negative lens G3R, and f2 is the focal length of the second lens unit.

(A4) According to the fourth aspect of the invention, the following conditions are satisfied:

$$0.28 < \{|f2/fA|\} \times FNW < 0.51 \qquad (4a)$$

$$0.6 < f3/f4 < 1.15 \qquad (4b)$$

where $fA = \sqrt{fw \cdot ft}$, and where fw and ft are focal lengths of the zoom lens at the wide-angle end and the telephoto end, respectively, FNW is the F-number at the wide-angle end, and f2, f3 and f4 are focal lengths of the second lens unit, the third lens unit and the fourth lens unit, respectively.

In the first to fourth aspects of the invention, the construction of each zoom lens is set as defined in the above features (A1) to (A4), respectively, so that a high optical performance can be obtained throughout an overall variable magnification range and throughout an overall object distance range.

Next, the technical significance of each of the above-mentioned conditions is described.

By setting the zoom lens as defined by the range of the condition (1a) or (2a), the length from the third lens unit and the fourth lens unit, which serve as an image forming system, to the image plane is shortened.

When the upper limit of the condition (1a) or (2a) is exceeded, the back focal distance becomes too short, so that the fourth lens unit interferes with an optical member of a CCD disposed on the image plane. Conversely, when the lower limit is exceeded, the back focal distance becomes too long, so that the total length of the zoom lens is increased disadvantageously.

The condition (1b) or (4b) defines an optimum distribution of refractive power for reducing the sizes of the third lens unit and the fourth lens unit, which serve as an image forming system. In particular, when the interval between the third lens unit and the fourth lens unit is made optimum, a light beam exiting from the third lens unit is made incident on the fourth lens unit in an approximately a focal manner, so that an optimum back focal distance can be secured.

When the upper limit of the condition (1b) or (4b) is exceeded, a light beam exiting from the third lens unit deviates from an afocal manner, so that the size of the fourth lens unit is increased. Further, a variation of aberration due to the movement of the fourth lens unit becomes large disadvantageously. Conversely, when the lower limit is exceeded, the refractive power of the fourth lens unit becomes weak, so that the amount of movement of the fourth lens unit for focusing becomes large, thereby increasing the total length of the zoom lens.

In the zoom lens of the type as defined according to the invention, if the refractive power of the second lens unit, which greatly contributes to the variation of magnification, is strengthened, it becomes possible to reduce the amount of movement of the second lens unit for the variation of magnification, so that the total length of the zoom lens can be shortened.

However, such strengthening of the refractive power of the second lens unit relates to the F-number of the zoom lens, and, thus, this factor has to be taken into consideration. If it does not matter about a large F-number, i.e., a dark zoom lens, it is possible to make the focal length f2 small. However, in actuality, it is difficult to bring zoom lenses of such specifications into the market.

The condition (3a) or (4a) is set on the basis of such a factor. When the upper limit of the condition (3a) or (4a) is exceeded, with the focal length f2 too long, although it is advantageous from the point of view of aberration, the amount of movement of the second lens unit has to be enlarged for the purpose of securing a desired zoom ratio, so that the size of the whole lens system is caused to become large disadvantageously. Conversely, when the lower limit is exceeded, the Petzval sum becomes large in the negative direction and, thus, the image plane is caused to incline, so that it becomes difficult to maintain a good optical performance.

The condition (3b) is concerned with the negative lens G3R of the third lens unit. When the upper limit of the condition (3b) is exceeded, the effect of the telephoto type in the third lens unit becomes small, and, thus, the back focal distance becomes short disadvantageously. Conversely, when the lower limit is exceeded, the radius of curvature Rr becomes too small, so that aberrations occurring at the lens surface on the image side of the negative lens G3R becomes too large, which are difficult to correct at the third lens unit. At the same time, the distance between the negative lens G3R and the fourth lens unit becomes too narrow, so that the negative lens G3R interferes with the fourth lens unit disadvantageously.

In addition, in the first, second and fourth aspects of the invention, it is preferred that the following condition is satisfied:

$$0.3 < Rr/\{(Nr-1)fA\} < 0.6 \tag{5}$$

where $fA = \sqrt{fw \cdot ft}$, and where fw and ft are focal lengths of the zoom lens at the wide-angle end and the telephoto end, respectively, Rr is the radius of curvature of the lens surface on the image side of the negative lens G3R, and Nr is the refractive index of material of the negative lens G3R. The technical significance of the condition (5) is the same as that of the above-mentioned condition (3b).

Further, in the second and third aspects of the invention, it is preferred that the following condition is satisfied:

$$0.6 < f3/f4 < 1.15 \tag{6}$$

where f3 and f4 are focal lengths of the third lens unit and the fourth lens unit, respectively. The technical significance of the condition (6) is the same as that of the above-mentioned condition (1b).

In addition, in the first to fourth aspects of the invention, in order to attain the shortening of the total length of the zoom lens while maintaining a good optical performance, it is desirable that at least one of the following conditions is satisfied.

(B1) It is preferred that the second lens unit comprises two or more negative lenses and one positive lens. In a case where a variable magnification ratio is increased in the zoom lens of the type described in each of the first to fourth embodiments, it is necessary to increase the amount of movement of the second lens unit, which greatly contributes to the variable magnification function, or to shorten the focal length of the second lens unit. The former method causes an increase of the size of the whole zoom lens disadvantageously. The a latter method, although not causing an increase of the size of the whole zoom lens, brings a large burden onto the second lens unit, so that it becomes difficult to maintain a good optical performance. Therefore, the second lens unit is constructed as described above so as to correct the optical performance properly.

(B2) The second lens unit comprises, in order from the object side to the image side, a negative first lens having a concave surface facing the image side, the curvature of which is stronger than that of an opposite surface thereof, a negative second lens both lens surfaces of which are concave, and a positive third lens having a convex surface facing the object side, the curvature of which is stronger than that of an opposite surface thereof. This construction is based on the same reason as that described in the condition (B1).

(B3) The negative second lens and the positive third lens of the second lens unit are cemented together. This arrangement causes chromatic aberration occurring in the second lens unit to be corrected well.

(B4) The second lens unit has an aspheric surface. The arrangement of the aspheric surface causes an improvement of the optical performance for an off-axial light beam.

(B5) The aspheric surface provided in the second lens unit is disposed on a lens surface in which the following condition is satisfied:

$$1.0 < |R0/f2| < 4.0 \tag{7}$$

where R0 is the radius of curvature adjacent to the optical axis of the lens surface. In the zoom lens according to each of the first to fourth embodiments, the aspheric surface is disposed on a lens surface whose radius of curvature is small, so that aberrations are corrected well. In particular, off-axial flare is corrected well. When the upper limit of the condition (7) is exceeded, the effect for correcting the optical performance for an off-axial light beam becomes small disadvantageously. Conversely, when the lower limit is exceeded, with the radius of curvature becoming too small, it becomes difficult to produce the aspheric surface. Incidentally, it is desirable that the aspheric surface has such a shape that the refractive power becomes progressively weaker toward the margin of the lens.

(B6) The following condition is satisfied:

$$2.7 < L/fA < 3.9 \qquad (8)$$

where L is the distance from the first lens surface on the object side of the first lens unit to a paraxial image plane (wherein the thickness of the dummy glass, such as a low-pass filter, disposed on the most image side, is a value reduced to air). When the upper limit of the condition (8) is exceeded, the total length of the zoom lens is increased disadvantageously. Conversely, when the lower limit is exceeded, the Petzval sum becomes large in the negative direction and, thus, the image plane is caused to incline, so that it becomes difficult to maintain a good optical performance.

(B7) The following condition is satisfied:

$$1.84 < N2f < 1.95 \qquad (9)$$

where N2f is the refractive index of material of a negative lens disposed on the most object side of the second lens unit. This condition is concerned with the Petzval sum and is set forth to correct curvature of field in a good balance. When the upper limit of the condition (9) is exceeded, although being advantageous from the point of view of the curvature of field, the Abbe number becomes too small taking into consideration the actually usable glass material, so that it becomes difficult to correct chromatic aberration. Conversely, when the lower limit is exceeded, the image plane is caused to curve in a manner concave toward the object side disadvantageously.

(B8) The following condition is satisfied:

$$0.15 < D3/fA < 0.54 \qquad (10)$$

where $fA = \sqrt{fw \cdot ft}$, and where fw and ft are focal lengths of the zoom lens at the wide-angle end and the telephoto end, respectively, and D3 is the distance on the optical axis from a lens surface on the most object side of the third lens unit to a lens surface on the most image side of the third lens unit. When the upper limit of the condition (10) is exceeded, the total length of the zoom lens is caused to increase. Conversely, when the lower limit is exceeded, although being advantageous from the point of view of the total length of the zoom lens, it becomes difficult to enlarge the aperture ratio in F-number.

Next, four numerical examples 1 to 4 of the invention are shown. The numerical data in the numerical examples 1 to 4 correspond to the zoom lenses according to the first to fourth embodiments shown in the sectional views of FIGS. 1, 5, 9 and 13, respectively.

In the numerical data in the numerical examples 1 to 4, Ri is the radius of curvature of the i-th surface, when counted from the object side, Di is the i-th optical member thickness or air separation, when counted from the object side, and Ni and νi are respectively the refractive index and Abbe number of the material of the i-th optical member, when counted from the object side.

The shape of an aspheric surface is expressed in the coordinates with an X axis in the optical axis direction and a Y axis in the direction perpendicular to the optical axis, the direction in which light advances being taken as positive, by the following equation:

$$X = \frac{(1/R)H^2}{1 + \sqrt{1 - (1+k)(H/R)^2}} + BH^4 + CH^6 + DH^8 + EH^{10} + FH^{12}$$

where R is the radius of osculating sphere, and k, B, C, D, E and F are aspheric coefficients.

Further, for example, the indication of "e-Z" means "$10^{-Z}$". The values of the factors in the above-mentioned conditions for the numerical examples 1 to 4 are listed in Table-1.

NUMERICAL EXAMPLE 1 f = 1–9.67   Fno = 1.66–2.58   2ω = 53.1–5.9

| | | | |
|---|---|---|---|
| R1 = 7.307 | D1 = 0.19 | N1 = 1.846660 | ν1 = 23.8 |
| R2 = 3.557 | D2 = 0.98 | N2 = 1.696797 | ν2 = 55.5 |
| R3 = −44.962 | D3 = 0.05 | | |
| R4 = 3.356 | D4 = 0.62 | N3 = 1.696797 | ν3 = 55.5 |
| R5 = 9.340 | D5 = Variable | | |
| R6 = 6.253 | D6 = 0.14 | N4 = 1.882997 | ν4 = 40.8 |
| R7 = 1.089 | D7 = 0.47 | | |
| *R8 = −1.361 | D8 = 0.26 | N5 = 1.665320 | ν5 = 55.4 |
| R9 = 1.410 | D9 = 0.42 | N6 = 1.846660 | ν6 = 23.8 |
| R10 = 19.083 | D10 = Variable | | |
| R11 = Stop | D11 = 0.22 | | |
| *R12 = 1.326 | D12 = 0.90 | N7 = 1.583130 | ν7 = 59.4 |
| *R13 = −6.127 | D13 = 0.04 | | |
| R14 = 1.942 | D14 = 0.15 | N8 = 1.846660 | ν8 = 23.8 |
| R15 = 1.168 | D15 = Variable | | |
| *R16 = 2.116 | D16 = 0.72 | N9 = 1.583130 | ν9 = 59.4 |
| R17 = −1.940 | D17 = 0.14 | N10 = 1.846660 | ν10 = 23.8 |
| R18 = −4.214 | D18 = Variable | | |
| R19 = ∞ | D19 = 0.82 | N11 = 1.516330 | ν11 = 64.2 |
| R20 = ∞ | | | |

*: Aspheric Surface

| Variable | Focal length | | |
|---|---|---|---|
| Separation | 1.00 | 5.65 | 9.67 |
| D5 | 0.14 | 2.07 | 2.44 |
| D10 | 2.70 | 0.77 | 0.40 |
| D15 | 1.25 | 0.60 | 1.41 |
| D18 | 0.61 | 1.27 | 0.45 |

Aspheric Coefficients

| | | | |
|---|---|---|---|
| R8 | k = −6.93171e+00 | B = −3.14991e−01 | C = 5.30100e−02 |
| | D = 6.65463e−01 | E = −7.05042e−01 | F = −7.24496e−01 |
| R12 | k = −1.85899e+00 | B = 4.04932e−02 | C = 2.68019e−03 |
| | D = −2.51500e−03 | E = −1.84509e−04 | F = 0.00000e+00 |
| R13 | k = −2.33744e+00 | B = 2.75525e−03 | C = 2.33213e−02 |
| | D = −1.89844e−02 | E = 4.65385e−03 | F = 0.00000e+00 |
| R16 | k = −8.24578e+00 | B = 8.86244e−02 | C = −6.18890e−02 |
| | D = −1.11389e−02 | E = 1.01043e−01 | F = −8.37487e−02 |

NUMERICAL EXAMPLE 2 f = 1–9.66  Fno = 1.66–2.83  2ω = 53.1–5.9

| | | | |
|---|---|---|---|
| R1 = 5.353 | D1 = 0.19 | N1 = 1.846660 | ν1 = 23.8 |
| R2 = 2.992 | D2 = 1.14 | N2 = 1.696797 | ν2 = 55.5 |
| R3 = −62.217 | D3 = 0.05 | | |
| R4 = 2.724 | D4 = 0.63 | N3 = 1.696797 | ν3 = 55.5 |
| R5 = 6.005 | D5 = Variable | | |
| R6 = 5.140 | D6 = 0.14 | N4 = 1.882997 | ν4 = 40.8 |
| R7 = 0.818 | D7 = 0.39 | | |
| *R8 = −0.897 | D8 = 0.26 | N5 = 1.696797 | ν5 = 55.5 |
| R9 = 5.336 | D9 = 0.42 | N6 = 1.846660 | ν6 = 23.8 |
| R10 = −4.493 | D10 = Variable | | |
| R11 = Stop | D11 = 0.22 | | |
| *R12 = 1.425 | D12 = 0.86 | N7 = 1.583130 | ν7 = 59.4 |
| *R13 = −3.809 | D13 = 0.04 | | |
| R14 = 2.097 | D14 = 0.15 | N8 = 1.846660 | ν8 = 23.8 |
| R15 = 1.293 | D15 = Variable | | |
| *R16 = 2.856 | D16 = 0.61 | N9 = 1.583130 | ν9 = 59.4 |
| R17 = −1.944 | D17 = 0.14 | N10 = 1.846660 | ν10 = 23.8 |
| R18 = −3.474 | D18 = Variable | | |
| R19 = ∞ | D19 = 0.82 | N11 = 1.516330 | ν11 = 64.2 |
| R20 = ∞ | | | |

*: Aspheric Surface

| Variable | Focal length | | |
|---|---|---|---|
| Separation | 1.00 | 5.51 | 9.66 |
| D5 | 0.14 | 1.66 | 1.95 |
| D10 | 2.21 | 0.69 | 0.40 |
| D15 | 1.26 | 0.55 | 1.42 |
| D18 | 0.61 | 1.32 | 0.45 |

Aspheric Coefficients

| | | | |
|---|---|---|---|
| R8 | k = −3.56929e+00 | B = −4.69396e−01 | C = 6.28488e−02 |
| | D = 1.96746e+00 | E = −6.80955e+00 | F = 6.69503e+00 |
| R12 | k = −2.59294e+00 | B = 5.42937e−02 | C = −1.12239e−03 |
| | D = −8.31288e−03 | E = 2.54413e−03 | F = 0.00000e+00 |
| R13 | k = −1.15618e+00 | B = 2.30523e−02 | C = 1.02294e−02 |
| | D = −1.51692e−02 | E = 5.02812e−03 | F = 0.00000e+00 |
| R16 | k = −1.55419e+01 | B = 6.99685e−02 | C = −3.21991e−02 |
| | D = −8.39273e−02 | E = 1.68744e−01 | F = −9.84750e−02 |

NUMERICAL EXAMPLE 3 f = 1–9.67  Fno = 1.66–2.67  2ω = 53.1–5.9

| | | | |
|---|---|---|---|
| R1 = 6.523 | D1 = 0.19 | N1 = 1.846660 | ν1 = 23.8 |
| R2 = 3.344 | D2 = 1.03 | N2 = 1.696797 | ν2 = 55.5 |
| R3 = −114.984 | D3 = 0.05 | | |
| R4 = 3.076 | D4 = 0.66 | N3 = 1.696797 | ν3 = 55.5 |
| R5 = 8.402 | D5 = Variable | | |
| R6 = 7.328 | D6 = 0.14 | N4 = 1.882997 | ν4 = 40.8 |
| R7 = 1.000 | D7 = 0.46 | | |
| *R8 = −1.173 | D8 = 0.22 | N5 = 1.589130 | ν5 = 61.1 |
| R9 = 1.622 | D9 = 0.06 | | |
| R10 = 1.920 | D10 = 0.39 | N6 = 1.846660 | ν6 = 23.8 |
| R11 = 57.279 | D11 = Variable | | |
| R12 = Stop | D12 = 0.22 | | |
| *R13 = 1.363 | D13 = 0.89 | N7 = 1.583130 | ν7 = 59.4 |
| *R14 = −4.724 | D14 = 0.04 | | |
| R15 = 2.100 | D15 = 0.15 | N8 = 1.846660 | ν8 = 23.8 |
| R16 = 1.242 | D16 = Variable | | |
| *R17 = 2.591 | D17 = 0.64 | N9 = 1.583130 | ν9 = 59.4 |
| R18 = −1.944 | D18 = 0.14 | N10 = 1.846660 | ν10 = 23.8 |
| R19 = −3.658 | D19 = Variable | | |
| R20 = ∞ | D20 = 0.82 | N11 = 1.516330 | ν11 = 64.2 |
| R21 = ∞ | | | |

*: Aspheric Surface

| Variable | Focal length | | |
|---|---|---|---|
| Separation | 1.00 | 5.61 | 9.67 |
| D5 | 0.14 | 1.91 | 2.25 |
| D11 | 2.52 | 0.74 | 0.41 |
| D16 | 1.18 | 0.50 | 1.34 |
| D19 | 0.61 | 1.29 | 0.45 |

Aspheric Coefficients

| | | | |
|---|---|---|---|
| R8 | k = −4.50456e+00 | B = −3.09884e−01 | C = 2.50989e−01 |
| | D = 6.48440e−01 | E = −2.27707e+00 | E = 6.82481e−02 |
| R13 | k = −1.91329e+00 | B = 3.85319e−02 | C = 4.71810e−03 |
| | D = −2.55260e−03 | E = 7.78379e−04 | F = 0.00000e+00 |
| R14 | k = −6.13608e+00 | B = 9.23044e−03 | C = 2.23193e−02 |
| | D = −1.69313e−02 | E = 4.73874e−03 | F = 0.00000e+00 |
| R17 | k = −1.06759e+00 | B = 6.50657e−02 | C = −4.84770e−02 |
| | D = −2.32970e−02 | E = 1.11685e−01 | F = −9.25738e−02 |

NUMERICAL EXAMPLE 4 f = 1–9.68  Fno = 1.66–2.57  2ω = 55.6–6.2

| | | | |
|---|---|---|---|
| R1 = 7.550 | D1 = 0.22 | N1 = 1.846660 | ν1 = 23.8 |
| R2 = 3.593 | D2 = 1.02 | N2 = 1.696797 | ν2 = 55.5 |
| R3 = −47.403 | D3 = 0.05 | | |
| R4 = 3.292 | D4 = 0.69 | N3 = 1.696797 | ν3 = 55.5 |
| R5 = 9.151 | D5 = Variable | | |
| R6 = 7.122 | D6 = 0.14 | N4 = 1.882997 | ν4 = 40.8 |
| R7 = 1.041 | D7 = 0.46 | | |
| R8 = −1.330 | D8 = 0.14 | N5 = 1.719995 | ν5 = 50.2 |
| R9 = 1.330 | D9 = 0.48 | N6 = 1.846660 | ν6 = 23.8 |
| R10 = −13.019 | D10 = Variable | | |
| R11 = Stop | D11 = 0.22 | | |
| *R12 = 1.381 | D12 = 0.89 | N7 = 1.583130 | ν7 = 59.4 |
| *R13 = 5.439 | D13 = 0.04 | | |
| R14 = 2.136 | D14 = 0.15 | N8 = 1.846660 | ν8 = 23.8 |
| R15 = 1.264 | D15 = Variable | | |
| *R16 = 2.258 | D16 = 0.75 | N9 = 1.583130 | ν9 = 59.4 |

-continued

| | | | |
|---|---|---|---|
| R17 = −1.731 | D17 = 0.14 | N10 = 1.846660 | v10 = 23.8 |
| R18 = −3.600 | D18 = Variable | | |
| R19 = ∞ | D19 = 0.82 | N11 = 1.516330 | v11 = 64.1 |
| R20 = ∞ | | | |

*: Aspheric Surface

| Variable | Focal length | | |
|---|---|---|---|
| Separation | 1.00 | 5.59 | 9.68 |
| D5 | 0.14 | 2.07 | 2.44 |
| D10 | 2.70 | 0.77 | 0.40 |
| D15 | 1.32 | 0.68 | 1.48 |
| D18 | 0.61 | 1.25 | 0.45 |

Aspheric Coefficients

| | | | |
|---|---|---|---|
| R12 | k = −1.85765e+00 | B = 3.10022e−02 | C = 6.10846e−03 |
| | D = −4.45233e−03 | E = 2.12846e−03 | F = 0.00000e+00 |
| R13 | k = −1.22354e+00 | B = 5.47986e−03 | C = 1.45803e−02 |
| | D = −6.35403e−03 | E = 1.67104e−03 | F = 0.00000e+00 |
| R16 | k = −1.11112e+01 | B = 1.00294e−01 | C = −6.56495e−02 |
| | D = −3.10781e−02 | E = 1.16172e−01 | F = −7.39088e−02 |

TABLE 1

| | Numerical Example | | | |
|---|---|---|---|---|
| Condition | 1 | 2 | 3 | 4 |
| (1a), (2a) | 0.373 | 0.396 | 0.394 | 0.372 |
| (3a), (4a) | 0.45 | 0.36 | 0.42 | 0.45 |
| (3b), (5) | 0.44 | 0.49 | 0.47 | 0.48 |
| (10) | 0.35 | 0.34 | 0.35 | 0.35 |
| (7) | 1.61 | 1.34 | 1.51 | — |
| (8) | 3.55 | 3.45 | 3.51 | 3.60 |
| (1b), (4b), (6) | 0.94 | 0.79 | 0.86 | 0.95 |
| (9) | 1.88 | 1.88 | 1.88 | 1.88 |

As has been described above with reference to the first to fourth embodiments, according to each of the first to fourth aspects of the invention, it is possible to provide a zoom lens of rear focus type in which the whole lens system is minimized, rapid focusing is possible, a mechanism thereof is simple with the first lens unit remaining stationary during zooming, a high optical performance is secured regardless of a high variable magnification ratio, such as a zoom ratio of 10, and the number of constituent lens elements is small regardless of a large aperture ratio, such as an F-number of 1.6.

Next, fifth to eighth embodiments corresponding to zoom lenses according to the fifth aspect of the invention are described.

Figure 17:
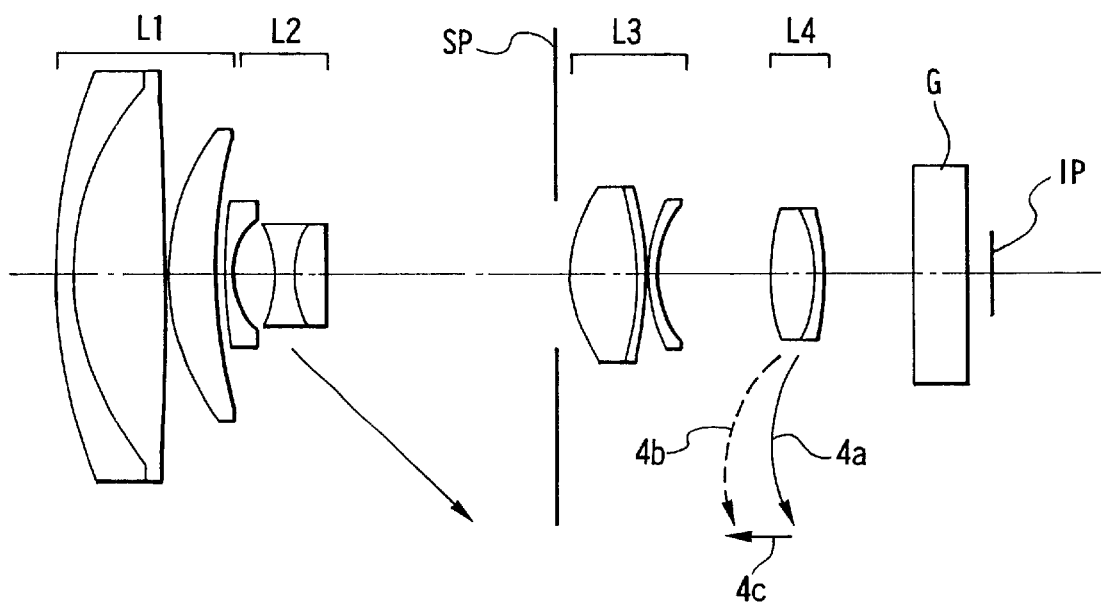
FIG. 17 is a sectional view showing a zoom lens according to a fifth embodiment of the invention.
Figure 21:
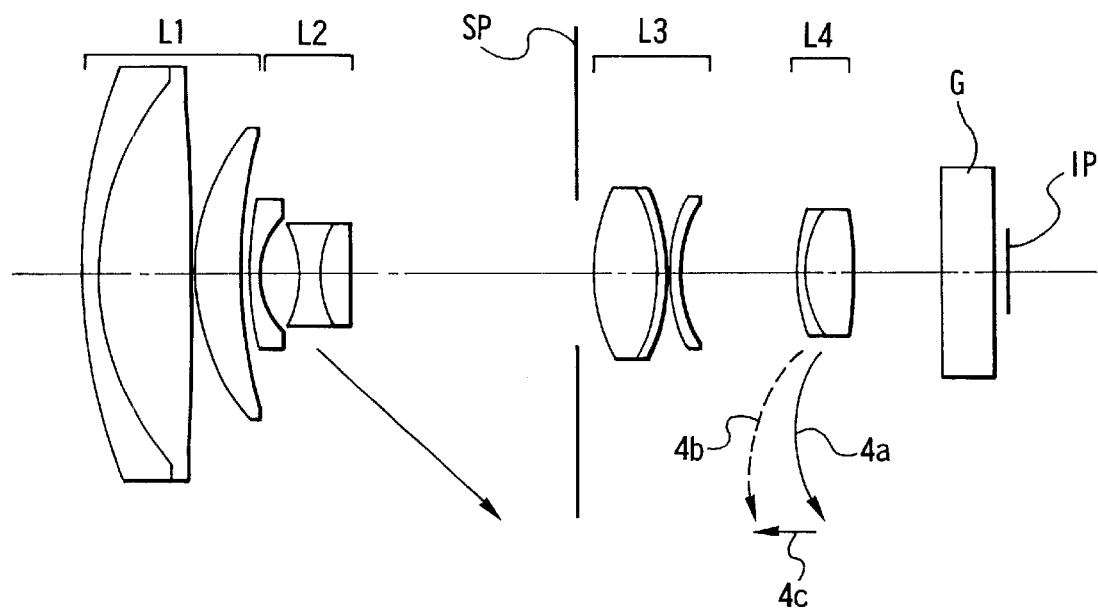
FIG. 21 is a sectional view showing a zoom lens according to a sixth embodiment of the invention.
Figure 25:
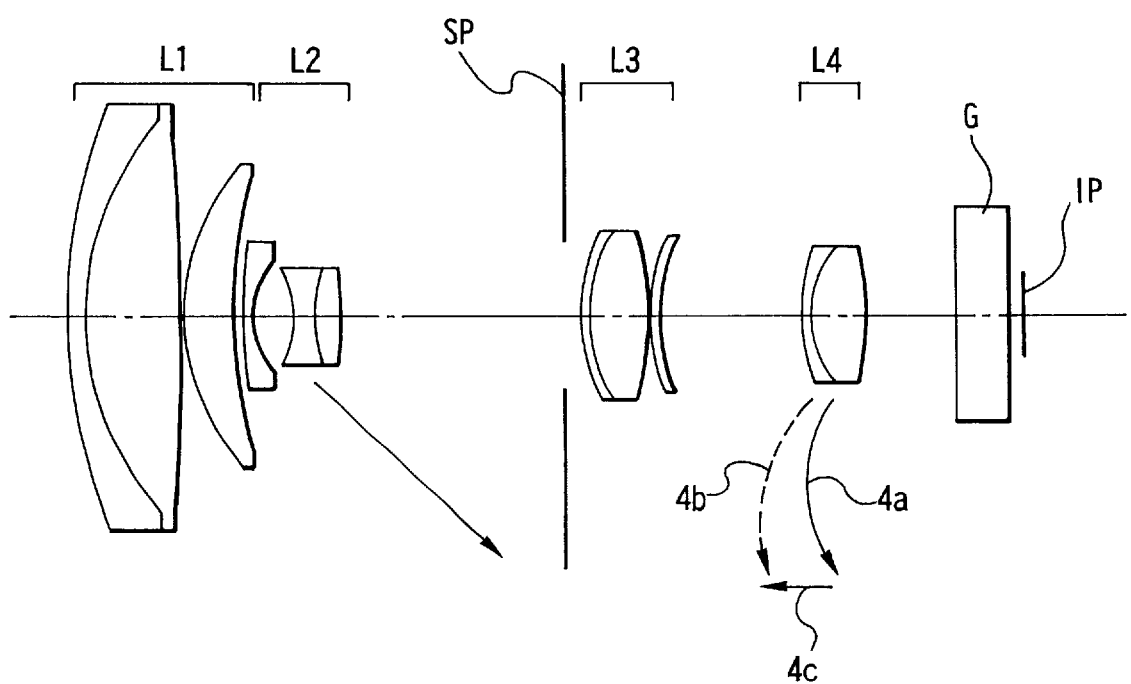
FIG. 25 is a sectional view showing a zoom lens according to a seventh embodiment of the invention.
Figure 29:
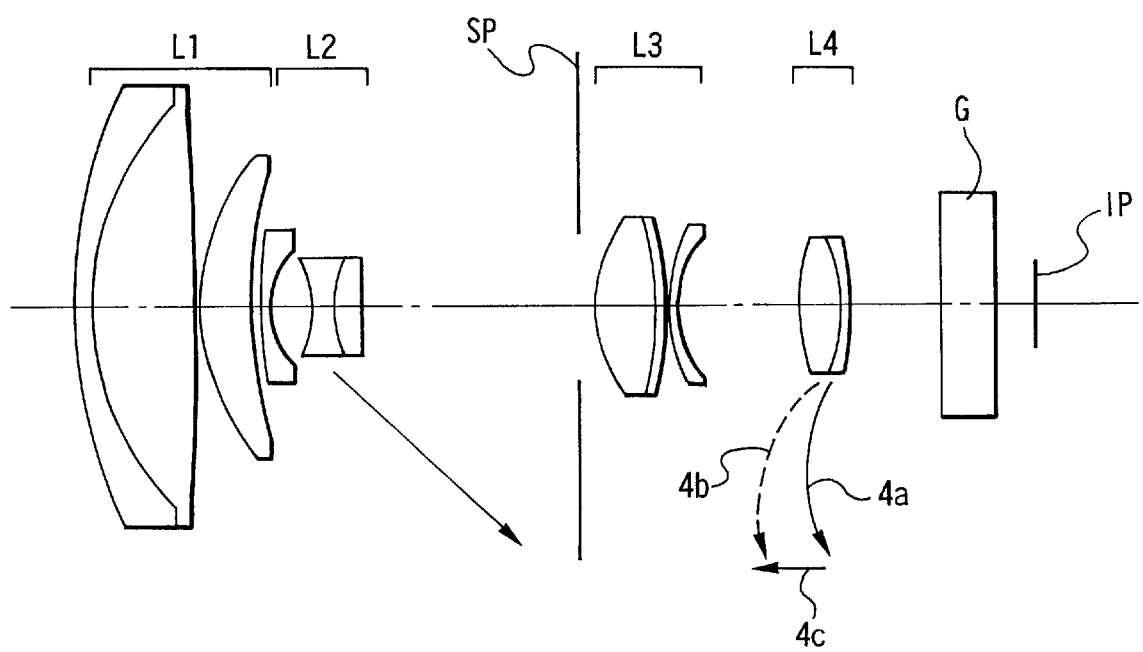
FIG. 29 is a sectional view showing a zoom lens according to an eighth embodiment of the invention.

FIG. 17 is a sectional view showing the essential parts of a zoom lens of rear focus type according to the fifth embodiment of the invention. FIGS. 18A to 18D, 19A to 19D and 20A to 20D are aberration diagrams showing the various aberrations in the zoom positions of the wide-angle end, the middle focal length and the telephoto end, respectively, of the zoom lens according to the fifth embodiment. FIG. 21 is a sectional view showing the essential parts of a zoom lens of rear focus type according to the sixth embodiment of the invention. FIGS. 22A to 22D, 23A to 23D and 24A to 24D are aberration diagrams showing the various aberrations in the zoom positions of the wide-angle end, the middle focal length and the telephoto end, respectively, of the zoom lens according to the sixth embodiment. FIG. 25 is a sectional view showing the essential parts of a zoom lens of rear focus type according to the seventh embodiment of the invention. FIGS. 26A to 26D, 27A to 27D and 28A to 28D are aberration diagrams showing the various aberrations in the zoom positions of the wide-angle end, the middle focal length and the telephoto end, respectively, of the zoom lens according to the seventh embodiment. FIG. 29 is a sectional view showing the essential parts of a zoom lens of rear focus type according to the eighth embodiment of the invention. FIGS. 30A to 30D, 31A to 31D and 32A to 32D are aberration diagrams showing the various aberrations in the zoom positions of the wide-angle end, the middle focal length and the telephoto end, respectively, of the zoom lens according to the eighth embodiment.

In FIGS. 17, 21, 25 and 29, L1 denotes a first lens unit of positive refractive power, L2 denotes a second lens unit of negative refractive power, L3 denotes a third lens unit of positive refractive power, and L4 denotes a fourth lens unit of positive refractive power. SP stands for an aperture stop, which is disposed in front of the third lens unit L3. G stands for a glass block such as a color separation prism, a face plate for a CCD, a filter or the like. IP stands for an image plane, on which an image sensor, such as a CCD, is disposed.

In the fifth to eighth embodiments, the second lens unit is moved toward the image side as indicated by the arrow during a variation of magnification from the wide-angle end to the telephoto end, and, at the same time, the shift of an image plane due to the variation of magnification is compensated for by moving the fourth lens unit along a locus convex toward the object side.

Further, the fourth lens unit is moved along the optical axis to effect focusing, so that the rear focus type is adopted. A solid-line curve 4a and a dashed-line curve 4b shown in each of FIGS. 17, 21, 25 and 29 indicate movement loci of the fourth lens unit for compensating for the shift of an image plane due to the variation of magnification from the wide-angle end to the telephoto end when focusing is performed on an infinitely distant object and a nearest object, respectively. Incidentally, the first lens unit and the third lens unit remain stationary during the variation of magnification and during focusing.

Further, the zoom lens has a high variable magnification ratio, such as a zoom ratio of 12, and a large aperture ratio, such as an F-number of 1.6.

In the fifth to eighth embodiments, when focusing from an infinitely distant object to a nearest object is performed, for example, in the telephoto end, the fourth lens unit is drawn out forward as indicated by a straight line 4c shown in FIGS. 17, 21, 25 and 29.

The characteristic features of the construction of the zoom lens according to the fifth aspect of the invention reside in that the third lens unit has a stop disposed on the most object side thereof, and consists of a cemented lens composed of a positive lens both lens surfaces of which are convex and a negative lens, and a negative lens of meniscus form having a concave surface facing the image side, and the fourth lens unit consists of a positive single lens having a convex surface facing the object side or a cemented lens composed of a positive lens and a negative lens.

In the fifth to eighth embodiments, with the third lens unit arranged as described above, it is possible to minimize the relay lens unit with ease. Further, the third lens unit has a great effect on the longitudinal aberration, and has an influence on the spherical aberration, coma and chromatic aberration. Therefore, a cemented lens is disposed in the third lens unit so as to keep aberration in a good state, and a negative lens is disposed on the image side of the third lens unit so as to realize the retro type, so that the shortening of the back focal distance can be attained.

Further, in the fifth to eighth embodiments, with the construction of the zoom lens as described above, the zoom lens has a high variable magnification ratio, such as a zoom ratio of 12, and a large aperture ratio, such as an F-number of 1.6, and has a high optical performance throughout the entire variable magnification range and throughout the entire object distance range.

While the zoom lens of rear focus type according to the fifth aspect of the invention is realized by satisfying the above-described construction, it is desirable to satisfy at least one of the following conditions in order to further maintain the optical performance in a good state while keeping a high variable magnification ratio.

(C1) The following condition is satisfied:

$$0.20 < \beta 4T < 0.63 \quad (11)$$

where β4T is a magnification of the fourth lens unit obtained when focusing on an infinitely distant object at the telephoto end.

By setting the zoom lens as defined by the range of the condition (11), the length from the third lens unit and the fourth lens unit, which serves as an image forming system, to the image plane is shortened. When the upper limit of the condition (11) is exceeded, the back focal distance becomes too short, so that the fourth lens unit interferes with an optical member of a CCD disposed on the image plane. Conversely, when the lower limit is exceeded, the back focal distance becomes too long, so that the total length of the zoom lens is increased disadvantageously.

(C2) The following conditions are satisfied:

$$0.31 < |f2/fA| \times FNW < 0.52 \quad (12)$$

where $fA = \sqrt{fw \cdot ft}$, and where fw and ft are focal lengths of the zoom lens at the wide-angle end and the telephoto end, respectively, and FNW is the F-number at the wide-angle end.

In the zoom lens of the type as defined according to the fifth aspect of the invention, if the refractive power of the second lens unit, which greatly contributes to the variation of magnification, is set as described above, it becomes possible to strengthen the refractive power of the second lens unit, and, as a result, it becomes possible to reduce the amount of movement of the second lens unit for the variation of magnification, so that the total length of the zoom lens can be shortened.

However, such strengthening of the refractive power of the second lens unit relates to an F-number of the zoom lens, and, thus, this factor has to be taken into consideration. If it does not matter about a large F-number, i.e., a dark zoom lens, it is possible to make the focal length f2 small to any degree. However, in actuality, it is difficult to bring zoom lenses of such specifications into the market.

When the upper limit of the condition (12) is exceeded, with the focal length f2 too long, although it is advantageous from the point of view of aberration, the amount of movement of the second lens unit has to be enlarged for the purpose of securing a desired zoom ratio, so that the size of the whole lens system is caused to become large disadvantageously. Conversely, when the lower limit is exceeded, the Petzval sum becomes large in the negative direction and, thus, the image plane is caused to incline, so that it becomes difficult to maintain a good optical performance.

(C3) The following condition is satisfied:

$$0.63 < f3/f4 < 1.16 \quad (13)$$

where f3 and f4 are focal lengths of the third lens unit and the fourth lens unit, respectively.

The condition (13) defines an optimum distribution of refractive power for reducing the sizes of the third lens unit and the fourth lens unit, which serve as an image forming system. In particular, when the interval between the third lens unit and the fourth lens unit is made optimum, a light beam exiting from the third lens unit is made incident on the fourth lens unit in an approximately afocal manner, so that an optimum back focal distance can be secured.

When the upper limit of the condition (13) is exceeded, a light beam exiting from the third lens unit deviates from an afocal manner, so that the size of the fourth lens unit is increased. Further, a variation of aberration due to the movement of the fourth lens unit becomes large disadvantageously. Conversely, when the lower limit is exceeded, the refractive power of the fourth lens unit becomes weak, so that the amount of movement of the fourth lens unit for focusing becomes large, thereby increasing the total length of the zoom lens.

(C4) The second lens unit has a negative lens disposed on the most object side thereof, and the following condition is satisfied:

$$1.80 < N2f < 1.95 \quad (14)$$

where N2f is the refractive index of material of the negative lens disposed on the most object side of the second lens unit. This condition is concerned with the Petzval sum and is set forth to correct the curvature of field in a good balance.

When the upper limit of the condition (14) is exceeded, although being advantageous from the point of view of correction of the curvature of field, the Abbe number becomes too small taking into consideration the actually usable glass material, so that it becomes difficult to correct chromatic aberration. Conversely, when the lower limit is exceeded, the image plane is caused to curve in the manner concave toward the object side disadvantageously.

(C5) The following conditions are satisfied:

$$0.4 < Rr/\{(Nr-1)fA\} < 1.2 \quad (15)$$

$$0.3 < |D3L/fA| \times \sqrt{FNW} 0.6 \quad (16)$$

where $fA = \sqrt{fw \cdot ft}$, and where fw and ft are focal lengths of the zoom lens at the wide-angle end and the telephoto end, respectively, Rr is the radius of curvature of the lens surface on the image side of the negative lens disposed on the most image side of the third lens unit, Nr is the refractive index of material of the negative lens disposed on the most image side of the third lens unit, D3L is the distance from a lens surface on the most object side of the third lens unit to a lens surface on the most image side of the third lens unit, and FNW is the F-number at the wide-angle end.

The conditions (15) and (16) are set forth to shorten the image forming system. When the upper limit of the condition (15) is exceeded, the effect of the telephoto type in the third lens unit becomes small, and, thus, the back focal distance becomes short disadvantageously. Conversely, when the lower limit is exceeded, the radius of curvature Rr becomes too small, so that aberrations occurring at the lens surface on the image side of the negative lens becomes too large, which are difficult to correct at the third lens unit. At the same time, the distance between the negative lens and the fourth lens unit becomes too narrow, so that the negative lens interferes with the fourth lens unit disadvantageously. When the upper limit of the condition (16) is exceeded, the total length of the zoom lens is cause to increase. Conversely, when the lower limit is exceeded, although being advantageous from the point of view of the total length of the zoom lens, it becomes difficult to secure a large aperture ratio in F-number.

(C6) The second lens unit comprises two or more negative lenses and one positive lens.

In a case where a variable magnification ratio is increased in the zoom lens of the type according to the fifth aspect of the invention, it is necessary to increase the amount of movement of the second lens unit, which greatly contributes to the variable magnification function, or to shorten the focal length of the second lens unit (to strengthen the refractive power of the second lens unit).

The former method causes an increase of the size of the whole zoom lens disadvantageously. The latter method, although not causing an increase of the size of the whole zoom lens, brings a large burden onto the second lens unit, so that it becomes difficult to maintain a good optical performance. Therefore, the second lens unit is constructed as described above so as to correct the optical performance properly.

(C7) The second lens unit comprises, in order from the object side to the image side, a negative first lens having a concave surface facing the image side, a negative second lens both lens surfaces of which are concave, and a positive third lens having a convex surface facing the object side.

This construction causes the various aberrations occurring when the variable magnification ratio is heightened to be corrected well.

(C8) The negative second lens and the positive third lens of the second lens unit are cemented together.

This arrangement causes chromatic aberration occurring in the second lens unit to be corrected well.

(C9) The second lens unit has an aspheric surface.

The arrangement of the aspheric surface in the second lens unit causes an improvement of the optical performance for an off-axial light beam throughout the entire variable magnification range.

(C10) The aspheric surface provided in the second lens unit is disposed on a lens surface in which the following condition is satisfied:

$$1.1 < |R0/f2| < 3.0 \tag{17}$$

where R0 is a radius of curvature adjacent to the optical axis of the lens surface, and f2 is a focal length of the second lens unit.

In the zoom lens according to the fifth aspect of the invention, the aspheric surface is disposed on a lens surface whose radius of curvature is small, so that aberrations can be effectively corrected. In particular, off-axial flare is corrected well.

When the upper limit of the condition (17) is exceeded, the effect for correcting the optical performance for an off-axial light beam becomes small disadvantageously. Conversely, when the lower limit is exceeded, with the radius of curvature becoming too small, it becomes difficult to produce the aspheric surface.

Incidentally, it is desirable that the aspheric surface has such a shape that a refractive power becomes progressively weaker toward the margin of the lens.

(C11) The third lens unit or the fourth lens unit has an aspheric surface.

In the zoom lens according to the fifth aspect of the invention, it is preferred that an aspheric surface is disposed in the third lens unit or the fourth lens unit in order to maintain the aberration occurring in the image forming system in a good state. In particular, when the aspheric surface is disposed in the third lens unit, it becomes ease to make the F-number small.

(C12) The following condition is satisfied:

$$2.9 < L/fA < 4.3 \tag{18}$$

where L is the distance from the first lens surface on the object side of the zoom lens to a paraxial image plane (wherein the thickness of the dummy glass, such as a low-pass filter, disposed on the most image side is a value reduced to air).

When the upper limit of the condition (18) is exceeded, the total length of the zoom lens is increased disadvantageously. Conversely, when the lower limit is exceeded, the Petzval sum becomes large in the negative direction and, thus, the image plane is caused to incline, so that it becomes difficult to maintain a good optical performance.

Next, four numerical examples 5 to 8 of the invention are shown. The numerical data in the numerical examples 5 to 8 correspond to the zoom lenses according to the fifth to eighth embodiments shown in the sectional views of FIGS. 17, 21, 25 and 29, respectively.

The values of the factors in the above-mentioned conditions for the numerical examples 5 to 8 are listed in Table-2.

NUMERICAL EXAMPLE 5

| f = 1–11.74 | Fno = 1.65–2.91 | 2ω = 56.5–5.2 | |
|---|---|---|---|
| R1 = 7.586 | D1 = 0.24 | N1 = 1.846660 | ν1 = 23.8 |
| R2 = 3.892 | D2 = 1.24 | N2 = 1.696797 | ν2 = 55.5 |
| R3 = −42.787 | D3 = 0.04 | | |
| R4 = 3.272 | D4 = 0.64 | N3 = 1.603112 | ν3 = 60.6 |
| R5 = 7.569 | D5 = Variable | | |
| R6 = 7.455 | D6 = 0.12 | N4 = 1.882997 | ν4 = 40.8 |
| R7 = 1.083 | D7 = 0.53 | | |
| *R8 = −1.578 | D8 = 0.28 | N5 = 1.665320 | ν5 = 55.4 |
| R9 = 1.393 | D9 = 0.40 | N6 = 1.846660 | ν6 = 23.8 |
| R10 = 38.755 | D10 = Variable | | |
| R11 = Stop | D11 = 0.19 | | |
| *R12 = 1.705 | D12 = 0.92 | N7 = 1.583130 | ν7 = 59.4 |
| R13 = −4.019 | D13 = 0.12 | N8 = 1.846660 | ν8 = 23.8 |
| R14 = −4.815 | D14 = 0.04 | | |
| R15 = 2.346 | D15 = 0.13 | N9 = 1.846660 | ν9 = 25.2 |
| R16 = 1.529 | D16 = Variable | | |
| *R17 = 2.684 | D17 = 0.61 | N10 = 1.583130 | ν10 = 59.4 |
| R18 = −2.037 | D18 = 0.12 | N11 = 1.846660 | ν11 = 23.8 |
| R19 = −4.083 | D19 = Variable | | |
| R20 = ∞ | D20 = 0.71 | N12 = 1.516330 | ν12 = 64.1 |
| R21 = ∞ | | | |

*: Aspheric Surface

| Variable | Focal length | | |
|---|---|---|---|
| Separation | 1.00 | 6.42 | 11.74 |
| D5 | 0.12 | 2.45 | 2.89 |
| D10 | 3.11 | 0.79 | 0.35 |
| D16 | 1.50 | 0.65 | 1.70 |
| D19 | 1.19 | 2.04 | 0.99 |

Aspheric Coefficients

| | | | |
|---|---|---|---|
| R8 | k = −1.38194e+00 | B = −2.81718e−02 | C = −1.42572e−01 |
| | D = 2.91703e−01 | E = −5.34313e−01 | F = 5.00674e−01 |
| R12 | k = −8.27105e−02 | B = −3.56699e−02 | C = −1.36587e−04 |
| | D = −2.62035e−03 | E = 4.54823e−05 | F = 0.00000e+00 |
| R17 | k = −1.67686e+00 | B = 8.76614e−02 | C = −4.78988e−02 |
| | D = −2.91551e−02 | E = 6.79820e−02 | F = −2.93587e−02 |

NUMERICAL EXAMPLE 6 f = 1–11.74  Fno = 1.65–2.84  2ω = 56.5–5.2

| | | | |
|---|---|---|---|
| R1 = 7.747 | D1 = 0.24 | N1 = 1.846660 | ν1 = 23.8 |
| R2 = 3.961 | D2 = 1.27 | N2 = 1.696797 | ν2 = 55.5 |
| R3 = −41.754 | D3 = 0.04 | | |
| R4 = 3.151 | D4 = 0.62 | N3 = 1.603112 | ν3 = 60.6 |
| R5 = 6.914 | D5 = Variable | | |
| R6 = 5.095 | D6 = 0.12 | N4 = 1.882997 | ν4 = 40.8 |
| R7 = 1.037 | D7 = 0.54 | | |
| *R8 = −1.566 | D8 = 0.28 | N5 = 1.665320 | ν5 = 55.4 |
| R9 = 1.339 | D9 = 0.41 | N6 = 1.846660 | ν6 = 23.8 |
| R10 = 22.243 | D10 = Variable | | |
| R11 = Stop | D11 = 0.19 | | |
| *R12 = 2.178 | D12 = 0.88 | N7 = 1.583130 | ν7 = 59.4 |
| R13 = −2.476 | D13 = 0.12 | N8 = 1.846660 | ν8 = 23.8 |
| R14 = −3.174 | D14 = 0.04 | | |
| R15 = 2.304 | D15 = 0.14 | N9 = 1.846660 | ν9 = 23.8 |
| R16 = 1.773 | D16 = Variable | | |
| R17 = 2.676 | D17 = 0.12 | N10 = 1.846660 | ν10 = 23.8 |
| R18 = 1.527 | D18 = 0.64 | N11 = 1.583130 | ν11 = 59.4 |
| *R19 = −6.039 | D19 = Variable | | |
| R20 = ∞ | D20 = 0.71 | N12 = 1.516330 | ν12 = 64.1 |
| R21 = ∞ | | | |

*: Aspheric Surface

| Variable | Focal length | | |
|---|---|---|---|
| Separation | 1.00 | 6.26 | 11.74 |
| D5 | 0.12 | 2.45 | 2.89 |
| D10 | 3.12 | 0.79 | 0.35 |
| D16 | 1.61 | 0.67 | 1.81 |
| D19 | 1.19 | 2.13 | 0.99 |

Aspheric Coefficients

| | | | |
|---|---|---|---|
| R8 | k = −3.80405e+00 | B = −1.06002e−01 | C = −4.26638e−01 |
| | D = 2.57527e+00 | E = −7.02514e+00 | F = 6.79594e+00 |
| R12 | k = −2.43407e+00 | B = −5.05963e−03 | C = 2.13343e−03 |
| | D = −1.34666e−03 | E = 4.49802e−05 | F = 0.00000e+00 |
| R19 | k = −9.40689e+01 | B = −5.09988e−02 | C = 6.24664e−02 |
| | D = −3.39619e−02 | E = −3.88921e−02 | F = 4.24493e−02 |

NUMERICAL EXAMPLE 7 f = 1–11.74  Fno = 1.65–2.77  2ω = 56.5–5.2

| | | | |
|---|---|---|---|
| R1 = 7.872 | D1 = 0.24 | N1 = 1.846660 | ν1 = 23.8 |
| R2 = 4.028 | D2 = 1.24 | N2 = 1.696797 | ν2 = 55.5 |
| R3 = −35.697 | D3 = 0.04 | | |
| R4 = 3.098 | D4 = 0.66 | N3 = 1.603112 | ν3 = 60.6 |
| R5 = 7.132 | D5 = Variable | | |
| R6 = 8.217 | D6 = 0.12 | N4 = 1.882997 | ν4 = 40.8 |
| R7 = 1.051 | D7 = 0.56 | | |
| *R8 = −1.339 | D8 = 0.28 | N5 = 1.665320 | ν5 = 55.4 |
| R9 = 2.521 | D9 = 0.32 | N6 = 1.846660 | ν6 = 23.8 |
| R10 = −7.693 | D10 = Variable | | |
| R11 = Stop | D11 = 0.19 | | |
| R12 = 2.526 | D12 = 0.12 | N7 = 1.846660 | ν7 = 23.8 |
| R13 = 2.151 | D13 = 0.78 | N8 = 1.583130 | ν8 = 59.4 |
| *R14 = −3.551 | D14 = 0.04 | | |
| R15 = 3.414 | D15 = 0.13 | N9 = 1.846660 | ν9 = 23.8 |
| R16 = 2.834 | D16 = Variable | | |
| R17 = 2.834 | D17 = 0.12 | N10 = 1.846660 | ν10 = 23.8 |
| R18 = 1.464 | D18 = 0.71 | N11 = 1.583130 | ν11 = 59.4 |
| *R19 = −4.123 | D19 = Variable | | |
| R20 = ∞ | D20 = 0.71 | N12 = 1.516330 | ν12 = 64.1 |
| R21 = ∞ | | | |

*: Aspheric Surface

| Variable | Focal length | | |
|---|---|---|---|
| Separation | 1.00 | 5.90 | 11.74 |
| D5 | 0.12 | 2.35 | 2.78 |
| D10 | 3.00 | 0.77 | 0.34 |
| D16 | 1.87 | 1.12 | 2.30 |
| D19 | 1.19 | 1.94 | 0.77 |

Aspheric Coefficients

| | | | |
|---|---|---|---|
| R8 | k = −1.57869e+00 | B = −3.77645e−02 | C = −5.46590e−01 |
| | D = 3.47725e+00 | E = −9.37223e+00 | F = 8.70930e+00 |
| R14 | k = −5.84644e−01 | B = 2.68981e−02 | C = −3.59923e−03 |
| | D = 2.63347e−03 | E = −7.33640e−04 | F = −0.00000e+00 |
| R19 | k = −5.62967e+01 | B = −8.23978e−02 | C = 5.17042e−02 |
| | D = 3.06629e−02 | E = −7.68289e−02 | F = 4.00460e−02 |

NUMERICAL EXAMPLE 8 f = 1–11.74  Fno = 1.65–2.83  2ω = 56.5–5.2

| | | | |
|---|---|---|---|
| R1 = 7.025 | D1 = 0.24 | N1 = 1.846660 | ν1 = 23.8 |
| R2 = 3.865 | D2 = 1.36 | N2 = 1.696797 | ν2 = 55.5 |
| R3 = −44.009 | D3 = 0.04 | | |
| R4 = 3.157 | D4 = 0.68 | N3 = 1.603112 | ν3 = 60.6 |
| R5 = 6.783 | D5 = Variable | | |
| R6 = 7.142 | D6 = 0.12 | N4 = 1.882997 | ν4 = 40.8 |
| R7 = 1.082 | D7 = 0.57 | | |
| R8 = −1.352 | D8 = 0.28 | N5 = 1.665320 | ν5 = 55.4 |
| R9 = 1.652 | D9 = 0.34 | N6 = 1.846660 | ν6 = 23.8 |
| R10 = 36.643 | D10 = Variable | | |
| R11 = Stop | D11 = 0.19 | | |
| *R12 = 1.683 | D12 = 0.81 | N7 = 1.583130 | ν7 = 59.4 |
| R13 = −5.036 | D13 = 0.12 | N8 = 1.846660 | ν8 = 23.8 |
| R14 = −5.732 | D14 = 0.04 | | |
| R15 = 2.200 | D15 = 0.13 | N9 = 1.846660 | ν9 = 20.4 |
| R16 = 1.486 | D16 = Variable | | |
| *R17 = 2.799 | D17 = 0.56 | N10 = 1.583130 | ν10 = 59.4 |
| R18 = −2.485 | D18 = 0.12 | N11 = 1.846660 | ν11 = 23.8 |
| R19 = −4.145 | D19 = Variable | | |
| R20 = ∞ | D20 = 0.71 | N12 = 1.516330 | ν12 = 64.1 |
| R21 = ∞ | | | |

*: Aspheric Surface

| Variable | Focal length | | |
|---|---|---|---|
| Separation | 1.00 | 6.67 | 11.74 |
| D5 | 0.12 | 2.27 | 2.68 |
| D10 | 2.91 | 0.76 | 0.35 |
| D16 | 1.58 | 0.56 | 1.52 |
| D19 | 1.19 | 2.22 | 1.25 |

Aspheric Coefficients

| R12 | k = −8.86779e−02 | B = −3.57128e−02 | C = 4.77429e−04 |
|---|---|---|---|
|  | D = −2.72979e−03 | E = −1.21393e−04 | F = 0.00000e+00 |
| R17 | k = −1.42386e+01 | B = 6.71958e−02 | C = −4.70320e−02 |
|  | D = −6.15653e−03 | E = 4.84348e−02 | F = −2.77264e−02 |

TABLE 2

| Condition | Numerical Example | | | |
|---|---|---|---|---|
|  | 5 | 6 | 7 | 8 |
| (11) | 0.39 | 0.54 | 0.57 | 0.25 |
| (12) | 0.44 | 0.44 | 0.44 | 0.39 |
| (13) | 0.94 | 0.70 | 0.77 | 0.97 |
| (14) | 1.88 | 1.88 | 1.88 | 1.88 |
| (15) | 0.53 | 0.61 | 0.98 | 0.51 |
| (16) | 0.45 | 0.44 | 0.40 | 0.41 |
| (17) | 1.73 | 1.72 | 1.47 | — |
| (18) | 3.61 | 3.60 | 3.61 | 3.61 |

As has been described above with reference to the fifth to eighth embodiments, according to the fifth aspect of the invention, it is possible to provide a zoom lens of rear focus type in which the whole lens system is minimized, rapid focusing is possible, and the number of constituent lens elements is small.

Next, ninth to twelfth embodiments corresponding to zoom lenses according to the sixth to eighth aspects of the invention are described.

Figure 33:
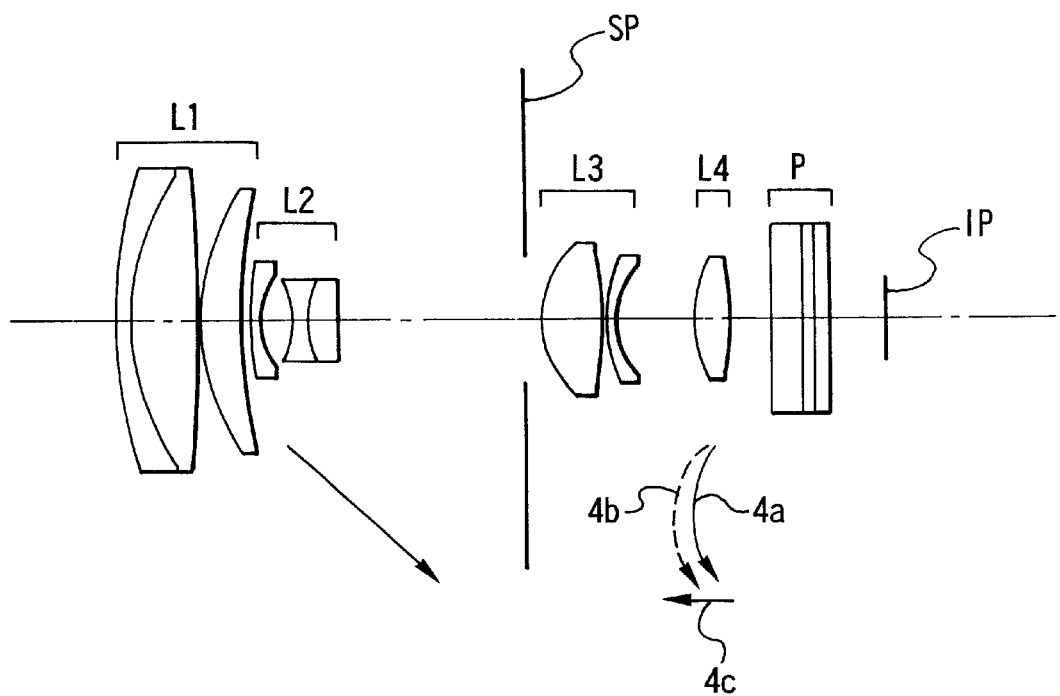
FIG. 33 is a sectional view showing a zoom lens according to a ninth embodiment of the invention.
Figure 37:
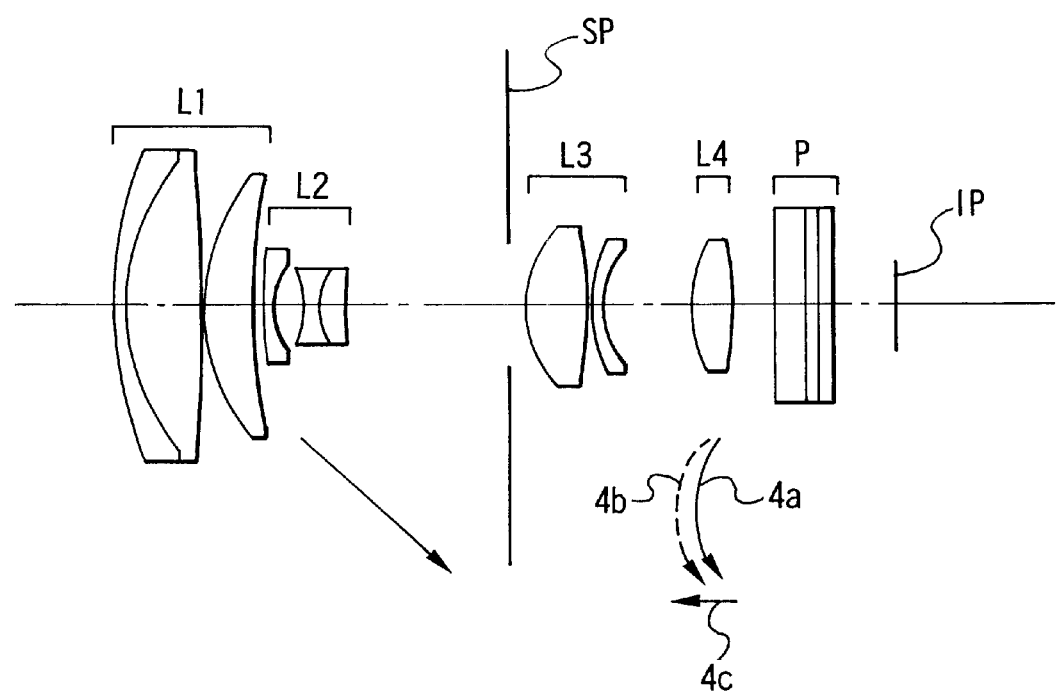
FIG. 37 is a sectional view showing a zoom lens according to a tenth embodiment of the invention.
Figure 41:
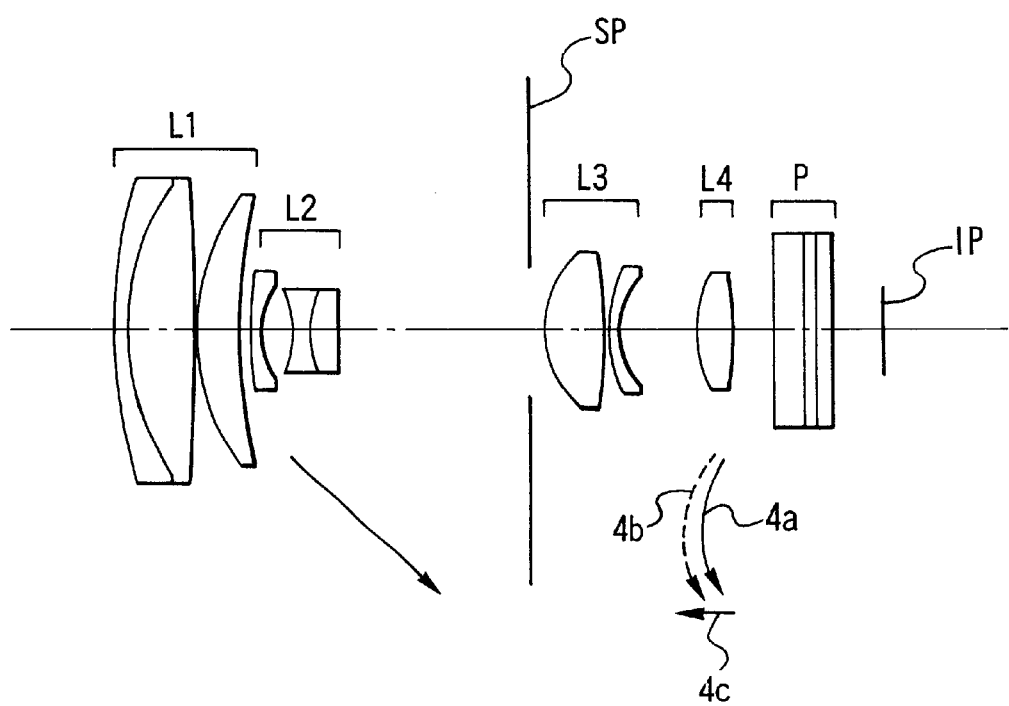
FIG. 41 is a sectional view showing a zoom lens according to an eleventh embodiment of the invention.
Figure 45:
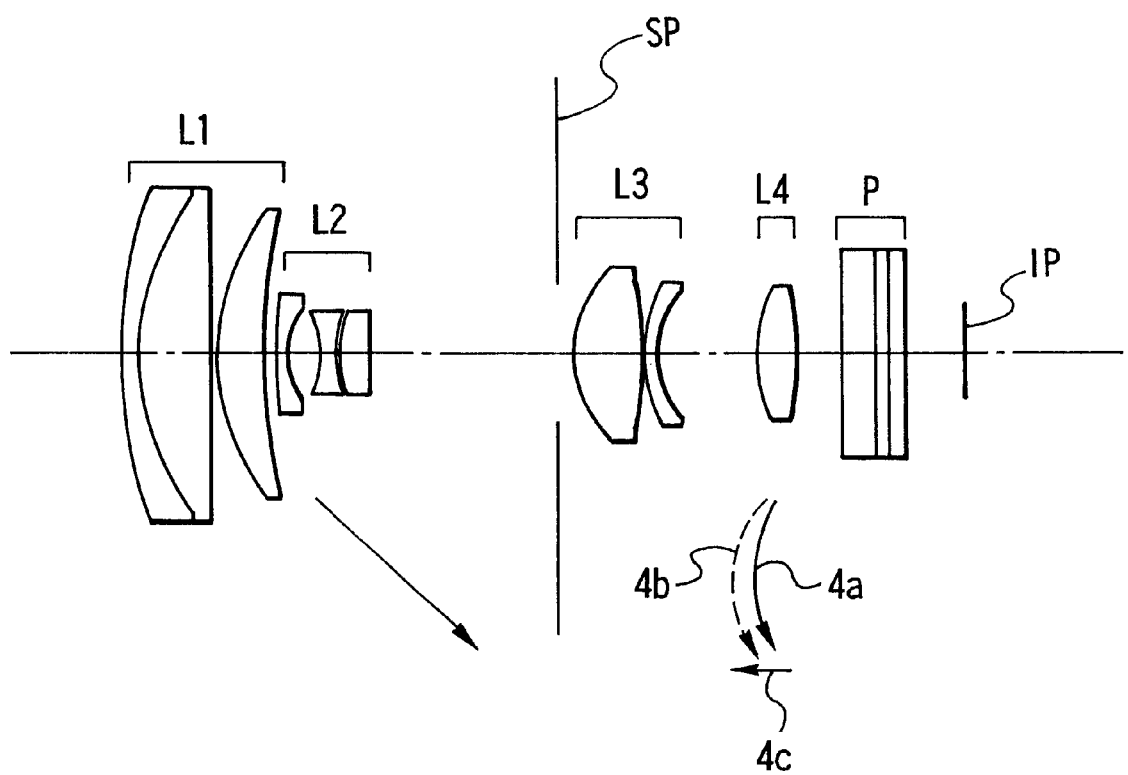
FIG. 45 is a sectional view showing a zoom lens according to a twelfth embodiment of the invention.

FIG. 33 is a sectional view showing the essential parts of a zoom lens of rear focus type according to the ninth embodiment of the invention. FIGS. 34A to 34D, 35A to 35D and 36A to 36D are aberration diagrams showing the various aberrations in the zoom positions of the wide-angle end, the middle focal length and the telephoto end, respectively, of the zoom lens according to the ninth embodiment. FIG. 37 is a sectional view showing the essential parts of a zoom lens of rear focus type according to the tenth embodiment of the invention. FIGS. 38A to 38D, 39A to 39D and 40A to 40D are aberration diagrams showing the various aberrations in the zoom positions of the wide-angle end, the middle focal length and the telephoto end, respectively, of the zoom lens according to the tenth embodiment. FIG. 41 is a sectional view showing the essential parts of a zoom lens of rear focus type according to the eleventh embodiment of the invention. FIGS. 42A to 42D, 43A to 43D and 44A to 44D are aberration diagrams showing the various aberrations in the zoom positions of the wide-angle end, the middle focal length and the telephoto end, respectively, of the zoom lens according to the eleventh embodiment. FIG. 45 is a sectional view showing the essential parts of a zoom lens of rear focus type according to the twelfth embodiment of the invention. FIGS. 46A to 46D, 47A to 47D and 48A to 48D are aberration diagrams showing the various aberrations in the zoom positions of the wide-angle end, the middle focal length and the telephoto end, respectively, of the zoom lens according to the twelfth embodiment.

In FIGS. 33, 37, 41 and 45, L1 denotes a first lens unit of positive refractive power, L2 denotes a second lens unit of negative refractive power, L3 denotes a third lens unit of positive refractive power, and L4 denotes a fourth lens unit of positive refractive power. SP stands for an aperture stop, which is disposed in front of the third lens unit L3. P stands for a glass block such as a color separation prism, a face plate, a filter or the like. IP stands for an image plane, on which an image sensor, such as a CCD, is disposed.

In the ninth to twelfth embodiments, the second lens unit is moved toward the image side as indicated by the arrow during a variation in magnification from the wide-angle end to the telephoto end, and, at the same time, the shift of an image plane due to the variation of magnification is compensated for by moving the fourth lens unit along a locus convex toward the object side.

Further, the fourth lens unit is moved along the optical axis to effect focusing, so that the rear focus type is adopted. A solid-line curve 4a and a dashed-line curve 4b shown in each of FIGS. 33, 37, 41 and 45 indicate movement loci of the fourth lens unit for compensating for the shift of an image plane due to the variation of magnification from the wide-angle end to the telephoto end when focusing is performed on an infinitely distant object and a nearest object, respectively. Incidentally, the first lens unit and the third lens unit remain stationary during the variation of magnification and during focusing.

In the ninth to twelfth embodiments, the shift of an image plane due to the variation of magnification is compensated for by moving the fourth lens unit, and focusing is effected by moving the fourth lens unit. In particular, as indicated by the solid-line curve 4a and the dashed-line curve 4b shown in each of FIGS. 33, 37, 41 and 45, the fourth lens unit is moved along a locus convex toward the object side during the variation of magnification from the wide-angle end to the telephoto end. This arrangement makes it possible to effectively utilize a space between the third lens unit and the fourth lens unit, thereby advantageously attaining the shortening of the total length of the zoom lens.

In the ninth to twelfth embodiments, when focusing from an infinitely distant object to a nearest object is performed, for example, in the telephoto end, the fourth lens unit is drawn out forward as indicated by a straight line 4c shown in FIGS. 33, 37, 41 and 45.

The zoom lens according to each of the sixth to eighth aspects of the invention has such a basic construction that the third lens unit has a stop disposed on the most object side thereof, and comprises a positive lens having a convex lens surface facing the object side, the curvature of which is stronger than that of an opposite surface thereof, and a negative lens of meniscus form having a concave surface facing the image side, the curvature of which is stronger than that of an opposite surface thereof, and the fourth lens unit consists of a positive single lens having a convex surface facing the object side, the curvature of which is stronger than that of an opposite surface thereof. This construction enables the zoom lens to maintain a high optical performance throughout the entire variable magnification range with less variation of aberration.

While the zoom lens of rear focus type according to each of the sixth to eighth aspects of the invention has the above-described basic construction, zoom lenses according to the sixth to eighth aspects of the invention have the following characteristic features.

(D1) According to the sixth aspect of the invention, the first lens unit has two or more positive lenses, and the following condition is satisfied:

$$0.28<|f2/fA|\times FNoW<0.52 \tag{19a}$$

where $fA=\sqrt{fw \cdot ft}$, and where fw and ft are focal lengths of the zoom lens at the wide-angle end and the telephoto end, respectively, FNoW is the F-number at the wide-angle end, and hd is the focal length of the second lens unit.

(D2) According to the seventh aspect of the invention, the following conditions are satisfied:

$$0.28<|f2/fA|\times FNoW<0.52 \tag{19b}$$

$$0.6<f3/f4<1.25 \tag{20b}$$

where $fA=\sqrt{fw \cdot ft}$, and where fw and ft are focal lengths of at the zoom lens in the wide-angle end and the telephoto end, respectively, FNoW is the F-number in at wide-angle end, and f2, f3 and f4 are focal lengths of the second lens unit, the third lens unit and the fourth lens unit, respectively.

(D3) According to the eighth aspect of the invention, the following condition is satisfied:

$$1.80<N2f<1.95 \tag{21c}$$

where N2f is the refractive index of material of a negative lens disposed on the most object side of the second lens unit.

Next, the technical significance of each of the above-mentioned conditions is described.

In the zoom lens of the four-unit type, if the refractive power of the second lens unit, which greatly contributes to the variation of magnification, is set as described above, it becomes possible to strengthen the refractive power of the second lens unit (1/f2), and, as a result, it becomes possible to reduce the amount of movement of the second lens unit for the variation of magnification, so that the total length of the zoom lens can be shortened.

However, such strengthening of the refractive power of the second lens unit relates to the F-number of the zoom lens, and, thus, this factor has to be taken into consideration. If it does not matter about a large F-number, i.e., a dark zoom lens, it is possible to make the focal length f2 small to any degree. However, in actuality, it is difficult to bring zoom lenses of such specifications into the market.

When the upper limit of the condition (19a) or (19b) is exceeded, with the focal length f2 too long, although it is advantageous from the point of view of aberration, the amount of movement of the second lens unit has to be enlarged for the purpose of securing a desired zoom ratio, so that the size of the whole lens system is caused to become large disadvantageously. Conversely, when the lower limit is exceeded, the Petzval sum becomes large in the negative direction and, thus, the image plane is caused to incline, so that it becomes difficult to maintain a good optical performance.

The condition (20b) defines an optimum distribution of refractive power for reducing the sizes of the third lens unit and the fourth lens unit, which serve as an image forming system. In particular, when the interval between the third lens unit and the fourth lens unit is made optimum, a light beam exiting from the third lens unit is made incident on the fourth lens unit in an approximately afocal manner, so that an optimum back focal distance can be secured.

When the upper limit of the condition (20b) is exceeded, a light beam exiting from the third lens unit deviates from an afocal manner, so that the size of the fourth lens unit is increased. Further, a variation of aberration due to the movement of the fourth lens unit becomes large disadvantageously. Conversely, when the lower limit is exceeded, the refractive power of the fourth lens unit becomes weak, so that the amount of movement of the fourth lens unit for focusing becomes large, thereby increasing the total length of the zoom lens.

The condition (21c) is concerned with the Petzval sum and is set forth to correct curvature of field in a good balance.

When the upper limit of the condition (21c) is exceeded, although being advantageous from the point of view of correction of the curvature of field, the Abbe number becomes too small taking into consideration the actually usable glass material, so that it becomes difficult to correct chromatic aberration. Conversely, when the lower limit is exceeded, the image plane is caused to curve in the manner concave toward the object side disadvantageously.

In addition, it is preferred that the zoom lenses according to the sixth to eighth aspects of the invention have the following characteristic features.

(E1) According to the sixth aspect of the invention, the following condition is satisfied:

$$0.6<f3/f4<1.25 \tag{20a}$$

where f3 and f4 are focal lengths of the third lens unit and the fourth lens unit, respectively.

The technical significance of the condition (20a) is the same as that of the above-mentioned condition (20b).

(E2) According to the eighth aspect of the invention, the following condition is satisfied:

$$0.28<|f2/fA|\times FNoW<0.52 \tag{19c}$$

where $fA=\sqrt{fw \cdot ft}$, and where fw and ft are focal lengths of the zoom lens at the wide-angle end and the telephoto end, respectively, FNoW is the F-number at the wide-angle end, and f2 is the focal length of the second lens unit.

The technical significance of the condition (19c) is the same as that of the above-mentioned condition (19a) or (19b).

(E3) According to each of the sixth to eighth aspects of the invention, the following conditions are satisfied:

$$0.3<Rr/\{(Nr-1)\times fA\}<0.7 \tag{22}$$

$$0.3<|D3/fA|\times\sqrt{FNoW}<0.6 \tag{23}$$

where $fA=\sqrt{fw \cdot ft}$, and where fw and ft are focal lengths of the zoom lens at the wide-angle end and the telephoto end, respectively, Rr is the radius of curvature of the lens surface on the image side of the negative lens of meniscus form disposed on the most image side of the third lens unit, Nr is the refractive index of material of the negative len of meniscus form disposed on the most image side of the third lens unit, D3 is the distance from a lens surface on the most object side of the third lens unit to a lens surface on the most image side of the third lens unit, and FNoW is the F-number at the wide-angle end.

When the upper limit of the condition (22) is exceeded, the effect of the telephoto type in the third lens unit becomes small, and, thus, the back focal distance becomes short disadvantageously. Conversely, when the lower limit is exceeded, the radius of curvature Rr becomes too small, so that aberrations occurring at the lens surface on the image side of the negative lens becomes too large, which are difficult to correct at the third lens unit. At the same time, the distance between the negative lens and the fourth lens unit becomes too narrow, so that the negative lens interferes with the fourth lens unit disadvantageously.

When the upper limit of the condition (23) is exceeded, the total length of the zoom lens is cause to increase. Conversely, when the lower limit is exceeded, although being advantageous from the point of view of the total length of the zoom lens, it becomes difficult to secure a large aperture ratio in F-number.

(E4) According to each of the sixth to eighth aspects of the invention, the second lens unit comprises two or more negative lenses and one positive lens.

Incidentally, the negative lens and the positive lens included in the second lens unit may be separated from each other or may be cemented together.

(E5) According to each of the sixth to eighth aspects of the invention, the second lens unit comprises, in order from the object side to the image side, a negative first lens having a concave surface facing the image side a curvature of which is stronger than that of an opposite surface thereof, a negative second lens both lens surfaces of which are concave, and a positive third lens having a convex surface facing the object side a curvature of which is stronger than that of an opposite surface thereof.

(E6) According to each of the sixth to eighth aspects of the invention, in the second lens unit, the negative second lens both lens surfaces of which are concave and the positive third lens a curvature of which is stronger than that of an opposite surface thereof are cemented together.

(E7) According to each of the sixth to eighth aspects of the invention, the second lens unit has an aspheric surface.

Next, the above-mentioned features (E4) to (E7) are described in more detail.

In a case where a variable magnification ratio is increased in the zoom lens of the type according to the ninth to twelfth embodiments, it is necessary to increase the amount of movement of the second lens unit, which greatly contributes to the variable magnification function, or to shorten the focal length of the second lens unit.

The former method causes an increase of the size of the whole zoom lens disadvantageously. The latter method, although not causing an increase of the size of the whole zoom lens, brings a large burden onto the second lens unit, so that it becomes difficult to maintain a good optical performance. Therefore, according to the sixth to eighth aspects of the invention, the second lens unit is constructed in such a way as to satisfy at least one of the above-mentioned conditions (E4) to (E6), so that the optical performance can be corrected properly. Then, the aspheric surface is disposed as defined in the condition (E7), so that the optical performance for an off-axial light beam can be corrected well.

(E8) According to each of the sixth to eighth aspects of the invention, the following condition is satisfied:

$$1.0 < |R0/f2| < 4.0 \tag{24}$$

where R0 is a radius of curvature adjacent to the optical axis of the aspheric surface provided in the second lens unit, and f2 is a focal length of the second lens unit.

The aspheric surface provided in the second lens unit is disposed on a lens surface whose radius of curvature is small, so that aberrations can be effectively corrected. In particular, off-axial flare is corrected well.

When the upper limit of the condition (24) is exceeded, the effect for correcting the optical performance for an off-axial light beam becomes small disadvantageously. Conversely, when the lower limit is exceeded, with the radius of curvature becoming too small, it becomes difficult to produce the aspheric surface.

Incidentally, it is desirable that the aspheric surface has such a shape that a refractive power becomes progressively weaker toward the margin of the lens.

(E9) According to each of the sixth to eighth aspects of the invention, the third lens unit or the fourth lens unit has an aspheric surface.

This construction enables the aberration occurring in the image forming optical system to be corrected well. In particular, when the aspheric surface is disposed in the third lens unit, it becomes ease to make the F-number small.

(E10) According to each of the sixth to eighth aspects of the invention, the following condition is satisfied:

$$2.7 < L/fA < 3.9 \tag{25}$$

where $fA = \sqrt{fw \cdot ft}$, and where fw and ft are focal lengths of the zoom lens at the wide-angle end and the telephoto end, respectively, L is the distance from the first lens surface on the object side of the zoom lens to a paraxial image plane (wherein the thickness of the dummy glass, such as a low-pass filter, disposed on the most image side is a value reduced to air).

When the upper limit of the condition (25) is exceeded, the total length of the zoom lens is increased disadvantageously. Conversely, when the lower limit is exceeded, the Petzval sum becomes large in the negative direction and, thus, the image plane is caused to incline, so that it becomes difficult to maintain a good optical performance.

Next, four numerical examples 9 to 12 of the invention are shown. The numerical data in the numerical examples 9 to 12 correspond to the zoom lenses according to the ninth to twelfth embodiments shown in the sectional views of FIGS. 33, 37, 41 and 45, respectively.

The values of the factors in the above-mentioned conditions for the numerical examples 9 to 12 are listed in Table-3.

NUMERICAL EXAMPLE 9 f = 1–9.67  Fno = 1.66–2.57  2ω = 55.6–6.2

| | | | |
|---|---|---|---|
| R1 = 7.506 | D1 = 0.19 | N1 = 1.846660 | ν1 = 23.8 |
| R2 = 3.741 | D2 = 0.98 | N2 = 1.696797 | ν2 = 55.5 |
| R3 = −38.186 | D3 = 0.05 | | |
| R4 = 3.371 | D4 = 0.61 | N3 = 1.696797 | ν3 = 55.5 |
| R5 = 8.534 | D5 = Variable | | |
| R6 = 4.957 | D6 = 0.14 | N4 = 1.882997 | ν4 = 40.8 |
| R7 = 1.116 | D7 = 0.46 | | |
| *R8 = −1.299 | D8 = 0.26 | N5 = 1.665320 | ν5 = 55.4 |
| R9 = 1.712 | D9 = 0.42 | N6 = 1.846660 | ν6 = 23.8 |
| R10 = 25.797 | D10 = Variable | | |
| R11 = Stop | D11 = 0.22 | | |
| *R12 = 1.266 | D12 = 0.90 | N7 = 1.552324 | ν7 = 63.8 |
| *R13 = −5.872 | D13 = 0.04 | | |
| R14 = 2.151 | D14 = 0.15 | N8 = 1.846660 | ν8 = 23.8 |
| R15 = 1.168 | D15 = Variable | | |
| *R16 = 1.855 | D16 = 0.51 | N9 = 1.496999 | ν9 = 81.6 |
| R17 = −4.945 | D17 = Variable | | |
| R18 = ∞ | D18 = 0.44 | N10 = 1.516800 | ν10 = 64.2 |
| R19 = ∞ | D19 = 0.18 | N11 = 1.552320 | ν11 = 63.4 |
| R20 = ∞ | D20 = 0.21 | N12 = 1.556710 | ν12 = 58.6 |
| R21 = ∞ | | | |

*: Aspheric Surface

| Variable | Focal length | | |
|---|---|---|---|
| Separation | 1.00 | 5.87 | 9.67 |
| D5 | 0.14 | 2.12 | 2.50 |
| D10 | 2.77 | 0.78 | 0.41 |
| D15 | 1.15 | 0.52 | 1.31 |
| D17 | 0.61 | 1.24 | 0.45 |

Aspheric Coefficients

| | | | |
|---|---|---|---|
| R8 | k = −6.01551e+00 | B = −2.81172e−01 | C = −1.11985e−01 |
| | D = 9.87701e−01 | E = −1.74141e−01 | F = −2.23489e+00 |
| R12 | k = −1.60892e+00 | B = 3.17184e−02 | C = 4.34082e−04 |
| | D = −2.48323e−03 | E = −1.86950e−04 | F = 0.00000e+00 |
| R13 | k = 5.90854e+00 | B = 3.42485e−03 | C = 1.32589e−02 |
| | D = −1.36387e−02 | E = 4.33380e−03 | F = 0.00000e+00 |
| R16 | k = −9.54777e+00 | B = 1.36056e−01 | C = −1.00685e−01 |
| | D = −1.90478e−02 | E = 1.23168e−01 | F = −7.80850e−02 |

NUMERICAL EXAMPLE 10 f = 1–9.67  Fno = 1.66–2.80  2ω = 55.6–6.2

| | | | |
|---|---|---|---|
| R1 = 5.946 | D1 = 0.19 | N1 = 1.846660 | ν1 = 23.8 |
| R2 = 3.160 | D2 = 1.08 | N2 = 1.620410 | ν2 = 60.3 |
| R3 = −36.488 | D3 = 0.05 | | |
| R4 = 2.933 | D4 = 0.70 | N3 = 1.696797 | ν3 = 55.5 |
| R5 = 9.589 | D5 = Variable | | |
| R6 = 8.034 | D6 = 0.14 | N4 = 1.882997 | ν4 = 40.8 |
| R7 = 0.992 | D7 = 0.43 | | |
| *R8 = −1.391 | D8 = 0.26 | N5 = 1.696797 | ν5 = 55.5 |
| R9 = 1.011 | D9 = 0.36 | N6 = 1.846660 | ν6 = 23.8 |
| R10 = 6.499 | D10 = Variable | | |
| R11 = Stop | D11 = 0.22 | | |
| *R12 = 1.326 | D12 = 0.92 | N7 = 1.552324 | ν7 = 63.8 |
| *R13 = −5.306 | D13 = 0.04 | | |
| R14 = 1.903 | D14 = 0.15 | N8 = 1.922860 | ν8 = 18.9 |
| R15 = 1.201 | D15 = Variable | | |
| *R16 = 1.831 | D16 = 0.58 | N9 = 1.496999 | ν9 = 81.6 |
| R17 = −5.134 | D17 = Variable | | |
| R18 = ∞ | D18 = 0.44 | N10 = 1.516800 | ν10 = 64.2 |
| R19 = ∞ | D19 = 0.18 | N11 = 1.552320 | ν11 = 63.4 |
| R20 = ∞ | D20 = 0.21 | N12 = 1.556710 | ν12 = 58.6 |
| R21 = ∞ | | | |

*: Aspheric Surface

| Variable | Focal length | | |
|---|---|---|---|
| Separation | 1.00 | 5.91 | 9.67 |
| D5 | 0.14 | 1.75 | 2.05 |
| D10 | 2.32 | 0.71 | 0.41 |
| D15 | 1.29 | 0.53 | 1.36 |
| D17 | 0.61 | 1.37 | 0.54 |

Aspheric Coefficients

| | | | |
|---|---|---|---|
| R8 | k = −5.38335e+00 | B = −2.46508e−01 | C = −1.99581e−01 |
| | D = 1.21619e+00 | E = −2.03661e+00 | F = 2.20802e+00 |
| R12 | k = −1.81605e+00 | B = 3.62631e−02 | C = −4.15138e−04 |
| | D = −4.81746e−03 | E = 2.90392e−03 | F = 0.00000e+00 |
| R13 | k = 5.96573e+00 | B = 1.12156e−02 | C = 1.14591e−02 |
| | D = −1.01287e−02 | E = 4.61390e−03 | F = 0.00000e+00 |
| R16 | k = −8.87984e+00 | B = 1.36771e−01 | C = −9.73892e−02 |
| | D = −2.39742e−02 | E = 1.18600e−01 | F = −6.81917e−02 |

NUMERICAL EXAMPLE 11 f = 1–9.67  Fno = 1.66–2.64  2ω = 55.6–6.2

| | | | |
|---|---|---|---|
| R1 = 7.738 | D1 = 0.19 | N1 = 1.846660 | ν1 = 23.8 |
| R2 = 3.741 | D2 = 0.97 | N2 = 1.696797 | ν2 = 55.5 |
| R3 = −44.204 | D3 = 0.05 | | |
| R4 = 3.336 | D4 = 0.63 | N3 = 1.696797 | ν3 = 55.5 |
| R5 = 8.737 | D5 = Variable | | |
| R6 = 5.853 | D6 = 0.14 | N4 = 1.882997 | ν4 = 40.8 |
| R7 = 1.073 | D7 = 0.49 | | |
| *R8 = −1.364 | D8 = 0.26 | N5 = 1.665320 | ν5 = 55.4 |
| R9 = 1.484 | D9 = 0.39 | N6 = 1.846660 | ν6 = 23.8 |
| R10 = 92.521 | D10 = Variable | | |
| R11 = Stop | D11 = 0.22 | | |
| *R12 = 1.321 | D12 = 0.92 | N7 = 1.583126 | ν7 = 59.4 |
| *R13 = −5.445 | D13 = 0.04 | | |
| R14 = 2.001 | D14 = 0.15 | N8 = 1.922860 | ν8 = 18.9 |
| R15 = 1.161 | D15 = Variable | | |
| *R16 = 1.979 | D16 = 0.50 | N9 = 1.516330 | ν9 = 64.2 |
| R17 = −6.534 | D17 = Variable | | |
| R18 = ∞ | D18 = 0.44 | N10 = 1.516800 | ν10 = 64.2 |
| R19 = ∞ | D19 = 0.18 | N11 = 1.552320 | ν11 = 63.4 |
| R20 = ∞ | D20 = 0.21 | N12 = 1.556710 | ν12 = 58.6 |
| R21 = ∞ | | | |

*: Aspheric Surface

| Variable | Focal length | | |
|---|---|---|---|
| Separation | 1.00 | 5.80 | 9.67 |
| D5 | 0.14 | 2.16 | 2.54 |
| D10 | 2.81 | 0.79 | 0.41 |
| D15 | 1.16 | 0.50 | 1.31 |
| D17 | 0.61 | 1.27 | 0.46 |

Aspheric Coefficients

| | | | |
|---|---|---|---|
| R8 | k = −6.27485e+00 | B = −2.63801e−01 | C = −1.39634e−01 |
| | D = 8.33755e−01 | E = 1.04156e+00 | F = −4.78477e+00 |
| R12 | k = −1.63532e+00 | B = 3.35578e−02 | C = 9.90614e−04 |
| | D = −1.64167e−03 | E = 8.11602e−04 | F = 0.00000e+00 |
| R13 | k = 4.48405e+00 | B = 1.74350e−02 | C = 1.00442e−02 |
| | D = −1.05250e−02 | E = 4.04932e−03 | F = 0.00000e+00 |
| R16 | k = −1.08156e+01 | B = 1.36681e−01 | C = −1.02670e−01 |
| | D = −9.55943e−03 | E = 1.22717e−01 | F = −9.29676e−02 |

NUMERICAL EXAMPLE 12 f = 1–9.67  Fno = 1.66–2.77  2ω = 55.6–6.2

| | | | |
|---|---|---|---|
| R1 = 6.549 | D1 = 0.19 | N1 = 1.846660 | ν1 = 23.8 |
| R2 = 3.399 | D2 = 1.01 | N2 = 1.696797 | ν2 = 55.5 |
| R3 = −103.267 | D3 = 0.05 | | |
| R4 = 3.120 | D4 = 0.65 | N3 = 1.696797 | ν3 = 55.5 |
| R5 = 8.390 | D5 = Variable | | |
| R6 = 7.257 | D6 = 0.14 | N4 = 1.882997 | ν4 = 40.8 |
| R7 = 1.026 | D7 = 0.45 | | |
| *R8 = −1.164 | D8 = 0.22 | N5 = 1.589130 | ν5 = 61.1 |
| R9 = 1.548 | D9 = 0.06 | | |
| R10 = 1.864 | D10 = 0.36 | N6 = 1.846660 | ν6 = 23.8 |
| R11 = 33.249 | D11 = Variable | | |
| R12 = Stop | D12 = 0.22 | | |
| *R13 = 1.374 | D13 = 0.89 | N7 = 1.583126 | ν7 = 59.4 |
| *R14 = −5.165 | D14 = 0.04 | | |
| R15 = 1.981 | D15 = 0.15 | N8 = 1.922860 | ν8 = 18.9 |
| R16 = 1.225 | D16 = Variable | | |
| *R17 = 2.137 | D17 = 0.50 | N9 = 1.496999 | ν9 = 81.6 |
| R18 = −5.015 | D18 = Variable | | |
| R19 = ∞ | D19 = 0.44 | N10 = 1.516800 | ν10 = 64.2 |
| R20 = ∞ | D20 = 0.18 | N11 = 1.552320 | ν11 = 63.4 |
| R21 = ∞ | D21 = 0.21 | N12 = 1.556710 | ν12 = 58.6 |
| R22 = ∞ | | | |

*: Aspheric Surface

| Variable | Focal length | | |
|---|---|---|---|
| Separation | 1.00 | 5.69 | 9.67 |
| D 5 | 0.14 | 1.94 | 2.28 |
| D10 | 2.55 | 0.75 | 0.41 |
| D16 | 1.35 | 0.62 | 1.42 |
| D18 | 0.61 | 1.34 | 0.54 |

Aspheric Coefficients

| | | | |
|---|---|---|---|
| R8 | k = −3.84075e+00 | B = −2.26600e−01 | C = −8.47209e−02 |
| | D = 8.17709e−01 | E = 1.22051e+00 | F = −6.42821e+00 |
| R13 | k = −1.56685e+00 | B = 2.48801e−02 | C = 1.58914e−03 |
| | D = −2.08932e−03 | E = 1.65441e−03 | F = 0.00000e+00 |
| R14 | k = 2.93617e+00 | B = 1.83007e−02 | C = 8.75775e−03 |
| | D = −9.87352e−03 | E = 4.59530e−03 | F = 0.00000e+00 |
| R17 | k = −1.25951e+01 | B = 1.25462e−01 | C = −1.04111e−01 |
| | D = −1.78420e−02 | E = 1.37751e−01 | F = −9.32434e−02 |

TABLE 3

| | Numerical Example | | | |
|---|---|---|---|---|
| Condition | 9 | 10 | 11 | 12 |
| (19a), (19b) | 0.46 | 0.37 | 0.47 | 0.42 |
| (20a), (20b) | 1.14 | 1.06 | 1.00 | 0.93 |
| (22) | 0.44 | 0.42 | 0.40 | 0.43 |
| (23) | 0.45 | 0.46 | 0.46 | 0.45 |
| (24) | 1.50 | 2.00 | 1.55 | 1.50 |
| (25) | 3.53 | 3.52 | 3.52 | 3.51 |
| (21c) | 1.88 | 1.88 | 1.88 | 1.88 |

As has been described above with reference to the ninth to twelfth embodiments, according to each of the sixth to eighth aspects of the invention, it is possible to provide a zoom lens of rear focus type in which the whole lens system is minimized, rapid focusing is possible, a mechanism thereof is simple with the first lens unit remaining stationary during zooming, a high optical performance is secured regardless of a high variable magnification ratio, and the number of constituent lens elements is small regardless of a large aperture ratio.

Besides, it is possible to provide a zoom lens of the rear focus type in which the whole lens system is minimized, rapid focusing is possible, a mechanism thereof is simple with the first lens unit remaining stationary during zooming, a high optical performance is secured regardless of a high variable magnification ratio, such as a zoom ratio of 10, and the number of constituent lens elements is small regardless of a large aperture ratio, such as an F-number of 1.6.

Next, a video camera using, as a photographic optical system, the zoom lens described in each of the first to twelfth embodiments is described with reference to FIG. 49.

Figure 49:
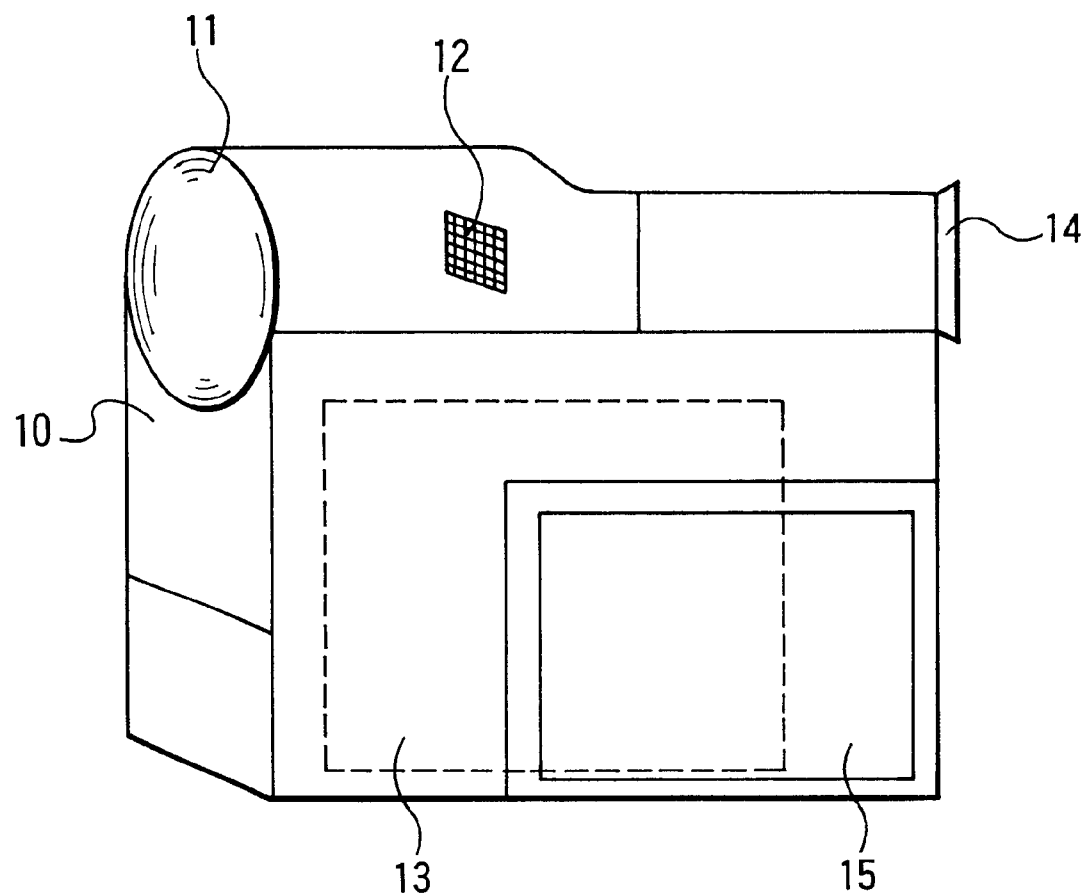
FIG. 49 is a schematic diagram showing the essential parts of an optical apparatus having a zoom lens according to any one of the first to twelfth embodiments.

In FIG. 49, there are schematically illustrated a video camera body 10, a photographic optical system 11 which is composed of the zoom lens described in any one of the first to twelfth embodiments, an image sensor 12, such as a CCD, arranged to receive an object image formed by the photographic optical system 11, a recording means 13 for recording the object image received by the image sensor 12, and a viewfinder 14 for viewing the object image displayed on a display element (not shown). The display element is composed of a liquid crystal panel or the like, on which the object image formed on the image sensor 12 is displayed. A liquid crystal display element 15 has the same function as that of the viewfinder 14.

As described above, when the zoom lens described in each of the first to twelfth embodiments is used in an optical apparatus, such as a video camera, it is possible to realize a small-sized optical apparatus having a high optical performance.

What is claimed is:

1. A zoom lens comprising, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by moving said second lens unit toward the image side, shifting of an image plane due to the variation of magnification is compensated for by moving said fourth lens unit and focusing is effected by moving said fourth lens unit, a stop being disposed on the most object side of said third lens unit, said third lens unit comprising a positive lens disposed on the image side of said stop and just behind said stop and having a convex lens surface facing the object side, at least one of lens surfaces of said positive lens being an aspheric surface, and a negative lens of meniscus form disposed on the most image side and having a concave surface facing the image side, the curvature of which is stronger than that of an opposite surface thereof, said fourth lens unit consisting of a cemented lens composed of a positive lens both lens surfaces of which are convex and at least one lens surface of which is an aspheric surface and a negative lens, and the following conditions being satisfied:

$$0.37 < \beta 4T < 0.49$$

$$0.6 < f3/f4 < 1.15$$

where β4T is the magnification of said fourth lens unit obtained when focusing on an infinitely distant object in the telephoto end, and f3 and f4 are focal lengths of said third lens unit and said fourth lens unit, respectively.

2. A zoom lens comprising, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by moving said second lens unit toward the image side, shifting of an image plane due to the variation of magnification is compensated for by moving said fourth lens unit and focusing is effected by moving said fourth lens unit, a stop being disposed on the most object side of said third lens unit, said third lens unit comprising a positive lens disposed on the image side of said stop and just behind said stop and having a convex lens surface facing the object side, at least one of the lens surfaces of said positive lens being an aspheric surface, and a negative lens of meniscus form disposed on the most image side and having a concave surface facing the image side, the curvature of which is stronger than that of an opposite surface thereof, said fourth lens unit consisting of a cemented lens composed of a positive lens, both lens surfaces of which are convex and at least one lens surface of which is an aspheric surface and a negative lens, and the following condition being satisfied:

$$0.37 < \beta 4T < 0.43$$

where β4T is the magnification of said fourth lens unit obtained when focusing on an infinitely distant object at the telephoto end.

3. A zoom lens comprising, in order from an object side to an image side, a first lens unit of positive refractive power, a second lens unit of negative refractive power, a third lens unit of positive refractive power and a fourth power lens unit of positive refractive power, wherein a variation of magnification from a wide-angle end to a telephoto end is effected by moving said second lens unit toward the image side, shifting of an image plane due to the variation of magnification is compensated for by moving said fourth lens unit and focusing is effected by moving said fourth lens unit, a stop being disposed on the most object side of said third lens unit said third lens unit comprising a positive lens disposed on the image side of said stop and just behind said stop and having a convex lens surface facing the object side, at least one of the lens surfaces of said positive lens being an aspheric surface, and a negative lens of meniscus form disposed on the most image side and having a concave surface facing the image side, the curvature of which is stronger than that of an opposite surface thereof, said fourth lens unit consisting of a cemented lens composed of a positive lensu, both lens surfaces of which are convex and at least one lens surface of which is an aspheric surface and a negative lens, and the following conditions being satisfied:

$$0.28 < \{|f2/fA|\} \times FNW < 0.51$$

$$0.3 < Rr/\{(Nr-1)fA\} < 0.6$$

where $fA = \sqrt{fw \cdot ft}$, and where fw and ft are focal lengths of said zoom lens at the wide-angle end and the telephoto end, respectively, FNW is the F-number at the wide-angle end, Rr is the radius of curvature of the lens surface on the image side of said negative lens, Nr is the refractive index of material of said negative lens, and f2 is the focal length of said second lens unit.

4. A zoom lens comprising, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by moving said second lens unit toward the image side, shifting of an image plane due to the variation of magnification is compensated for by moving said fourth lens unit and focusing is effected by moving said fourth lens unit, a stop being disposed on the most object side of said third lens unit, said third lens unit comprising a positive lens disposed on the image side of said stop and just behind said stop and having a convex lens surface facing the object side, at least one of the lens surfaces of said positive lens being an aspheric surface, and a negative lens of meniscus form disposed on the most image side and having a concave surface facing the image side, the curvature of which is stronger than that of an opposite surface thereof, said fourth lens unit consisting of a cemented lens composed of a positive lens, both lens surfaces of which are convex and at least one lens surface of which is an aspheric surface and a negative lens, and the following conditions being satisfied:

$$0.28 < \{|f2/fA|\} \times FNW < 0.51$$

$$0.6 < f3/f4 < 1.15$$

where $fA = \sqrt{fw \cdot ft}$, and where fw and ft are focal lengths of said zoom lens at the wide-angle end and the telephoto end, respectively, FNW is the F-number at the wide-angle end, and f2, f3 and f4 are focal lengths of said second lens unit, said third lens unit and said fourth lens unit, respectively.

5. A zoom lens according to claim 1, 2 or 4, wherein the following condition is satisfied:

$$0.3 < Rr/\{(Nr-1)fA\} < 0.6$$

where $fA = \sqrt{fw \cdot ft}$, and where fw and ft are focal lengths of said zoom lens at the wide-angle end and the telephoto end, respectively, Rr is the radius of curvature of the lens surface on the image side of said negative lens, and Nr is the refractive index of material of said negative lens.

6. A zoom lens according to claim 2 or 3, wherein the following condition is satisfied:

$$0.6 < f3/f4 < 1.15$$

where f3 and f4 are focal lengths of said third lens unit and said fourth lens unit, respectively.

7. A zoom lens according to any one of claims 1 to 4, wherein said second lens unit comprises two or more negative lenses and one positive lens.

8. A zoom lens according to claim 7, wherein said second lens unit comprises, in order from the object side to the image side, a negative first lens having a concave surface facing the image side, the curvature of which is stronger than that of an opposite surface thereof, a negative second lens, both lens surfaces of which are concave, and a positive third lens having a convex surface facing the object side, the curvature of which is stronger than that of an opposite surface thereof.

9. A zoom lens according to claim 8, wherein said negative second lens and said positive third lens of said second lens unit are cemented together.

10. A zoom lens according to any one of claims 1 to 4, wherein said second lens unit has an aspheric surface.

11. A zoom lens according to claim 10, wherein the following condition is satisfied:

$$1.0<|R0/f2|<4.0$$

where R0 is the radius of curvature adjacent to an optical axis of the aspheric surface included in said second lens unit, and f2 is the focal length of said second lens unit.

12. A zoom lens according to any one of claims 1 to 4, wherein following condition is satisfied:

$$2.7<L/fA<3.9$$

where $fA=\sqrt{fw \cdot ft}$, and where fw and ft are focal lengths of said zoom lens at the wide-angle end and the telephoto end, respectively, and L is the distance from the first lens surface on the object side of said first lens unit to a paraxial image plane.

13. A zoom lens according to any one of claims 1 to 4, wherein the following condition is satisfied:

$$1.84<N2f<1.95$$

where N2f is the refractive index of material of a negative lens disposed on the most object side of said second lens unit.

14. A zoom lens according to any one of claims 1 to 4, wherein the following condition is satisfied:

$$0.15<D3/fA<0.54$$

where $fA=\sqrt{fw \cdot ft}$, and where fw and ft are focal lengths of said zoom lens at the wide-angle end and the telephoto end, respectively, and D3 is the distance on an optical axis from a lens surface on the most object side of said third lens unit to a lens surface on the most image side of said third lens unit.

15. A zoom lens comprising, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by increasing an interval between said first lens unit and said second lens unit and decreasing an interval between said second lens unit and said third lens unit, shifting of an image plane due to the variation of magnification is compensated for by moving said fourth lens unit and focusing is effected by moving said fourh lens unit, said third lens unit consisting of, in order from the object side to the image side, a stop, a cemented lens composed of a positive lens, both lens surfaces of which are convex and a negative lens, and a negative lens of meniscus form having a concave surface facing the image side, and said fourth lens unit consisting of a positive single lens having a convex surface facing the object side or a cemented lens composed of a positive lens and a negative lens.

16. A zoom lens according to claim 15, wherein the following condition is satisfied:

$$0.20<\beta 4T<0.63$$

where β4T is the magnification of said fourth lens unit obtained when focusing on an infinitely distant object in the telephoto end.

17. A zoom lens according to claim 15, wherein the following condition is satisfied:

$$0.31<|f2/fA|\times FNW<0.52$$

where $fA=\sqrt{fw \cdot ft}$, and where fw and ft are focal lengths of said zoom lens at the wide-angle end and the telephoto end, respectively, and FNW is the F-number at the wide-angle end.

18. A zoom lens according to claim 15, wherein the following condition is satisfied:

$$0.63<f3/f4<1.16$$

where f3 and f4 are focal lengths of said third lens unit and said fourth lens unit, respectively.

19. A zoom lens according to claim 15, wherein said second lens unit has a negative lens disposed on the most object side thereof, and the following condition is satisfied:

$$1.80<N2f<1.95$$

where N2f is a refractive index of material of said negative lens disposed on the most object side of said second lens unit.

20. A zoom lens according to claim 15, wherein the following conditions are satisfied:

$$0.4<Rr/\{(Nr-1)fA\}<1.2$$

$$0.3<|D3L/fA|\times\sqrt{FNW}<0.6$$

where $fA=\sqrt{fw \cdot ft}$, and where fw and ft are focal lengths of said zoom lens at the wide-angle end and the telephoto end, respectively, Rr is the radius of curvature of a lens surface on the image side of the negative lens disposed on the most image side of said third lens unit, Nr is the refractive index of material of the negative lens disposed on the most image side of said third lens unit, D3L is the distance from a lens surface on the most object side of said third lens unit to a lens surface on the most image side of said third lens unit, and FNW is the F-number at the wide-angle end.

21. A zoom lens according to claim 15, wherein said second lens unit comprises two or more negative lenses and one positive lens.

22. A zoom lens according to claim 21, wherein said second lens unit consists of, in order from the object side to the image side, a negative first lens having a concave surface facing the image side, a negative second lens both lens surfaces of which are concave, and a positive third lens having a convex surface facing the object side.

23. A zoom lens according to claim 22, wherein said negative second lens and said positive third lens of said second lens unit are cemented together.

24. A zoom lens according to claim 15, wherein said second lens unit has an aspheric surface.

25. A zoom lens according to claim 24, wherein the aspheric surface included in said second lens unit is disposed on a lens surface in which the following condition is satisfied:

$$1.1<|R0/f2|<3.0$$

where R0 is the radius of curvature adjacent to an optical axis of the lens surface, and f2 is the focal length of said second lens unit.

26. A zoom lens according to claim 15, wherein said third lens unit or said fourth lens unit has an aspheric surface.

27. A zoom lens according to claim 15, wherein the following condition is satisfied:

$$2.9<L/fA<4.3$$

where $fA=\sqrt{fw \cdot ft}$, and where fw and ft are focal lengths of said zoom lens at the wide-angle end and the telephoto end, respectively, and L is the distance from the first lens surface on the object side of said zoom lens to a paraxial image plane.

28. A zoom lens comprising, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by moving said second lens unit toward the image side, shifting of an image plane due to the variation of magnification is compensated for by moving said fourth lens unit and focusing is effected by moving said fourth lens unit, said first lens unit comprising two or more positive lenses, said third lens unit having a stop disposed on the most object side thereof and comprising a positive lens having a convex surface facing the object side, the curvature of which is stronger than that of an opposite surface thereof, and a negative lens of meniscus form having a concave surface facing the image side, the curvature of which is stronger than that of an opposite surface thereof, said fourth lens unit consisting of a positive single lens having a convex surface facing the object side, the curvature of which is stronger than that of an opposite surface thereof, and the following condition being satisfied:

$$0.28<|f2/fA|\times FNoW<0.52$$

where $fA=\sqrt{fw \cdot ft}$, and where fw and ft are focal lengths of said zoom lens at the wide-angle end and the telephoto end, respectively, FNoW is the F-number at the wide-angle end, and f2 is a focal length of said second lens unit.

29. A zoom lens comprising, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by moving said second lens unit toward the image side, shifting of an image plane due to the variation of magnification is compensated for by moving said fourth lens unit and focusing is effected by moving said fourth lens unit, said third lens unit having a stop disposed on the most object side thereof and comprising a positive lens having a convex surface facing the object side, the curvature of which is stronger than that of an opposite surface thereof, and a negative lens of meniscus form having a concave surface facing the image side, the curvature of which is stronger than that of an opposite surface thereof, said fourth lens unit consisting of a positive single lens having a convex surface facing the object side, the curvature of which is stronger than that of an opposite surface thereof, and the following conditions being satisfied:

$$0.28<|f2/fA|\times FNoW<0.52$$

$$0.6<f3/f4<1.25$$

where $fA=\sqrt{fw \cdot ft}$, and where fw and ft are focal lengths of said zoom lens at the wide-angle end and the telephoto end, respectively, FNoW is the F-number in the wide-angle end, and f2, f3 and f4 are focal lengths of said second lens unit, said third lens unit and said fourth lens unit, respectively.

30. A zoom lens according to claim 28, wherein the following condition is satisfied:

$$0.6<f3/f4<1.25$$

where f3 and f4 are focal lengths of said third lens unit and said fourth lens unit, respectively.

31. A zoom lens comprising, in order from an object side to an image side, a first lens unit of positive refractive power, a second lens unit of negative refractive power, a third lens unit of positive refractive power and a fourth lens unit of positive refractive power, wherein a variation of magnification from a wide-angle end to a telephoto end is effected by moving said second lens unit toward the image side, shifting of an image plane due to the variation of magnification is compensated for by moving said fourth lens unit and focusing is effected by moving said fourth lens unit, said third lens unit having a stop disposed on the most object side thereof and comprising a positive lens having a convex surface facing the object side, the curvature of which is stronger than that of an opposite surface thereof, and a negative lens of meniscus form having a concave surface facing the image side, the curvature of which is stronger than that of an opposite surface thereof, said fourth lens unit consisting of a positive single lens having a convex surface facing the object side, the curvature of which is stronger than that of an opposite surface thereof, and the following condition being satisfied:

$$1.80<N2f<1.95$$

where N2f is the refractive index of material of a negative lens disposed on the most object side of said second lens unit.

32. A zoom lens according to claim 31, wherein the following condition is satisfied:

$$0.28<|f2/fA|\times FNoW<0.52$$

where $fA=\sqrt{fw \cdot ft}$, and where fw and ft are focal lengths of said zoom lens at the wide-angle end and the telephoto end, respectively, FNoW is the F-number at the wide-angle end, and f2 is a focal length of said second lens unit.

33. A zoom lens according to claim 28, 29 or 31, wherein the following conditions are satisfied:

$$0.3<Rr/\{(Nr-1)\times fA\}<0.7$$

$$0.3<|D3/fA|\times\sqrt{FNoW}<0.6$$

where $fA=\sqrt{fw \cdot ft}$, and where fw and ft are focal lengths of said zoom lens at the wide-angle end and the telephoto end, respectively, Rr is the radius of curvature of a lens surface on the image side of the negative lens of meniscus form disposed on the most image side of said third lens unit, Nr is the refractive index of material of the negative lens of meniscus form disposed on the most image side of said third lens unit, D3 is the distance from a lens surface on the most object side of said third lens unit to a lens surface on the most image side of said third lens unit, and FNoW is the F-number at the wide-angle end.

34. A zoom lens according to claim 28, 29 or 31, wherein said second lens unit comprises two or more negative lenses and one positive lens.

35. A zoom lens according to claim 34, wherein said second lens unit consists of, in order from the object side to the image side, a negative first lens having a concave surface facing the image side a curvature of which is stronger than that of an opposite surface thereof, a negative second lens both lens surfaces of which are concave, and a positive third lens having a convex surface facing the object side a curvature of which is stronger than that of an opposite surface thereof.

36. A zoom lens according to claim 35, wherein said negative second lens and said positive third lens of said second lens unit are cemented together.

37. A zoom lens according to claim 28, 29 or 31, wherein said second lens unit has an aspheric surface.

38. A zoom lens according to claim 37, wherein the following condition is satisfied:

$$1.0 < |R0/f2| < 4.0$$

where R0 is the radius of curvature adjacent to an optical axis of the aspheric surface included in said second lens unit, and f2 is the focal length of said second lens unit.

39. A zoom lens according to claim 28, 29 or 31, wherein said third lens unit or said fourth lens unit has an aspheric surface.

40. A zoom lens according to claim 28, 29 or 31, wherein the following condition is satisfied:

$$2.7 < L/fA < 3.9$$

where $fA = \sqrt{fw \cdot ft}$, and where fw and ft are focal lengths of said zoom lens at the wide-angle end and the telephoto end, respectively, L is the distance from the first lens surface on the object side of said zoom lens to a paraxial image plane.

41. An optical apparatus comprising a zoom lens according to any one of claims 1, 2, 3, 4, 15, 28, 29 and 31.

* * * * *

UNITED STATES PATENT AND TRADEMARK OFFICE
CERTIFICATE OF CORRECTION

PATENT NO. : 6,344,932 B1
DATED : February 5, 2002
INVENTOR(S) : Akihisha Horiuchi It is certified that error appears in the above-identified patent and that said Letters Patent is hereby corrected as shown below:

<u>Title page,</u>
Item [57], ABSTRACT,
Line 22, "leas" should read -- least --.

<u>Column 1,</u>
Line 22, "sufficies" should read -- suffices --.
Line 56, "lens unit" should read -- lens having aspheric surfaces and comprising in order from an object side, a fixed first lens unit --.

<u>Column 2,</u>
Line 34, "Accodingly" should read -- Accordingly --.

<u>Column 3,</u>
Line 20, "lens, surface" should read -- lens surface --.

<u>Column 5,</u>
Line 49, "power a" should read -- power, a --.
Line 55, "from a wide-angle end to a telephoto end is effected" should read -- is compensated for by moving the fourth lens unit and --.
Line 56, "by" ($1^{st}$ occurrence) should be deleted.

<u>Column 6,</u>
Line 11, "eight" should read -- eighth --.
Line 23, "stop" should read -- convex --.
Line 47, "DRAWING" should read -- DRAWINGS --.

<u>Column 7,</u>
Line 26, "fifth" should read -- fourth --.
Line 54, "middle focal length position" should read -- wide-angle end --.
Line 67, "eight" should read -- eighth --.

<u>Column 8,</u>
Lines 3 and 6, "eight" should read -- eighth --.
Line 21, "aberratgion" should read -- aberration --.

<u>Column 9,</u>
Line 29, "fce" should read -- face --.
Line 37, "fourh" should read -- fourth --.

UNITED STATES PATENT AND TRADEMARK OFFICE
CERTIFICATE OF CORRECTION

PATENT NO. : 6,344,932 B1
DATED : February 5, 2002
INVENTOR(S) : Akihisha Horiuchi It is certified that error appears in the above-identified patent and that said Letters Patent is hereby corrected as shown below:

Column 11,
Line 19, "a focal" should read -- afocal --.
Line 62, "becomes" should read -- become --.

Column 12,
Line 36, "The a" should read -- The --.

Column 16,
Line 63, "*R13=5.439" should read -- *R13=-5.439 --.

Column 20,
Line 47, "0.6" should read -- <0.6 --.

Column 21,
Line 6, "cause" should read -- caused --.

Column 22,
Line 8, "ease" should read -- easy --.

Column 27,
Line 9, "hd" should read -- f2 --.
Line 20, "in at" should read -- at the --.

Column 29,
Line 7, "cause" should read -- caused --.

Column 30,
Line 27, "ease" should read -- easy --.

Column 35,
Line 6, "lens both" should read -- lens, both --.
Line 58, "unit said" should read -- unit, said --.
Line 67, "lensu" should read -- lens --.

UNITED STATES PATENT AND TRADEMARK OFFICE
CERTIFICATE OF CORRECTION

PATENT NO. : 6,344,932 B1
DATED : February 5, 2002
INVENTOR(S) : Akihisha Horiuchi It is certified that error appears in the above-identified patent and that said Letters Patent is hereby corrected as shown below:

<u>Column 37,</u>
Line 23, "following" should read -- the following --

Signed and Sealed this

Twelfth Day of November, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,344,932 B1
DATED : February 5, 2002
INVENTOR(S) : Akihisa Horiuchi It is certified that error appears in the above-identified patent and that said Letters Patent is hereby corrected as shown below:

<u>Column 8,</u>
Line 25, "telephoto end" should read -- middle focal length position --.
Line 41, "twelfth" should read -- eleventh --.

Signed and Sealed this

Twentieth Day of May, 2003

JAMES E. ROGAN
*Director of the United States Patent and Trademark Office*